US012566014B2

(12) United States Patent
Hafter et al.

(10) Patent No.: US 12,566,014 B2
(45) Date of Patent: Mar. 3, 2026

(54) METHODS AND SYSTEMS FOR MOUNTING SOLAR PANEL FRAMES

(71) Applicant: Origami Solar, Inc., Sacramento, CA (US)

(72) Inventors: Eric Hafter, Sacramento, CA (US); John C. Patton, Rocklin, CA (US)

(73) Assignee: Origami Solar, Inc., Sacramento, CA (US)

( * ) Notice: Subject to any disclaimer, the term of this patent is extended or adjusted under 35 U.S.C. 154(b) by 0 days.

(21) Appl. No.: 18/573,043

(22) PCT Filed: Jun. 21, 2022

(86) PCT No.: PCT/US2022/034278
§ 371 (c)(1),
(2) Date: Dec. 21, 2023

(87) PCT Pub. No.: WO2022/271656
PCT Pub. Date: Dec. 29, 2022

(65) Prior Publication Data
US 2024/0297614 A1 Sep. 5, 2024

Related U.S. Application Data

(60) Provisional application No. 63/213,541, filed on Jun. 22, 2021.

(51) Int. Cl.
*H02S 30/10* (2014.01)
*F24S 25/20* (2018.01)
(Continued)

(52) U.S. Cl.
CPC .............. *F24S 25/20* (2018.05); *F24S 25/63* (2018.05); *H02S 20/00* (2013.01); *H02S 30/10* (2014.12);
(Continued)

(58) Field of Classification Search
CPC H02S 20/00; H02S 30/10; F24S 25/20; F24S 25/63; F24S 2025/012; F24S 2025/6003
See application file for complete search history.

(56) References Cited

U.S. PATENT DOCUMENTS 10,749,459 B1 * 8/2020 Liu ........................ F16B 5/0685
11,245,356 B1 * 2/2022 Hsueh ...................... H02S 30/00
(Continued)

FOREIGN PATENT DOCUMENTS

CN 105680781 A * 6/2016 ............. H02S 30/10
CN 105977884 A * 9/2016 ........... H02G 3/0456
(Continued)

OTHER PUBLICATIONS

PCT International Application No. PCT/US2022/034278, filed Jun. 21, 2022. First named inventor: Hafter.
(Continued)

*Primary Examiner* — Jessie T Fonseca
(74) *Attorney, Agent, or Firm* — Fredrikson & Byron, P.A.

(57) ABSTRACT

A mounting system may be provided for a solar panel and may include a frame having a first frame section and a first support structure. The first frame section may include an elongated piece of framework material having a first end and a second end, wherein the first and second ends define a lengthwise dimension. A lengthwise fold may define an intersection of a frame sidewall with a bottom flange, wherein at least a portion the frame sidewall extends above the bottom flange. A first wall opening may be provided in the frame sidewall. A panel containment structure may be provided at an upper portion of the frame sidewall and may include a lower shelf extending from the frame sidewall. The panel containment structure may engage a bottom surface of the solar panel at a first panel edge area.

20 Claims, 49 Drawing Sheets

(51) Int. Cl.

| | |
|---|---|
| *F24S 25/63* | (2018.01) |
| *H02S 20/00* | (2014.01) |
| *F24S 25/00* | (2018.01) |
| *F24S 25/60* | (2018.01) |

(52) U.S. Cl.

CPC .. *F24S 2025/012* (2018.05); *F24S 2025/6003* (2018.05)

(56) References Cited

U.S. PATENT DOCUMENTS

| | | | |
|---|---|---|---|
| 2008/0302407 A1 | 12/2008 | Kobayashi | |
| 2009/0194098 A1 | 8/2009 | Placer | |
| 2013/0091786 A1 | 4/2013 | DuPont et al. | |
| 2015/0040967 A1 | 2/2015 | West et al. | |
| 2016/0054030 A1 | 2/2016 | Ilzhofer | |
| 2017/0163210 A1 * | 6/2017 | Gorny | H02S 30/10 |
| 2018/0191290 A1 | 7/2018 | Guthrie et al. | |
| 2018/0226916 A1 | 8/2018 | Neuhauser et al. | |
| 2021/0159850 A1 * | 5/2021 | Shakir | H02S 30/10 |
| 2022/0103117 A1 | 3/2022 | Gong et al. | |

FOREIGN PATENT DOCUMENTS

| | | | | | |
|---|---|---|---|---|---|
| CN | 107959466 | A | * | 4/2018 | H02S 30/10 |
| CN | 108599701 | A | * | 9/2018 | H02S 30/10 |
| CN | 108649883 | A | * | 10/2018 | H02S 30/10 |
| CN | 108649884 | A | * | 10/2018 | H02S 30/10 |
| CN | 111064426 | A | * | 4/2020 | H02S 30/10 |
| CN | 111147012 | A | * | 5/2020 | C23C 24/10 |
| CN | 210807166 | U | * | 6/2020 | |
| CN | 111371397 | A | * | 7/2020 | |
| CN | 212305210 | U | * | 1/2021 | |
| CN | 212969542 | U | * | 4/2021 | |
| CN | 112953379 | A | * | 6/2021 | |
| CN | 117897906 | A | | 4/2024 | |
| WO | 2014004161 | A1 | | 1/2014 | |
| WO | WO-2015182417 | A1 | * | 12/2015 | H02S 30/10 |
| WO | WO-2019069396 | A1 | * | 4/2019 | |
| WO | 2020252091 | A1 | | 12/2020 | |
| WO | 2021036273 | A1 | | 3/2021 | |

OTHER PUBLICATIONS

U.S. Appl. No. 63/213,541, filed Jun. 22, 2021. First named inventor: Hafter.

PCT International Application No. PCT/US2022/034278, filed Jun. 21, 2022. International Search Report dated Oct. 12, 2022. 4 pages.

PCT International Application No. PCT/US2022/034278, filed Jun. 21, 2022. Written Opinion of the International Searching Authority dated Oct. 12, 2022. 10 pages.

European Patent Application No. 22829123.3, filed Jan. 9, 2024. First named inventor: Hafter. Examination Report dated Oct. 8, 2024, 6 pages.

European Patent Application No. 22829123.3, filed Jan. 9, 2024. First named inventor: Hafter. Search Report dated Sep. 25, 2024, 3 pages.

* cited by examiner

1095

1095

1101

1126b

1126a

1201

1226c

1226b

1226a

1401F

1403F

1426F

1403F'

1401G

1403G'

1426G

1403G'

D

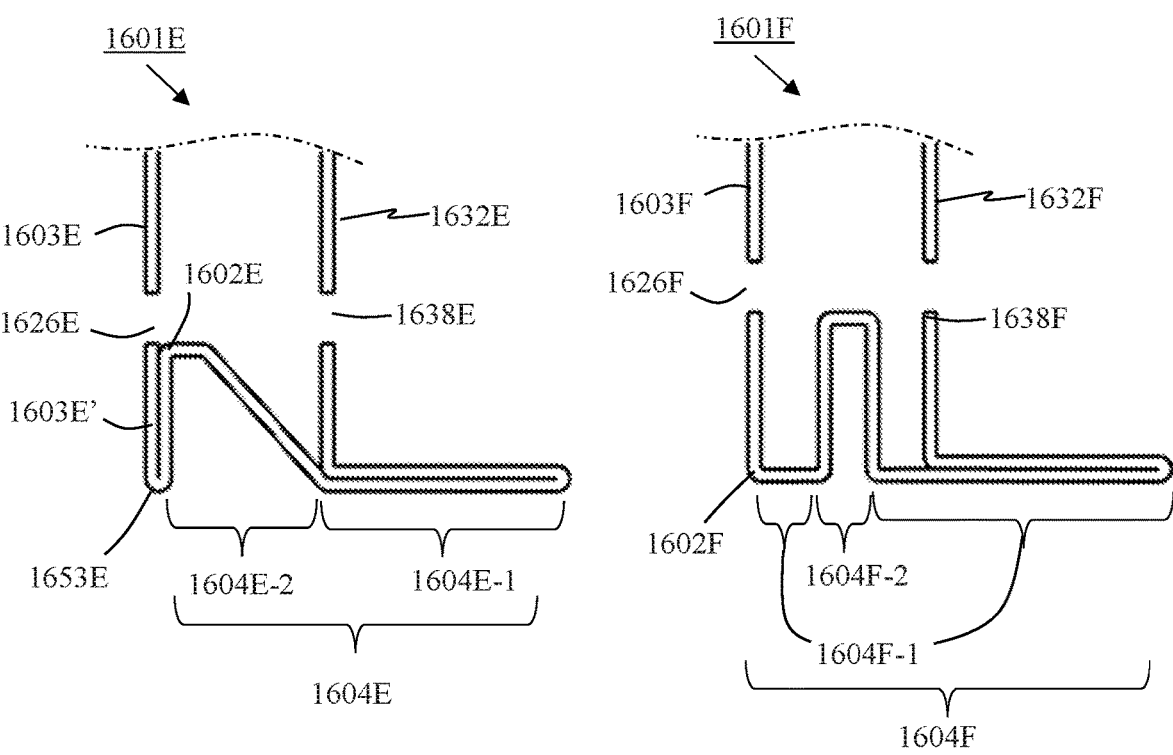
FIG. 16E
FIG. 16F
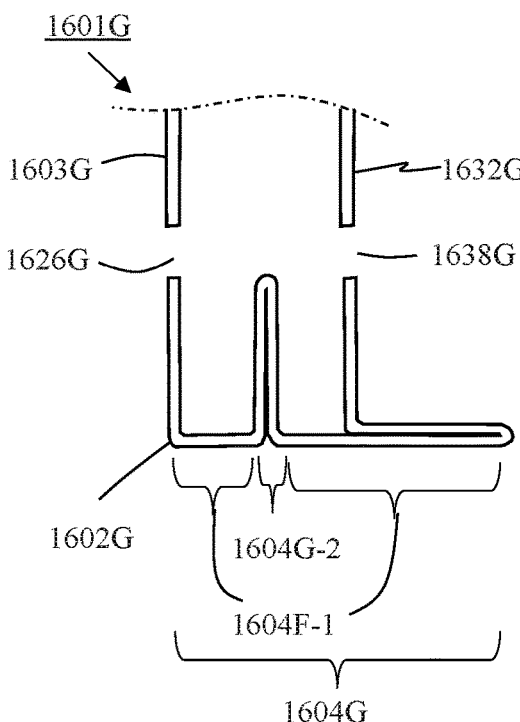
FIG. 16G

2495E

2495F

2495G

2495H

2495I

2477I'

2401J 2404J-3    2404J-2     2404J-1

2404J

METHODS AND SYSTEMS FOR MOUNTING SOLAR PANEL FRAMES

CROSS-REFERENCE TO RELATED APPLICATION

This application is the United States National Phase of PCT International Application No. PCT/US2022/034278, filed Jun. 21, 2022 which claims priority to and the benefit of U.S. Provisional Patent Application No. 63/213,541 filed on Jun. 22, 2021, entitled "METHODS AND SYSTEMS FOR MOUNTING SOLAR PANEL FRAMES", the contents of each application and any priority case are hereby incorporated by reference in their entirety.

TECHNICAL FIELD

The present disclosure relates to various embodiments for mounting systems and methods for mounting framed panel structures such as solar panels. The framed panel structure may include an opening in a frame sidewall and rest on a support structure. The support structure may include an attachment feature that extends through the opening and engages the frame.

BACKGROUND

Photovoltaic solar panels for residential and commercial use are relatively large and heavy. For example, a typical rectangular solar panel may weigh about 20-30 kg, have a width of about 1 meter, a length of about 1.6 to 5.0 meters, and a thickness of about 3 to 5 cm. A photovoltaic solar panel may typically be a multilayer laminated structure and may include photovoltaic cells encapsulated between a top glass and a protective back-sheet. A solar panel can further include appropriate wiring and junctions so that solar-generated electricity (typically DC) may be transmitted to a desired load, grid, or energy storage unit. While having some physical toughness, significant additional strength to the panel may be provided by including it in a frame. A frame may allow for easy attaching of a photovoltaic solar panel to a rack. A framed PV laminate may be referred to as a PV module.

Over the years, the cost of solar panels has decreased perhaps due to a decrease in the material and manufacturing costs and even an increased efficiency of the solar cells. However, in order to further expand the use of renewable solar energy, there is a continuing desire to improve solar panel frames including how the connect to racking.

DISCLOSURE OF THE INVENTION

The present application includes a variety of aspects, which may be selected in different combinations based upon the particular application or needs to be addressed. In various embodiments, the application may include a mounting system for a solar panel and may include a frame and a first support structure. The frame may include at least a first frame section having an elongated piece of framework material having a first end and a second end, wherein the first and second ends define a lengthwise dimension. A lengthwise fold may define an intersection of a frame sidewall with a bottom flange, wherein at least a portion the frame sidewall extends above the bottom flange. A first wall opening may be provided in the frame sidewall. A panel containment structure may be provided at an upper portion of the frame sidewall and may include a lower shelf extending from the frame sidewall. The panel containment structure may engage a bottom surface of the solar panel at a first panel edge area. The first support structure may include an upper surface formed from a support structure material and an upper surface plane. The support structure may include a first attachment feature, at least a portion of which is positioned above the upper surface plane. At least a portion the first frame section may rest on at least a portion of the upper surface. The first attachment feature may extend through the first wall opening and may engage the frame.

In another embodiment, the application may include a framed panel structure having a solar panel and a frame. The solar panel may have four sides, and may a first panel edge, a second panel edge approximately orthogonal to the first panel edge, a third panel edge opposite and approximately parallel to the first panel edge, and a fourth panel edge opposite and approximately parallel to the second panel edge. The frame may include at least a first frame section having a first panel containment structure that engages the first panel edge, and an opposing frame section having an opposing panel containment structure that engages the third panel edge. Each frame section may include a lengthwise fold in an elongated single piece of framework material, the lengthwise fold defining a frame sidewall and a bottom flange. The first frame section may include a wall opening in its frame sidewall and the opposing frame section may include a mounting hole in its bottom flange.

Embodiments of frames, frame sections, support structures, and frame precursor structures herein may provide one or more of the following advantages: improved attachment of panel frames to racking; improved integration with racking systems; improved integration with solar installation accessories (wire management, micro-inverter attachment, sensor attachment, or the like); improved mounting structures; improved frame strength; improved options for high-strength modules; improved bending; improved twisting; improved durability of framed panel structures; reduced material costs; reduced manufacturing costs; reduced manufacturing tack time; higher manufacturing yield; reduced installation costs; simplified installation; reduced installation time; higher installation yield; ability to use magnetic properties to improve installation and monitoring systems; improvements in photovoltaic module installation labor; improvements in expanding field installation tolerances; and even improvements in photovoltaic module manufacturers' branding and installation aesthetics through custom colors, shapes and embossing.

Naturally, further objects, goals and embodiments of the application are disclosed throughout other areas of the specification, claims, and drawings.

BRIEF DESCRIPTION OF DRAWINGS

FIGS. 16A-16G are cross-sectional views of non-limiting examples of frame sections according to some embodiments.

MODE(S) FOR CARRYING OUT THE INVENTION

It should be understood that embodiments include a variety of aspects, which may be combined in different ways. The following descriptions are provided to list elements and describe some of the embodiments of the present application. These elements are listed with initial embodiments; however, it should be understood that they may be combined in any manner and in any number to create additional embodiments. The variously described examples and embodiments should not be construed to limit embodiments of the present application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

It is to be understood that the drawings are for purposes of illustrating the concepts of the disclosure and may not be to scale. Additional details of certain embodiments of the present application may be found in PCT application PCT/US2020/037092 filed on Jun. 10, 2020 and published as WO2020/252091A1, PCT application PCT/US2022/025383 filed on Apr. 19, 2022, PCT application PCT/US2022/025388 filed on Apr. 19, 2022, and PCT application PCT/US2022/029668 filed on May 17, 2022, the entire contents of which are incorporated herein by reference for all purposes.

Figures 1A, 1B, 1C:
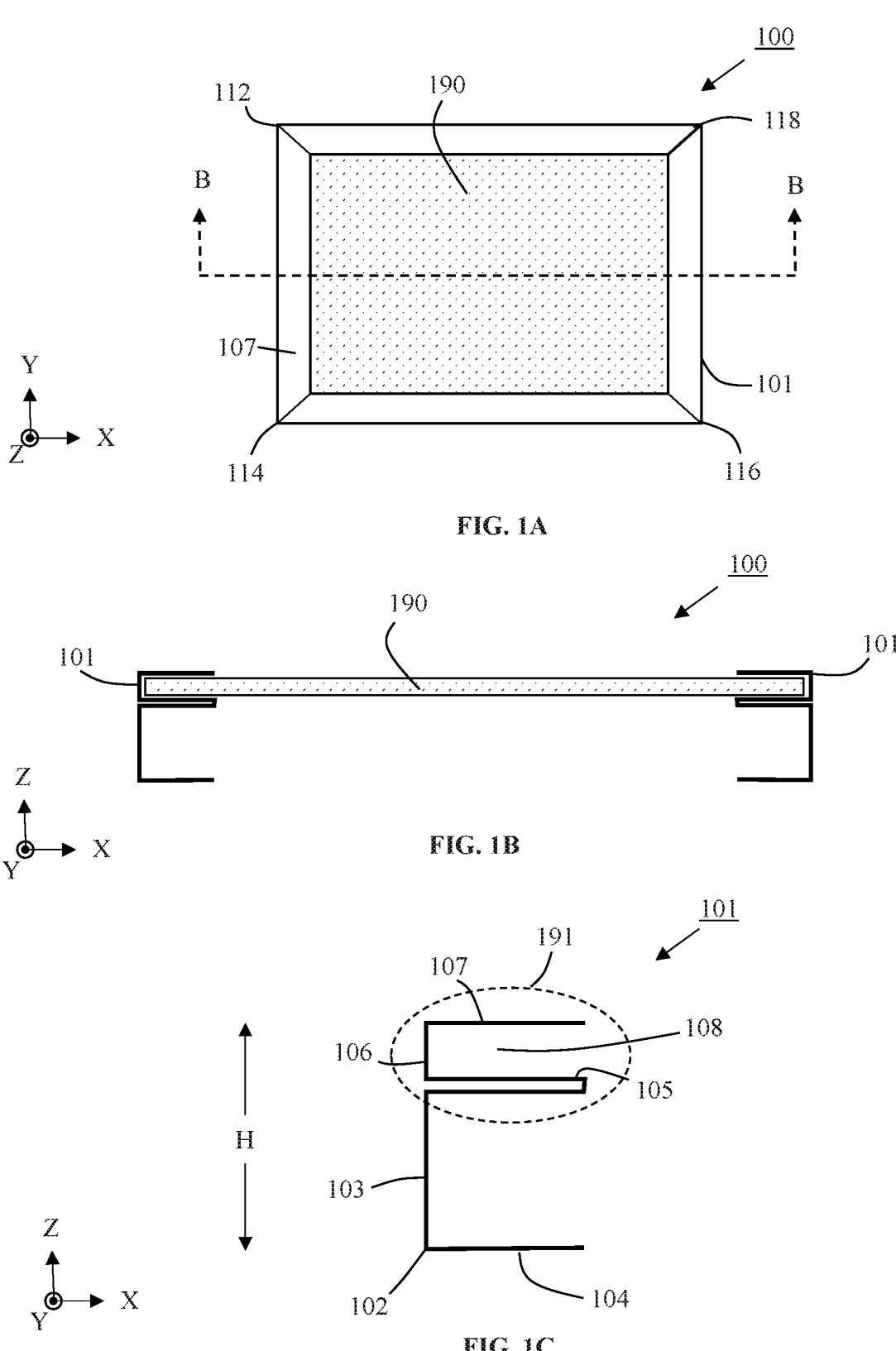
FIG. 1A is a plan view of a non-limiting example of a framed panel structure according to some embodiments.
FIG. 1B is a cross-sectional view of a non-limiting example of a framed panel structure along cutline B-B of FIG. 1A according to some embodiments.
FIG. 1C is the cross-sectional view from FIG. 1B showing a non-limiting example of just the frame according to some embodiments.

FIG. 1A is a plan view of a non-limiting example of a framed panel structure 100 (e.g., a framed solar panel structure or PV module) including panel 190 (e.g., a solar panel) encased in or otherwise supported by a frame 101 according to some embodiments. FIG. 1B is a cross-sectional view of the framed panel structure 100 along cutline B-B. For added perspective, XYZ coordinate axes are also shown. FIG. 1C is the cross-sectional view as in FIG. 1B but excluding the panel to further illustrate some of the features of the frame 101.

In some embodiments and as discussed in more detail herein, frame 101 may be formed from substantially a single frame precursor structure that can be bent in predetermined regions to accommodate three corners of the solar panel, perhaps with the fourth corner forming a joint between two ends of the frame precursor structure. That is, frame 101 may in some cases include a first corner bend 112 corresponding to a first corner of panel 190, a second corner bend 114 corresponding to a second corner of panel 190, a third corner bend 116 corresponding to a third corner of panel 190, and even a corner joint 118 corresponding to a fourth corner of panel 190.

Referring to FIGS. 1B and 1C, frame 101 may include a framework material that has been cut and folded into a desired shape. Frame 101 may be characterized by a height H and may include a lengthwise fold 102 defining an intersection of a frame sidewall 103 with a bottom flange 104. The frame may further include a series of folds to form a panel containment structure 191 including a lower shelf 105, an optional pocket wall 106, an optional top lip 107, and perhaps even a pocket region 108. In some embodiments, the bottom flange may generally represent, or be provided at, the base of the frame or framed panel structure. In some cases, a bottom flange may be referred to as a frame base. The panel 190 may be received onto the lower shelf, e.g., into a portion of the pocket region and secured in place, optionally with a sealant that may have adhesive properties (not shown). Some non-limiting examples of sealants may include curable liquid silicone, urethane, epoxy, resin, any other liquid seal, or the like. Alternatively, or in combination, a pressure sensitive adhesive tape may optionally be used to secure the panel in the pocket region. In some embodiments, a panel containment structure may include only a lower shelf, or alternatively, only a lower shelf and a pocket wall. In such embodiments, the panel may optionally be secured in place using a sealant or pressure sensitive adhesive as described above. In some embodiments, only some of the frame sections may include a panel containment structure, for example, only frame sections on one set of opposing sides of a rectangular or square panel.

Although FIGS. 1B and 1C show non-limiting examples where the bottom flange, the lower shelf, and the top lip all extend away from the frame sidewall to an equal extent, any of these features may be varied such as shorter or longer than the others or the like. The angle between the frame sidewall and bottom flange is shown to be approximately 90°, e.g., in a range of about 85° to about 95°, but in some other embodiments, the angle may be outside of that range, e.g., in a range of about 45° to about 135° perhaps depending on other features of the structure and overall system design. In some embodiments, the lower shelf and bottom flange may remain approximately parallel, e.g., within about 40°, alternatively within about 30°, about 20°, about 15°, about 10°, or even about 5°, regardless of the angle between the frame sidewall and the bottom flange. The top lip is shown to be parallel with the lower shelf, but in some embodiments, it may be at a slight angle or curved at the end perhaps so that the opening of the pocket region may be larger or smaller than the pocket wall. In the embodiment illustrated in FIGS. 1B and 1C, the lower shelf 105 is shown as being formed from, or including multiple layers of, framework material. In some embodiments, any or all of the frame features (e.g., a sidewall, bottom flange, lower shelf, pocket wall, upper lip, support wall, or the like) may be formed from or include multiple layers of framework material. In some cases, multiple layers may provide increased strength to the frame.

FIGS. 1A, 1B, and 1C illustrate a conventional rectangular panel shape that may be common for solar panels. However, there is no particular limitation on the shape of the panel which may be any shape such as polygon having 3, 4, 5, 6 7, 8 or more sides. The sides of the polygon may have the same length, or alternatively some sides may be longer or shorter. The corner angles of the polygon may all be the same, or alternatively, some corner angles may have smaller or larger angles than others. Although frames and frame sections herein are generally shown as having a bottom flange, in some embodiments, one or more frame sections may not include a bottom flange. In some embodiments where the frame has a rectangular shape, the frame sections corresponding to the shorter sides of the frame may not include a bottom flange whereas the frame sections corresponding to the longer sides of the frame may include a bottom flange.

Making the frame or a frame section substantially from a single piece of framework material may have considerable manufacturing, assembly, and cost advantages. However, the panel containment structure in some embodiments may be formed using alternative methods and materials. For example, the lower shelf may include a piece of shelf material bonded (e.g., welded, brazed, soldered, glued, riveted, or the like) to an upper portion of the frame sidewall. Similarly, the top lip may include a piece of top lip material bonded to the top of the frame structure. Alternatively, the entire panel containment structure may be a separate structure designed to sit on, slip over, or otherwise mate with the frame sidewall. As discussed elsewhere herein, rather than one elongated piece of framework material, a 4-sided frame may be formed from 2, 3, or even 4 separate frame sections (or more or if the frame has more than 4 sides). Although not illustrated in FIGS. 1A-1C, the frame or framed panel structure may further include a support wall extending from the bottom flange to the panel containment structure or to the frame sidewall, as described in more detail elsewhere herein. It should be noted that, throughout this disclosure, an upper portion and top lip may in some cases refer to general positions relative to the bottom flange or the base of the frame, and does not necessarily indicate a position or orientation in the final framed panel structure, which may be oriented in a manner other than horizontal as shown in FIG. 1B (e.g., at an angle, on its side, or even partially or fully inverted).

Figure 2A:
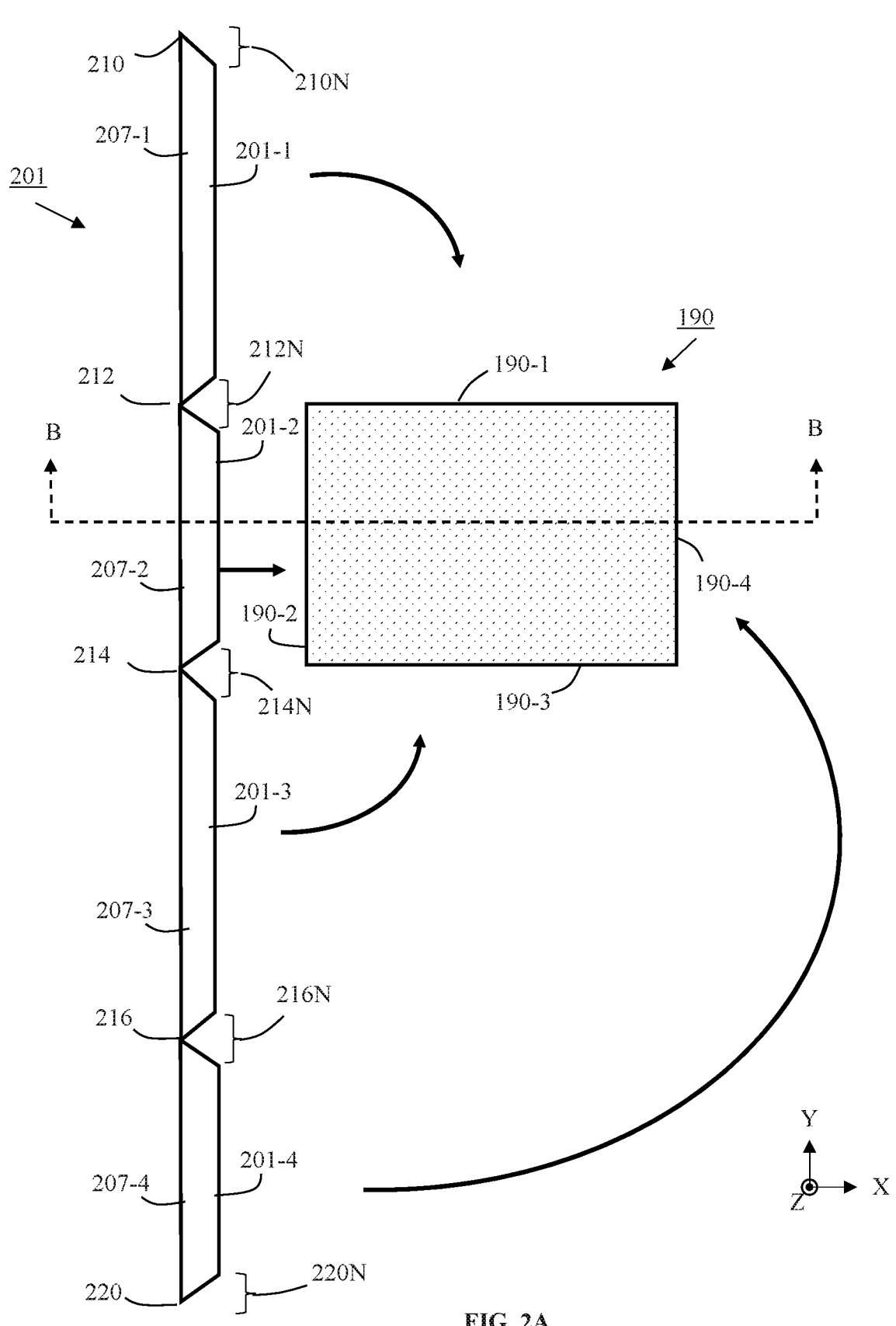
FIG. 2A is a plan view of a non-limiting example of a frame precursor structure and a panel prior to assembling a framed panel structure according to some embodiments.
Figures 2B, 2C:
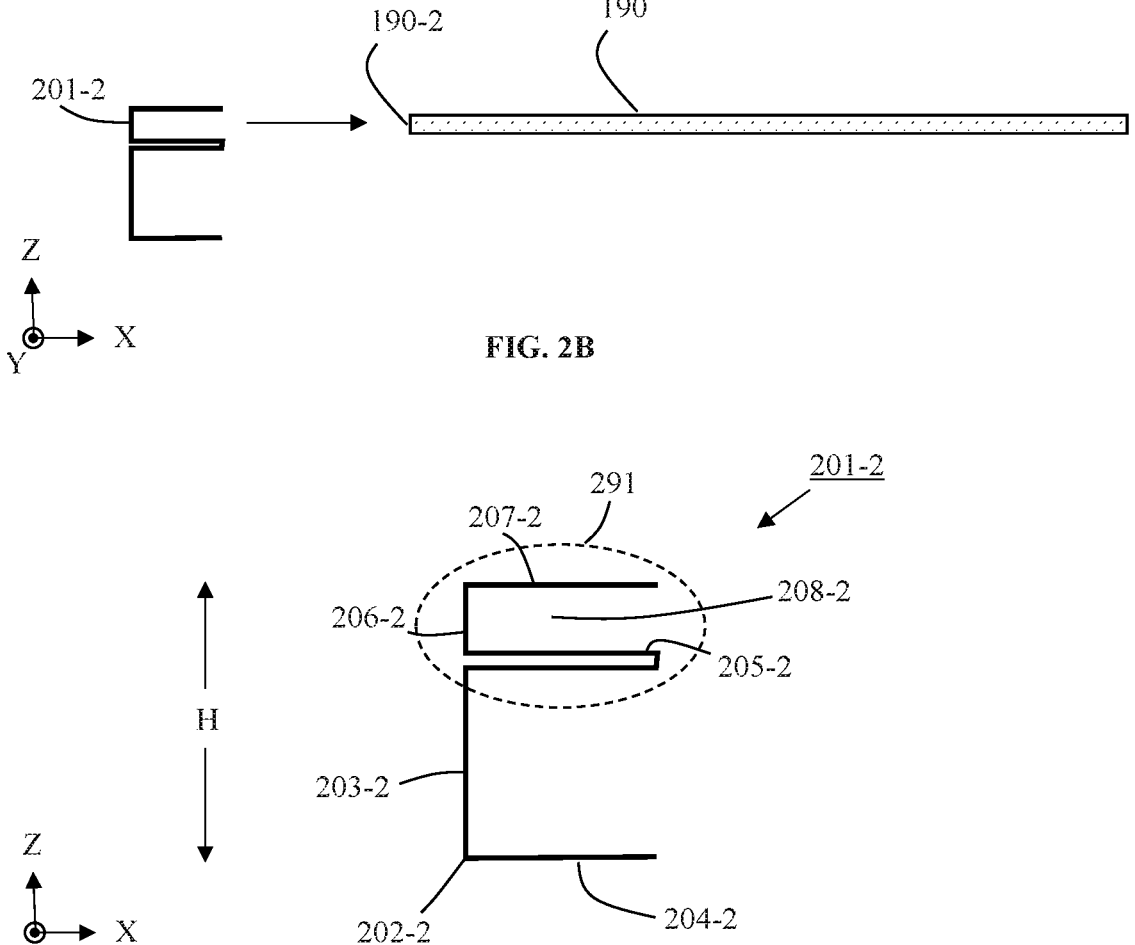
FIG. 2B is a cross-sectional view of a non-limiting example of a frame precursor structure and a panel along cutline B-B of FIG. 2A according to some embodiments.
FIG. 2C is the cross-sectional view from FIG. 2B showing a non-limiting example of just the frame precursor structure according to some embodiments.

FIG. 2A is a plan view schematic to generally illustrate construction of a framed panel structure according to some embodiments. FIG. 2B is a cross-sectional view of FIG. 2A along cutline B-B. A frame precursor structure 201 may be formed from framework material characterized by an average thickness. Frame precursor structure 201 may include a first end 210 and a second end 220 defining a lengthwise dimension. The frame precursor structure 201 may include a first frame section 201-1 designed to fit with or otherwise engage first panel edge 190-1 of panel 190, a second frame section 201-2 designed to fit with or otherwise engage second panel edge 190-2, a third frame section 201-3 designed to fit with or otherwise engage third panel edge 190-3, and even a fourth frame section 201-4 designed to fit with or otherwise engage fourth panel edge 190-4. For example, a lower shelf of a frame section may engage a bottom surface of the panel at a panel edge area associated with that frame section. Frame precursor structure 201 may include a first corner bend precursor axis 212 between the first and second frame sections and may be designed to bend along the Z axis (the height axis) of the frame sidewall. In a finished framed panel structure, first corner bend precursor axis 212 can correspond to first corner bend 112 (FIG. 1A). Similarly, frame precursor structure 201 may include second and third corner bend precursor axes 214 and 216, respectively.

Referring to FIG. 2B, the cross-sectional structure correlates to that of FIG. 1B for the finished frame. FIG. 2C is the cross-sectional view as in FIG. 2B but excluding the panel to further illustrate some non-limiting examples of the features of the frame precursor structure, in particular, frame section 201-2. Here, second frame section 201-2 may be characterized by height H and may include a lengthwise fold 202-2 perhaps defining an intersection of a frame sidewall 203-2 with a bottom flange 204-2. The second frame section may include a series of folds to form a panel containment structure 291 including a lower shelf 205-2, an optional pocket wall 206-2, an optional top lip 207-2 and perhaps even a pocket region 208-2. In some embodiments, the bottom flange may generally represent, or be provided at, the base of the frame section. In some embodiments, a panel containment structure may include only a lower shelf, or alternatively, only a lower shelf and a pocket wall. Panel edge 190-2 of panel 190 may be received onto the lower shelf, e.g., into a portion of the pocket region and secured in place, optionally with some sealant (not shown). For example, lower shelf 205-2 may engage a bottom surface of the panel at a panel edge area associated with panel edge 190-2. In some embodiments, each frame section of the frame precursor structure may have substantially the same cross-sectional structure as shown for the second frame section 201-2 in FIG. 2B. But in some other embodiments, there may be differences between cross-sectional structures of two or more of frame sections. In the embodiment illustrated in FIGS. 2B and 2C, the lower shelf 205-2 is shown as being formed from, or including multiple layers of, framework material. In some embodiments, any or all of the frame section features (e.g., a sidewall, bottom flange, lower shelf, pocket wall, upper lip, support wall, or the like) may be formed from or include multiple layers of framework material. In some cases, multiple layers may provide increased strength to the frame.

In order to accommodate bending, the frame precursor structure may include a series of notches (212N, 214N, 216N) in the top lip, the lower shelf, and even the bottom flange, such notches corresponding to first, second, and third corner bend precursor axes, 212, 214, and 216, respectively. In FIG. 2A, the notches are only visible in the top lip (between top lip 207-1 and top lip 207-2, between top lip 207-2 and top lip 207-3, and between top lip 207-3 and top lip 207-4), but similar notches may also be present perhaps in the lower shelf and bottom flange. In some embodiments, the angle of the notch may be about 180° minus the angle of the panel corner being enclosed. Similarly, the ends of the frame precursor structure may also include an angled cut (210N and 220N) in the top lip, the lower shelf, and the bottom flange to accommodate formation of a corner joint.

Figure 2D:
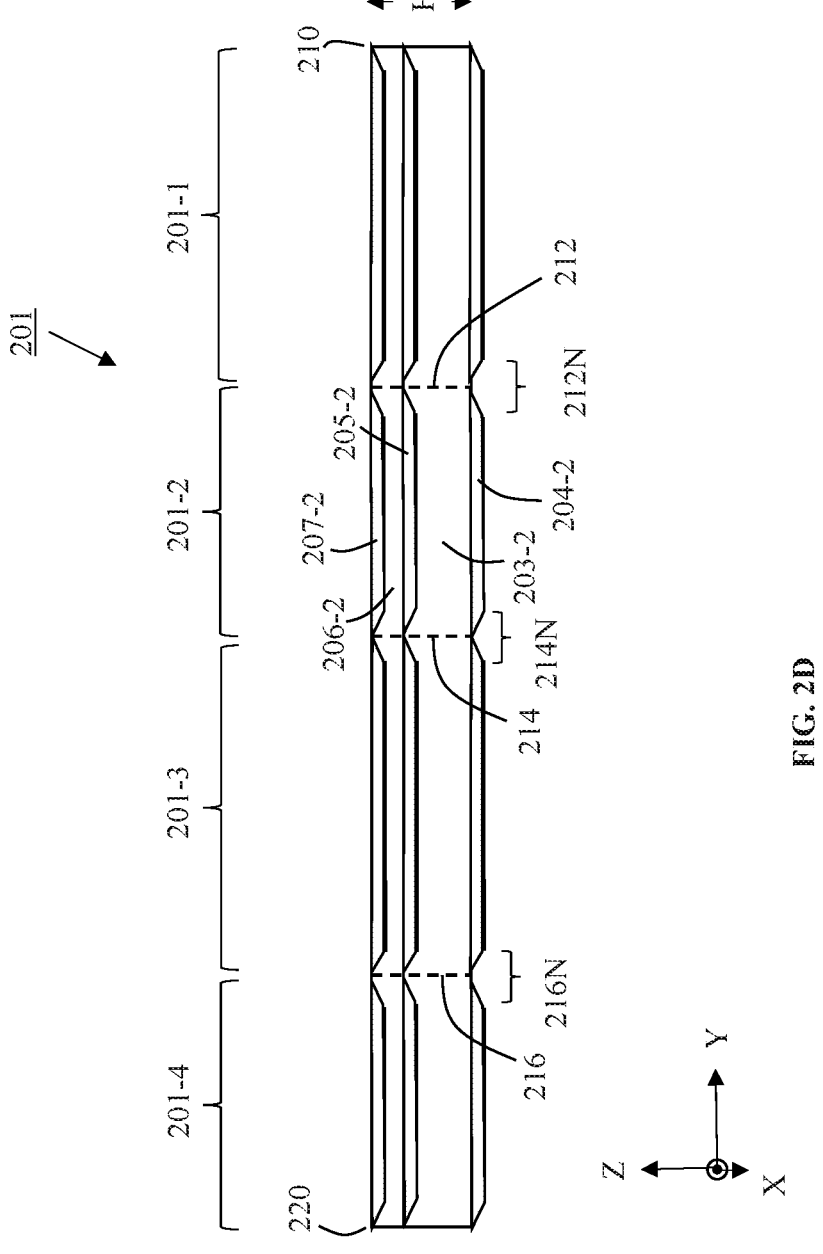
FIG. 2D is a side view with slight elevation of a non-limiting example of a frame precursor structure according to some embodiments.

In FIG. 2D, there is shown a non-limiting example of a side view schematic (with slight elevation) of the frame precursor structure facing the side that can receive the panel. For clarity, not all of the features are labelled, but in combination with the other figures, the identity of each feature is self-evident.

Figure 2E:
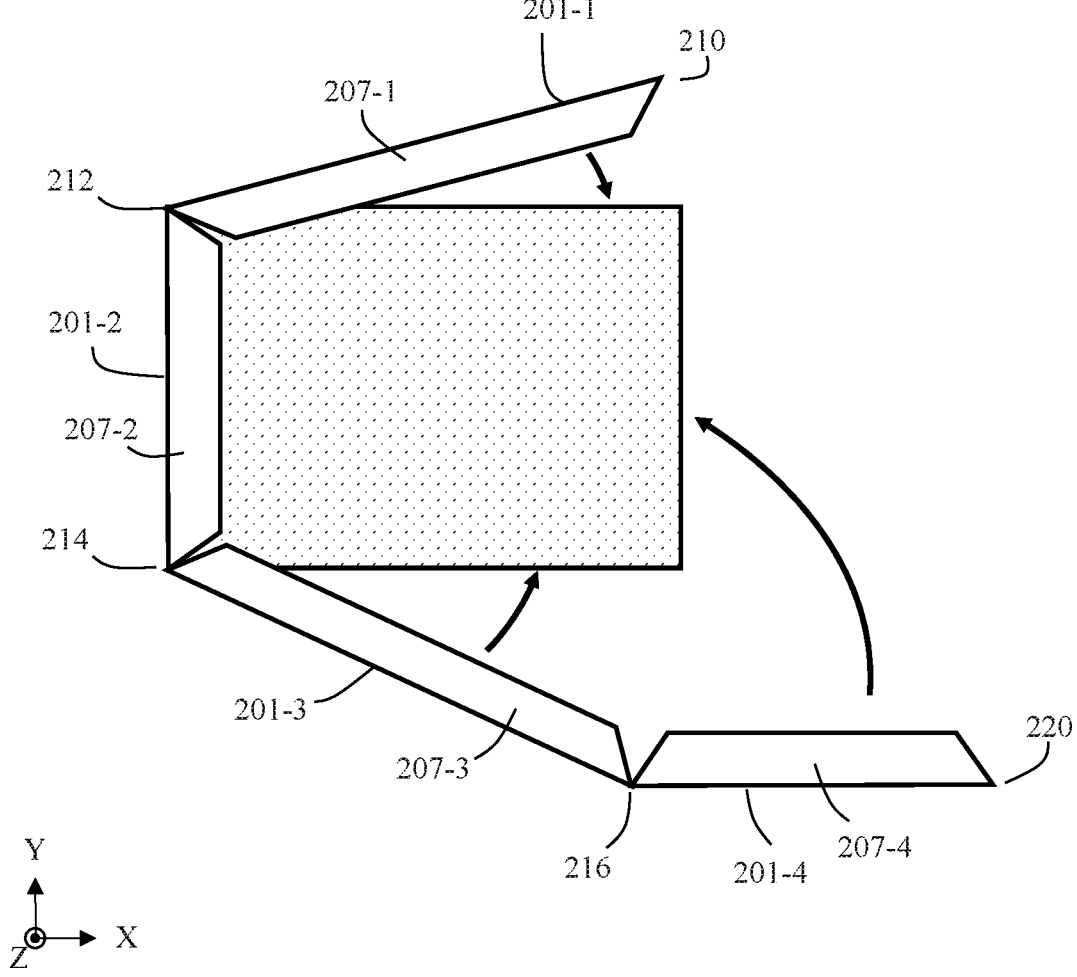
FIG. 2E is a plan view of a non-limiting example of a frame precursor structure and a panel at an intermediate stage of assembly according to some embodiments.

Referring to FIG. 2E, there is a plan view showing a non-limiting example of an intermediate state of assembling the framed panel structure where frame section 201-2 of the frame precursor structure has engaged the panel edge area of panel edge 190-2 and bends are being formed along the bend precursor axes as other frame sections move closer to their intended final positions around the panel. Note that assembly does not have to start with panel edge 190-2 but may instead start with any panel edge or corner. Forming the corner joint 118 (see FIG. 1A) where the two ends (210 and 220) of the frame precursor structure meet may be a final step in this portion of the framed panel structure assembly, but there may be additional steps to further secure or modify the frame (e.g., adding optional support brackets, tightening optional bolts, or the like). In some embodiments, assembling the framed panel structure may include use of an assembly apparatus that holds and manipulates the panel and frame precursor structure(s). With respect to orientation of the components during assembly relative to the assembly apparatus, the plan view of FIG. 2E may represent a view from above, or alternatively a view from below, or even a view from the side, depending on the nature of the assembly apparatus.

In some embodiments, the corner bends and/or corner joints may include features capable of forming interlocking structures. For example, a bottom flange or other portion on one side of the corner may include a locking element that may be received into an opening on the other side of the corner.

Although not illustrated in FIGS. 2A-2E, one or more frame sections may further include a support wall extending from the bottom flange to the panel containment structure or to the frame sidewall, as described in more detail elsewhere herein.

In some embodiments, the frame precursor structure 201 may be substantially linear (as shown) prior to assembling the framed panel structure. In some embodiments, the frame precursor structure may be received by an assembler perhaps already partially bent at one or more corner bend precursor axes. One or more corner bend precursor axes may be pre-scored or include a furrow or features that promote bending along the height access between the frame sections.

The frame and frame precursor structures described in FIGS. 1A-C and 2A-E are non-limiting examples provided in order to illustrate how some of the frame support substructures and frame support walls described below may be implemented in a frame. Alternative designs and structures may be used effectively with such support structures. In some embodiments, rather than using one frame precursor structure, multiple frame precursor structures may be used to enclose a panel. For example, with a rectangular panel, two similar frame precursor structures, each having one corner bend precursor axis may be used to form a framed panel structure that may include two corner joints at opposite corners and two corner bends at opposite corners. Alternatively, a first frame precursor structure may have two corner bend precursor axes and a second frame precursor structure may have no corner bend precursor axes and be used to form a framed panel structure that may include two corner joints at adjacent corners and two corner bends also at adjacent corners. Alternatively, three frame precursor structures may be used where one may have one corner bend precursor axis and the other two may not, whereby a framed panel structure may include one corner bend and three corner joints. Alternatively, four frame precursor structures may be used wherein none have a corner bend precursor axis and the framed panel structure may include four corner joints.

Figure 3:
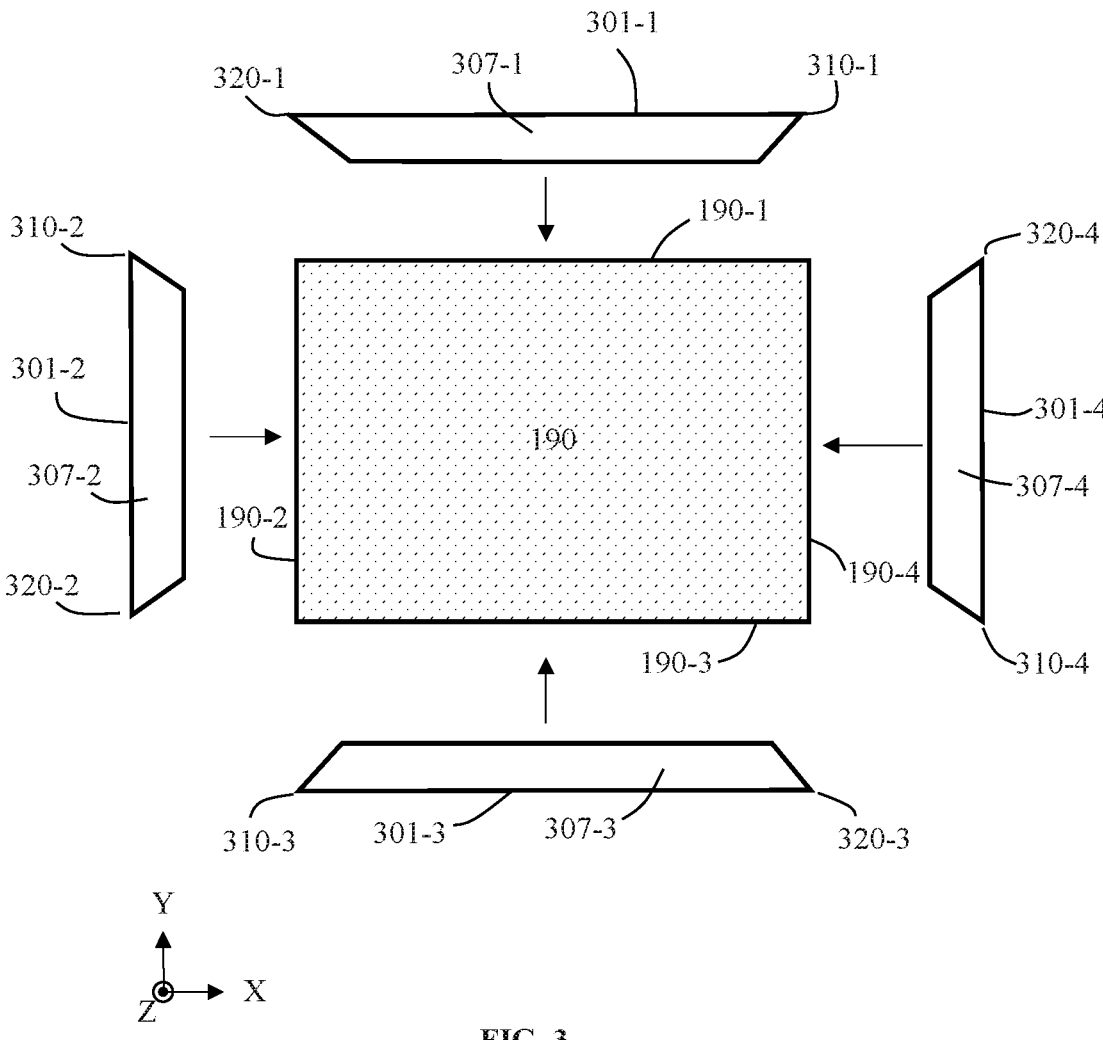
FIG. 3 is a plan view showing a non-limiting example of assembling a frame using four frame precursor structures according to some embodiments.

FIG. 3 is a plan view showing a non-limiting example of assembling a frame using four frame precursor structures according to some embodiments. Each frame precursor structure (each of which may also be referred to herein as a frame section) 301-1, 301-2, 301-3, 301-4 may optionally include any of the features described elsewhere, such as a bottom flange, a side wall, and even a panel containment structure that may include a lower shelf, an optional pocket wall and an optional top lip. In some cases, one or more frame sections may further include a support wall extending from the bottom flange to the panel containment structure or to the frame sidewall as discussed elsewhere herein. In this view, only the top lip 307-1, 307-2, 307-3, 307-4 of each frame precursor structure is visible. Each frame precursor structure may have a first end 310-1, 310-2, 310-3, 310-4 and a second end 320-1, 320-2, 320-3, 320-4. When assembled, a first end of one frame precursor structure may form a corner joint with a second end of an adjacent frame precursor structure. As discussed with respect to FIG. 2E, the plan view of FIG. 2E may represent a view from above, or alternatively a view from below, or even a view from the side, depending on the nature of the assembly apparatus.

As indicated by the arrows, a first frame precursor structure may be designed to fit with or otherwise engage a first panel edge 190-1 of panel 190, a second frame precursor structure 301-2 may be designed to fit with or otherwise engage a second panel edge 190-2, a third frame precursor structure 301-3 may be designed to fit with or otherwise engage third panel edge 190-3, and even a fourth frame precursor structure 301-4 may be designed to fit with or otherwise engage fourth panel edge 190-4. There are numerous variations regarding the sequence used to assemble the frame. In some embodiments, all four frame precursor structures can concurrently be brought together with their respective panel edges and attached at approximately the same time. In some cases, attachment may be sequential and may be in any order. In some embodiments, just two or three frame precursor structures are concurrently brought together with their respective panel edges and the remaining frame precursor structures are attached later or already pre-attached. In some embodiments, two or three of the frame precursor structures may be first attached to each other via a corner joint connection and then attached to the panel. In some cases, a frame precursor structure may initially be brought together with its respective panel edge at an angle rather than flush or parallel. In some cases, the choice of assembly sequence may in part be dependent upon the design of the corner joint and optional corner joint connection to be used. In some embodiments, corners joint connection may, for example, be made using clinching, rivets, screws, nuts/bolts, welding, adhesives, or some other connection method or mechanism. Note that a weld or welding may refer to any type of weld or welding including, but not limited to, gas welding, arc welding, resistance welding, energy beam welding, solid-state welding, friction welding, fusion welding, or some other welding.

In some embodiments, a finished frame (whether made from a continuous piece or from multiple frame section pieces) may further include one or more cross bars that may extend from one frame section to an opposite or adjacent frame section. In some embodiments with respect to a rectangular frame, a cross bar may extend between the two longest opposing frame sections. In some cases, a cross bar may connect two opposing frame sections at about their middle areas. Cross bars may act to strengthen the frame. A cross bar may be connected to the frame at the bottom flange, a frame sidewall, or at some other frame feature including, but not limited to, support walls. In some embodiments, a cross bar structure may include an upper surface upon which the panel may rest or optionally be adhered to.

In some cases, cross bars may be readily attached as part of the panel mounting process (e.g., as discussed in FIGS. 2E and 3). That is, an additional separate step may not be needed in some cases. In some embodiments, the cross bars may be formed of the framework material used for the rest of the frame. In some embodiments, the cross bars may use a different material.

Figure 4A:
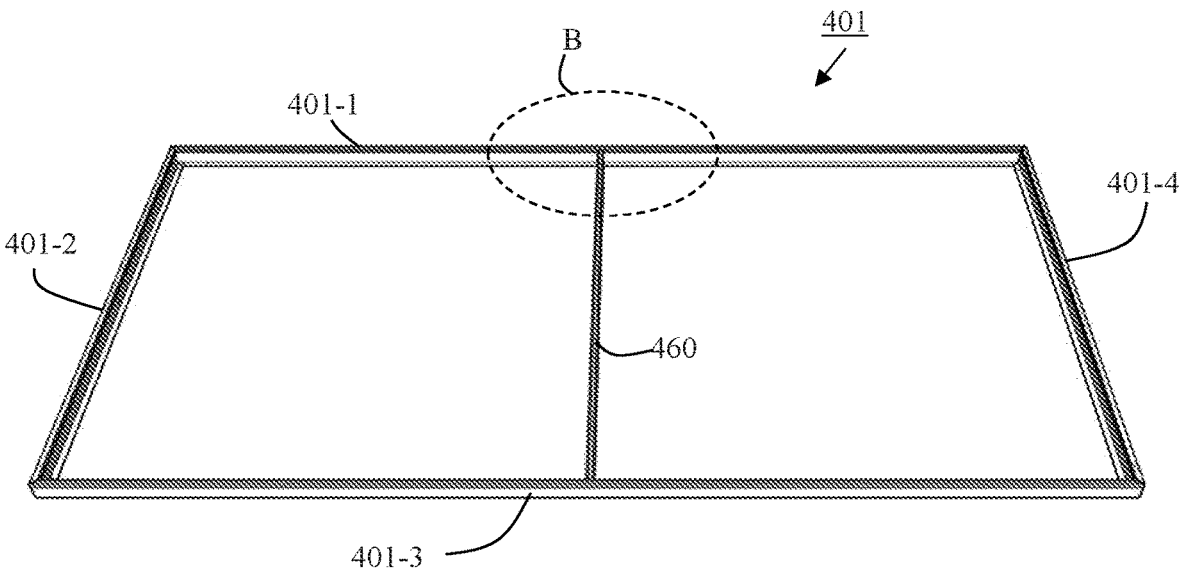
FIG. 4A is a perspective view of a non-limiting example of a frame that includes a cross bar according to some embodiments.

FIG. 4A is a perspective view of a non-limiting example of a frame that includes a cross bar according to some embodiments. For clarity, the framed panel is not shown. In some cases, frame 401 may include a first frame section 401-1, second frame section 401-2, third frame section 401-3, and even fourth frame section 401-4. Cross bar 460 may be connected to opposing frame sections 401-1 and 401-3. In some embodiments, connection may, for example, be made using clinching, crimping, rivets, screws, nuts/bolts, welding, adhesives, or some other connection method or mechanism, or the like.

Figure 4B:
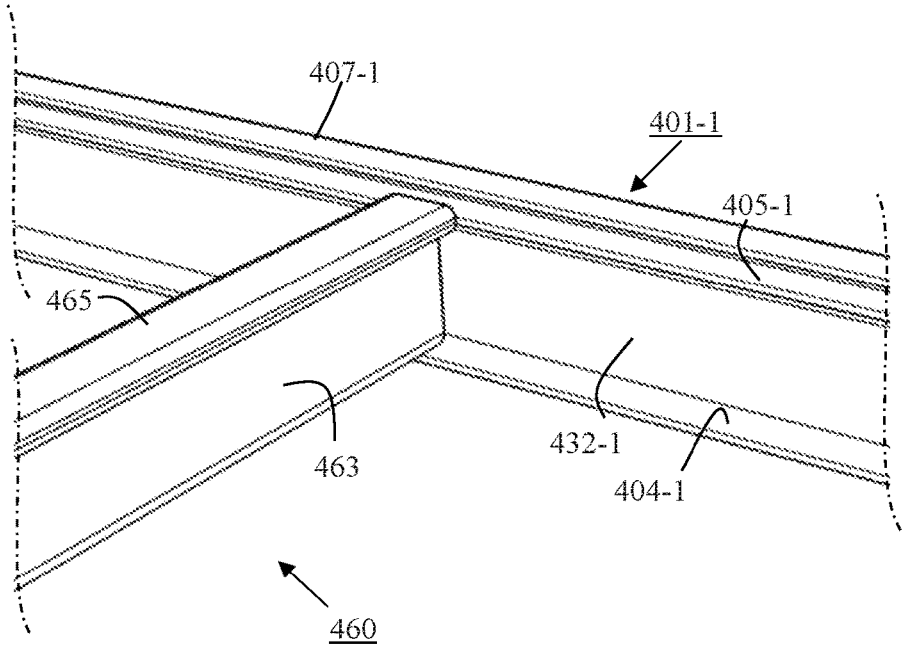
FIG. 4B is a zoomed in view of area B from FIG. 4A according to some embodiments.

FIG. 4B is a zoomed in view of area B from FIG. 4A. In some cases, first frame section 401-1 may optionally have a box frame structure as described below. Frame section 401-1 may, for example, include a bottom flange 404-1, a support wall 432-1, lower shelf 405-1, top lip 407-1, and frame sidewall (not visible in this view). In some embodiments cross bar 460 may include a cross bar top surface 465 and cross bar sidewall 463. Cross bar 460 may optionally have a box type of structure including another sidewall (not visible in this figure) opposite cross bar sidewall 463 and a bottom flange or bottom surface (not visible in this figure) opposite cross bar top surface 465. In some cases, the cross bar top surface 465 may contact the panel and may optionally include an adhesive layer to help secure the panel. In some embodiments, the cross bar top surface 465 may be flush (such as at the same height) with lower shelf 405-1 of the first frame section. In some embodiments, cross bar 465 may be connected to the first frame section at the frame sidewall, bottom flange, support wall, or any combination.

The framework material should have sufficient strength to support the panel. In some embodiments, the framework material may include a metal such as uncoated steel, coated steel, stainless steel, aluminum, or another metal or metal alloy (perhaps coated or uncoated), or the like. In some embodiments, the framework material may be a coated metal such as coated steel or the like that includes an anti-corrosion coating or treatment. For example, coated steel may include metallic-coated steel, organic-coated steel, or tinplate. Some non-limiting examples of metallic coatings for steel may include zinc and zinc alloys (e.g., a Zn—Al alloy), aluminum, magnesium, or the like. Depending on the coating, such metallic coatings may be applied by hot dip galvanization, electro-galvanizing, thermal spray, or the like. Some non-limiting examples of organic coatings may include polyesters or PVDF, which may be applied from a paint or other coatable mixture. Tinplate may be made by coating tin onto the cold-rolled steel, e.g., by electroplating. In some embodiments, the thickness of coated steel for use as a framework material may be in a range of about 0.5 to about 0.6 mm, alternatively about 0.6 to about 0.7 mm, alternatively about 0.7 to about 0.8 mm, alternatively about 0.8 to about 0.9 mm, alternatively about 0.9 to about 1.0 mm, alternatively about 1.0 to about 1.2 mm, alternatively about 1.2 to about 1.4 mm, alternatively about 1.4 to about 1.6 mm, alternatively about 1.6 to about 1.8 mm, alternatively about 1.8 to about 2.0 mm, or any combination or permutation of ranges thereof, or the like. When a coated steel framework material may be used to make a frame for a conventional photovoltaic solar panel, in some embodiments, the thickness may be in a range of about 0.7 to about 1.4 mm.

In some embodiments, steel may be a steel other than stainless steel. For some applications, e.g., for photovoltaic solar panels, steel may have a useful combination of technical and commercial benefits. Steel can have properties that may be applied in the material selection, fabrication, and long-term durability that are useful to the form and function of the frame or frame precursor structure product. During preproduction, steel may be readily coated with anti-corrosion coatings employing multiple chemistries that offer corrosion resistance which can be beneficial to the durability of the frames. Steel may be painted with clear or specific colors that may optionally allow identification of a specific module selection of various categories. Because painting or anti-corrosion coatings may be applied in high-speed manufacturing formats, the cost and durability are more effective than most other metals. Steel may optionally be both painted and have anti-corrosion coatings, allowing for multiple benefits to the branding, module identification, and long-term maintenance over non-steel module frames.

Steel is a highly durable material that may be significantly deformed while retaining its toughness and resistance to structural failure. The properties of toughness while being deformed may be referred to as ductility. Due to the ductility of steel, it may be shaped starting from a thin sheet of material, e.g., wrapped around a coil, which may be fed directly into a punching station that may employ a variety of methods to cut or partially cut or create grooves in the face of the steel sheet. Following this process, the steel which has been modified in the punching station may be fed into a linear and non-linear set of rollers which can deform the steel sheet into a new profile, of which many variations are possible. Due to the ductility of steel, this process may be performed at high speed, with production speeds from less than about 0.1 meters/second to over about 4.0 meters/second. Steel's compatibility with this high-speed forming process may provide significant manufacturing cost advantages. Due to steel's ductility, it may be bent into simple or complex shapes that will retain their relative shape or position for the life of the product. In some embodiments, steel that has been shaped into simple or complex forms may also be designed to yield or partially yield at specific locations or along a predetermined path as part of intended installation or operational parameters.

Steel has electrical properties which may allow it to act as a code-approved path of intended electricity, such as to create an electrical ground or electrical bonding. Due to the properties of steel and the potential anti-corrosion or paint coatings available, the electrical ground or electrical bonding may still occur without the need for additional hardware or devices. When steel module frames are attached directly to a steel structure, most electrical codes allow for this connection to be considered a competent electrical ground or electrical bond. This means that the framed panel structures may connect directly to a steel substructure and may be considered to have achieved sufficient electrical ground or electrical bond sufficient to meet code, with or without addition of hardware, as part of the module-to-substructure attachment.

Steel's magnetic properties may allow for special features and benefits through the use of magnetic steel frames. The magnetic properties of steel may allow for simple attachments of appurtenances utilizing few or no added hardware. Steel's magnetic properties may allow for sensory devices to collect useful data during the manufacture of a frame precursor structure or data regarding a panel installation. Steel's magnetic properties may allow for robot sensors to be used to assist in the proper installation or deinstallation of panel modules. Steel's magnetic properties may allow the easy attachment or pre-attachment of hardware of various sorts to the module frame to facilitate installation of additional equipment.

In some cases, the frame precursor structure may be fabricated from an elongated sheet of the framework material that can be bendable and cuttable. The elongated sheet may be cut, for example, using a water cutter, a laser, a punch, a saw, or the like, depending on the framework material. The cuts may be used to form some of the various features described herein such as notches, holes, furrows or other features. After at least some of the cuts have been made, the elongated sheet may be folded to form at least a portion of the frame precursor structure. Such folding may include, but is not limited to, roll forming. In some embodiments, the cutting and folding processes may be applied to a coated steel-based framework material.

Figure 5:
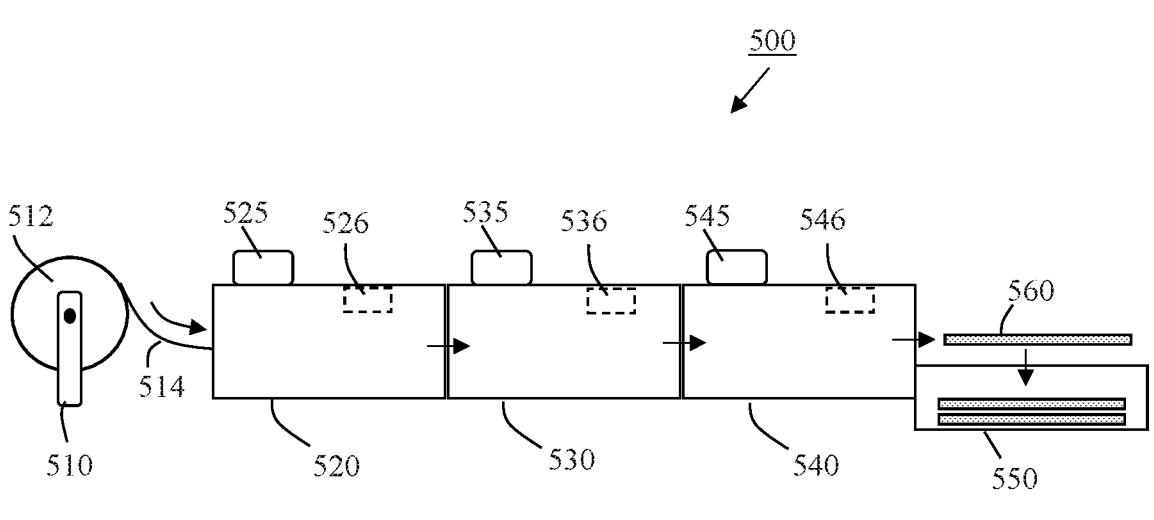
FIG. 5 is a schematic diagram of a non-limiting example of a manufacturing process line for making frame precursor structures according to some embodiments.

FIG. 5 is schematic diagram showing a non-limiting example of a manufacturing process line for making frame precursor structures according to some embodiments. Manufacturing process line 500 may include a framework material station 510 having framework material that may be fed into the next station. In some embodiments, the framework material may be in the form of sheets that are pre-cut to the final desired length. In some embodiments, the framework material may be fed continuously to the next station. For example, framework material station 510 may include a coil 512 of coated steel 514. The coated steel 514 may be supplied to punching station 520. For example, the punching station 520 may pull the coated steel 514 from the coil. In some embodiments, certain cutting and/or punching processes may be performed at punching station 520 to cut and/or remove predetermined sections of the framework material to make a patterned framework material. In some embodiments, the framework material may be cut to a desired length at the punching station, if such cut has not yet been performed. In some embodiments, the process may be controlled to high tolerances. Punching station 520 may include a microprocessor 525 and machine software and/or firmware that may control the cutting. Punching station 520 may include one or more sensors 526 that provide data to the microprocessor which may be used to monitor the punching processes or identify defects. The microprocessor 525 may be in electronic communication with another microprocessor or with an external computer for sending or receiving data or instructions. Such electronic communication may be through cables or wireless methods.

After the punching station 520, the patterned framework material, e.g., coated steel or the like, may be received by a roll forming station 530. The steel may be shaped in a linear fashion using multiple rollers that provide a graduated bending process to form the steel into the desired shape such as shaped framework material. The design of the rollers, order of the rollers, and tolerances may be highly precise, and may result in a fully, or even nearly fully, shaped and punched frame precursor structure. Roll forming station 530 may include a microprocessor 535 and machine software and/or firmware that may control the roll forming. Roll forming station 530 may include one or more sensors 536 that provide data to the microprocessor which may be used to monitor the bending and folding processes or identify defects. The microprocessor 535 may be in electronic communication with another microprocessor or with an external computer for sending or receiving data or instructions. Such electronic communication may be through cables or wireless methods. In some embodiments, the framework material may be cut to a desired length at the roll forming station, if such cut has not yet been performed. In some embodiments, the roll forming station may include an adhesive applicator tool to apply an appropriate adhesive to a predetermined portion of the framework material while shaping framework material, e.g., to help the shaped framework material to maintain its shape.

After the roll forming station 530, the shaped framework material, e.g., coated steel, may be received by a post forming station 540. Some non-limiting examples of post forming processes may include cutting the frame precursor structures to length, buffing/deburring, cleaning, or even passing the frame precursor structures through straightening rollers or dies that may ensure product accuracy. Post forming station 540 may include a microprocessor 545 and machine software and/or firmware that may control one or more post forming processes. Post forming station 540 may include one or more sensors 546 that provide data to the microprocessor which may be used to monitor the post forming processes or identify defects or out-of-tolerance parts. These data may be fed back to roll forming station 530 for active adjustment of roll forming rollers or adjustment rollers. Post forming station 540 may include a cleaning section. The microprocessor 545 may be in electronic communication with another microprocessor or with an external computer for sending or receiving data or instructions. Such electronic communication may be through cables or wireless methods.

After the post forming station 540, finished, or even nearly finished, frame precursor structures 560 may be received by a finished product station 550. The frame precursor structures may be loaded into transportation containers and prepared for delivery, e.g., to a solar panel module production facility.

In some embodiments, the framework material may proceed in a generally linear, perhaps forward, direction from one station to the next. In some embodiments, the direction of framework material may be temporarily reversed within a station, for example, to repeat a particular step. In some embodiments, there may be multiple punching stations, roll forming stations, and/or post forming stations.

For any of the aforementioned stations, the microprocessor(s) may provide control signals to electro-mechanical motors that may be responsible for moving the intermediate products along the manufacturing line. Depending upon the process to be performed on the intermediate products, software/firmware running on the microprocessor(s) may dictate various factors/parameters of production. For merely some non-limiting examples, a microprocessor may dictate the speed and/or direction of the intermediate products traversing a given station. In some embodiments, a microprocessor may dictate when and/or how the intermediate products are to be shaped, punched, cut, or the like in order to affect the desired intermediate/final products. In some embodiments, a microprocessor may receive signals from one or more sensors for monitoring manufacturing progress, identifying defects or out-of-tolerance parts, or measuring some other useful property of intermediate products as they are made. For example, an optical or imaging sensor(s) may provide data that allows a microprocessor to assess manufacturing status and/or how well a particular production step was performed. In some embodiments, if quality is below standard, a microprocessor may send a status alert signal to a system operator and/or to another microprocessor. Other sensors may also be useful to monitor manufacturing status and/or quality control metrics. In addition to optical and imaging sensors, non-limiting examples of potentially useful sensors or their components may include laser-based sensors including, but not limited, to laser position sensors, vision systems including, but not limited to vision measurement and shape vision systems, contact sensors including, but not limited to contact position sensors, vibration sensors, thermal sensors, conductivity sensors, roughness sensors, profilometers, ultrasonic sensors, stress sensors, or the like.

In some embodiments, the frame or framed panel structure may be attached to a support structure that may hold the frame or framed panel structure in a predetermined position. Such support structures and systems may take many forms, but some non-limiting examples may include racking, rail mounts, pole mounts, tracking mounts, or non-tracking mounts, or the like. In combination with a support structure, a frame or framed panel structure may be attached to its intended target, including but not limited to, attachment to a building (e.g., a roof, a wall, an awning, or the like), to the ground, to a shade structure or carport, or to a moving or stationary vehicle. In some embodiments, a frame or framed panel structure may be attached directly to its intended target without an intermediate support structure. In such case, the target itself may act as the support structure.

To provide robust support and strength to the framed panel such as a solar panel, it may be useful for the frame to include one or more connection features, for example, when forming a corner joint between frame precursor structures or sections. For the purposes of describing various features and technology below, a frame, a frame precursor structure, and a frame section may be used interchangeably unless otherwise noted. In some cases, the frame may also include additional strengthening features such as cross bars that may extend from one frame section to an opposite or adjacent frame section. These additional strengthening features may also benefit from the use of one or more connection features. Similarly, in some embodiments, certain connection features may be used to attach a framed panel structure to a support structure such as racking.

In some embodiments, the frame or frame sections illustrated in FIGS. 1-3 may benefit from additional structural support features, such as frame support substructures, perhaps to improve the strength of the frame in some way to address various forces it may experience when used in a framed panel structure. For example, such additional support may enable the frame to hold larger panels (e.g., PV laminates), withstand greater environmental and/or handling forces (e.g., wind, snow, mounting, clamping, bending, torsional stresses, or the like), or increase PV module lifetime by reducing the number or intensity or of stress points, or improving their distribution. In some cases, structural support features may enable the use of framework materials that are thinner, easier to handle, or less expensive.

In some embodiments a useful structural support feature, such as a frame support substructure, may include a support wall extending (i) between the bottom flange and the frame sidewall, (ii) between the bottom flange and the lower shelf, or (iii) both (i) and (ii). In some cases, a frame or frame section including a support wall, bottom flange, sidewall, and lower shelf, may be advantageously produced from a single piece of framework material. In some cases, using a single piece of framework material for these features may simplify manufacturing thereby reducing costs and increasing throughput and yield. Such single piece manufacturing may also increase the lifetime of the frame by avoiding the many failure-prone attachments points that would be needed if these features were assembled from separate parts.

Figure 6A:
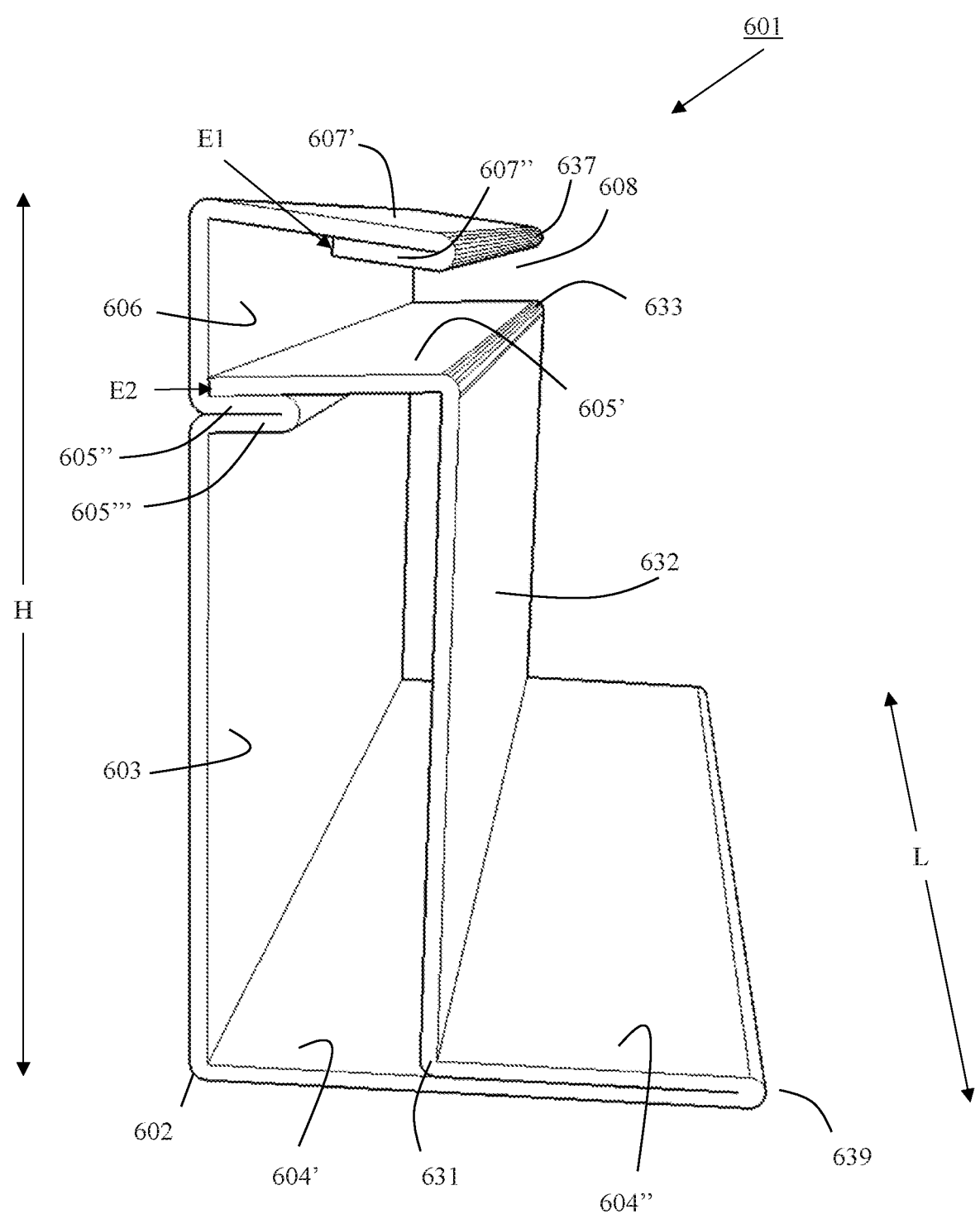
FIG. 6A is a perspective view of a cutaway portion of a non-limiting example of a frame section including a support wall according to some embodiments.
Figure 6B:
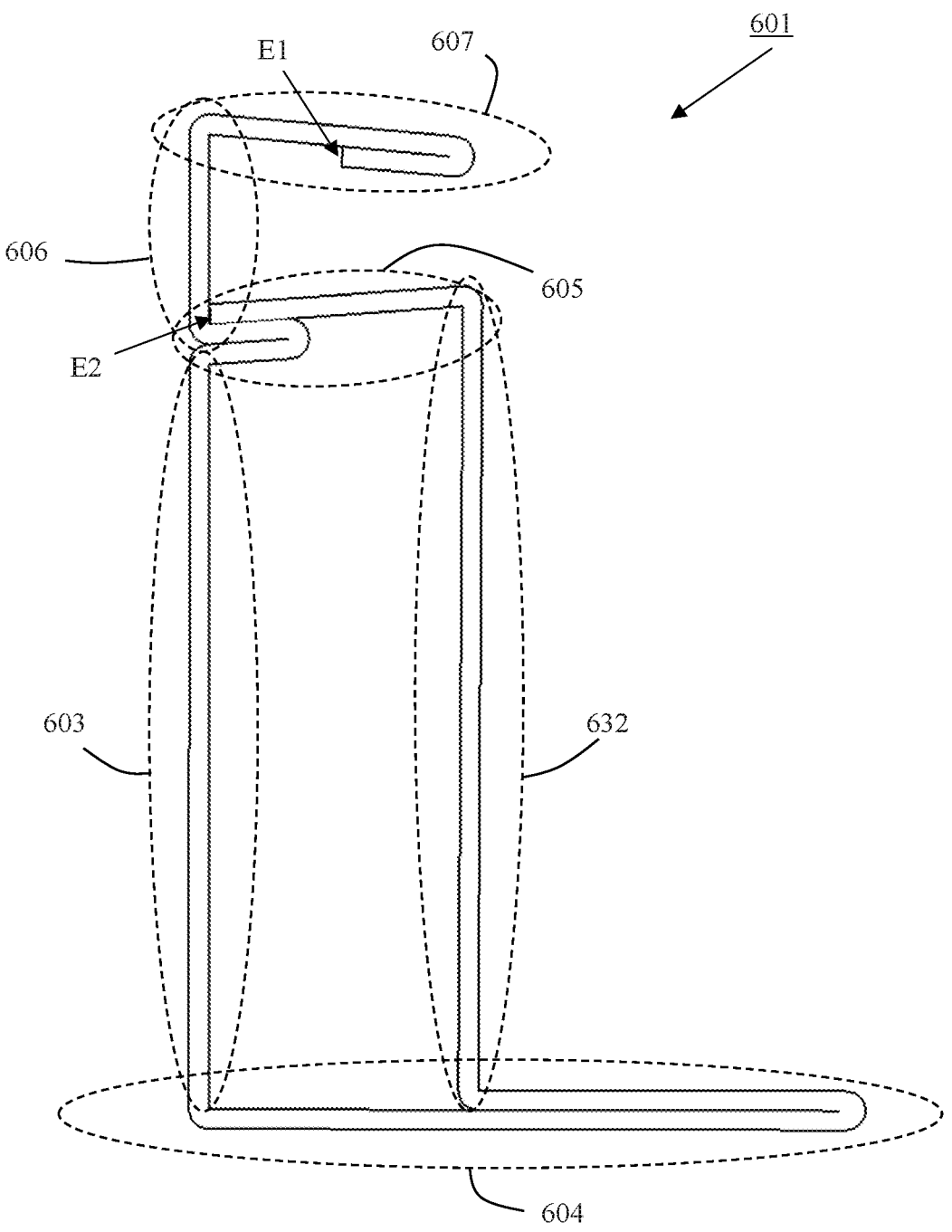
FIG. 6B is a cross-sectional view of the frame section from FIG. 6A according to some embodiments.

There are many embodiments of useful frame sections that include a support wall. FIG. 6A is a perspective view of a cutaway portion of a non-limiting example of a frame section including a support wall according to some embodiments. The height H and lengthwise L axes are also shown for reference. FIG. 6B is a cross-sectional view of the frame section from FIG. 6A, but labelled in a modified manner to clarify that any of the features may include multiple layers of framework material. Frame section 601 may include a framework material that has been cut and folded into a desired shape. Frame section 601 may include a bottom flange 604 provided at the base of the frame section, which in some embodiments may include multiple layers of framework material such as bottom flange layers 604' and 604". A frame sidewall 603 may be provided at an outer portion of the frame section and characterized by a height extending from the bottom flange. In some embodiments, a lengthwise fold 602 may define an intersection of the frame sidewall 603 and the bottom flange 604, e.g., with bottom flange layer 604'. In some embodiments, the lengthwise fold 602 may correspond to the bottom or base of the frame sidewall 603. In some cases, the bottom of the frame sidewall may correspond to the end furthest from the panel containment structure. Although this may correspond to fold 602 in some embodiments, in alternative designs not illustrated in this figure, a frame sidewall may extend below at least a portion of the bottom flange. However, in general, at least a portion of the frame sidewall may extend upwards above the bottom flange. A panel containment structure may be provided at an upper portion of the frame sidewall. The panel containment structure may include at least a lower shelf 605 extending from the frame sidewall and may also include a pocket wall 606, a top lip 607, and perhaps even a pocket region 608 for containing the panel. In some embodiments, some or all of the lower shelf 605 may include multiple layers of framework material, such as lower shelf layers 605', 605", 605'". In some embodiments, two or more lower shelf layers may be formed from a fold in the framework material at the upper portion of the frame sidewall. In some cases, the lower shelf layers 605" and 605'" formed from the fold in framework material at the upper portion of the frame sidewall may be characterized as a panel containment support feature, upon which lower shelf layer 605' rests. In some embodiments, the top lip may be formed of multiple layers of framework material, such as top lip layer 607' and top lip layer 607" which may be formed from a top lip fold 637 to form a multilayered rounded top lip edge. A support wall 632 may be provided at an inner portion of the frame section (inner relative to the frame sidewall). In some embodiments, the support wall 632 may extend between the bottom flange and the lower shelf. In some embodiments, the frame section may include a reversing flange fold 639 such that a portion 604' of the bottom flange may include a double layer of framework material. In some embodiments, another lengthwise fold 631 may define an intersection of the support wall 632 with the bottom flange structure, e.g., with portion 604'. In some cases, a lengthwise fold 633 may define an intersection of the support wall with the lower shelf 605.

Figure 6C:
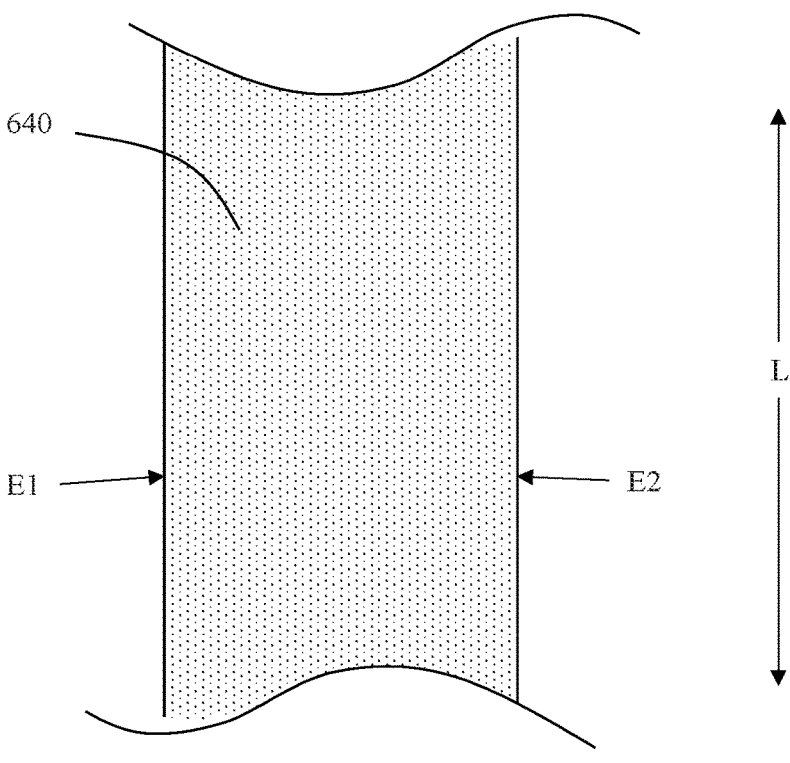
FIG. 6C is a plan view of a non-limiting example of a portion of framework material according to some embodiments.

FIG. 6C is a plan view of a non-limiting example of a portion of framework material 640 prior to any cutting, punching, or folding operations that may be used to make the frame section 601. The lengthwise dimension of the framework material is illustrated as are a first edge E1 and second edge E2, which are also labelled in FIGS. 6A and 6B. In some embodiments, such as shown in FIGS. 6A and 6B. E1 may correspond to the end of top lip layer 607" and E2 may correspond to the end of lower shelf layer 605'.

Figure 6D:
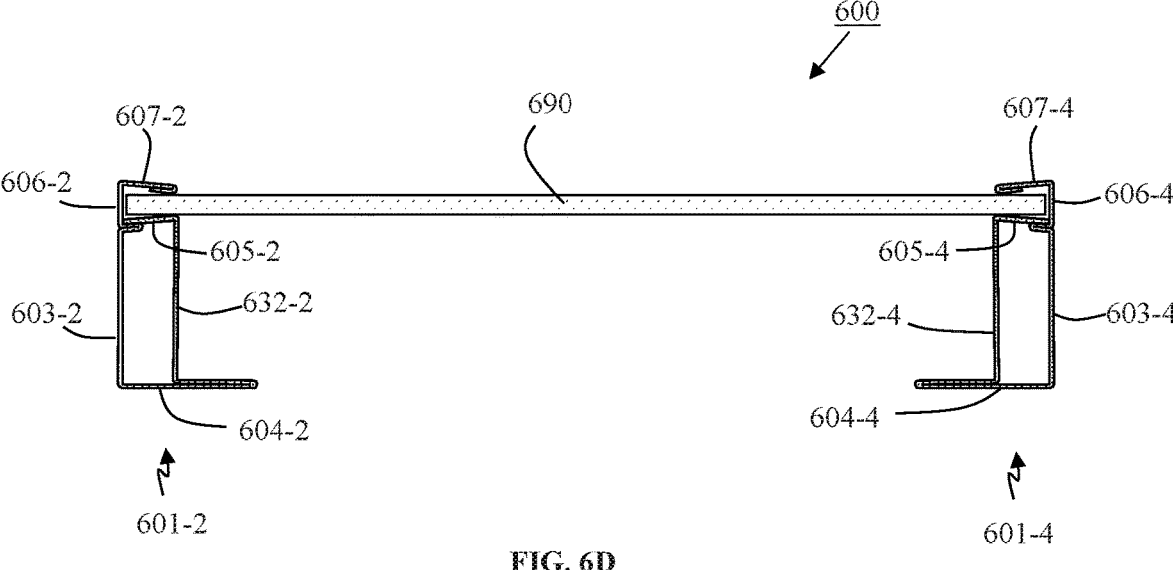
FIG. 6D is a cross-sectional view of a non-limiting example of a framed panel structure according to some embodiments.

FIG. 6D is a cross-sectional view of a non-limiting example of a framed panel structure according to some embodiments. Framed panel structure 600 may include various frame sections as previously discussed, e.g., frame section 601-2 and opposing frame section 601-4. In some embodiments, each frame section may include a frame sidewall 603-2, 603-4, a bottom flange 604-2, 604-4, a lower shelf 605-2, 605-4, a pocket wall 606-2, 606-4, a top lip 607-2, 607-4, and a support wall 632-2, 632-4. The panel 690 may be received onto each lower shelf, e.g., into a portion of each pocket region (perhaps formed by the lower shelf, the pocket wall, and the top lip) and secured in place, optionally with a sealant that may have adhesive properties (not shown). The frame sidewall of a frame section may be characterized as provided at an outer portion of the frame section whereas the support wall of the same frame section may be characterized as provided at an inner portion of the frame section. An outer portion, in some embodiments may include relative to the support wall position, the frame sidewall may be generally provided further from the center of the panel. An inner portion, in some embodiments may be relative to the frame sidewall position, the support wall may be generally provided closer to the center of the panel. An outer portion and inner portion may be relative terms with respect to the frame sidewall and support wall, and do not necessarily mean the outermost part or innermost part of a frame section (although that may be the case in some embodiments).

Frames or frame precursor structures having a frame section like FIG. 6A or 6B may sometimes be referred to herein as a box frame, perhaps where the bottom flange, frame sidewall, lower shelf and support wall collectively form in cross-section an enclosed structure, in this case, one having four sides. However, a box frame may apply to any frame section that in cross section forms any enclosed shape. In some embodiments, the enclosed shape may involve at least the bottom flange, the frame sidewall, and the support wall, and have three or more apparent sides in cross section.

Although not shown in FIGS. 6A-6D, in some embodiments, a panel containment structure may only include a lower shelf 605. In some cases, a panel containment structure may include a pocket wall 606 but not include a top lip 607.

In some embodiments, the frame or framed panel structure may be attached to a support structure that may hold the frame or framed panel structure in a predetermined position. Such support structures and systems may take many forms, but some non-limiting examples may include racking, rail mounts, pole mounts, tracking mounts, or non-tracking mounts, or the like. In combination with a support structure, a frame or framed panel structure may be attached to its intended target, including but not limited to, attachment to a building (e.g., a roof, a wall, an awning or the like), to the ground, to a shade structure or carport, or to a moving or stationary vehicle. In some embodiments, a frame or framed panel structure may be attached directly to its intended target without an intermediate support structure. In such case, the target itself may act as the support structure.

Figure 7A:
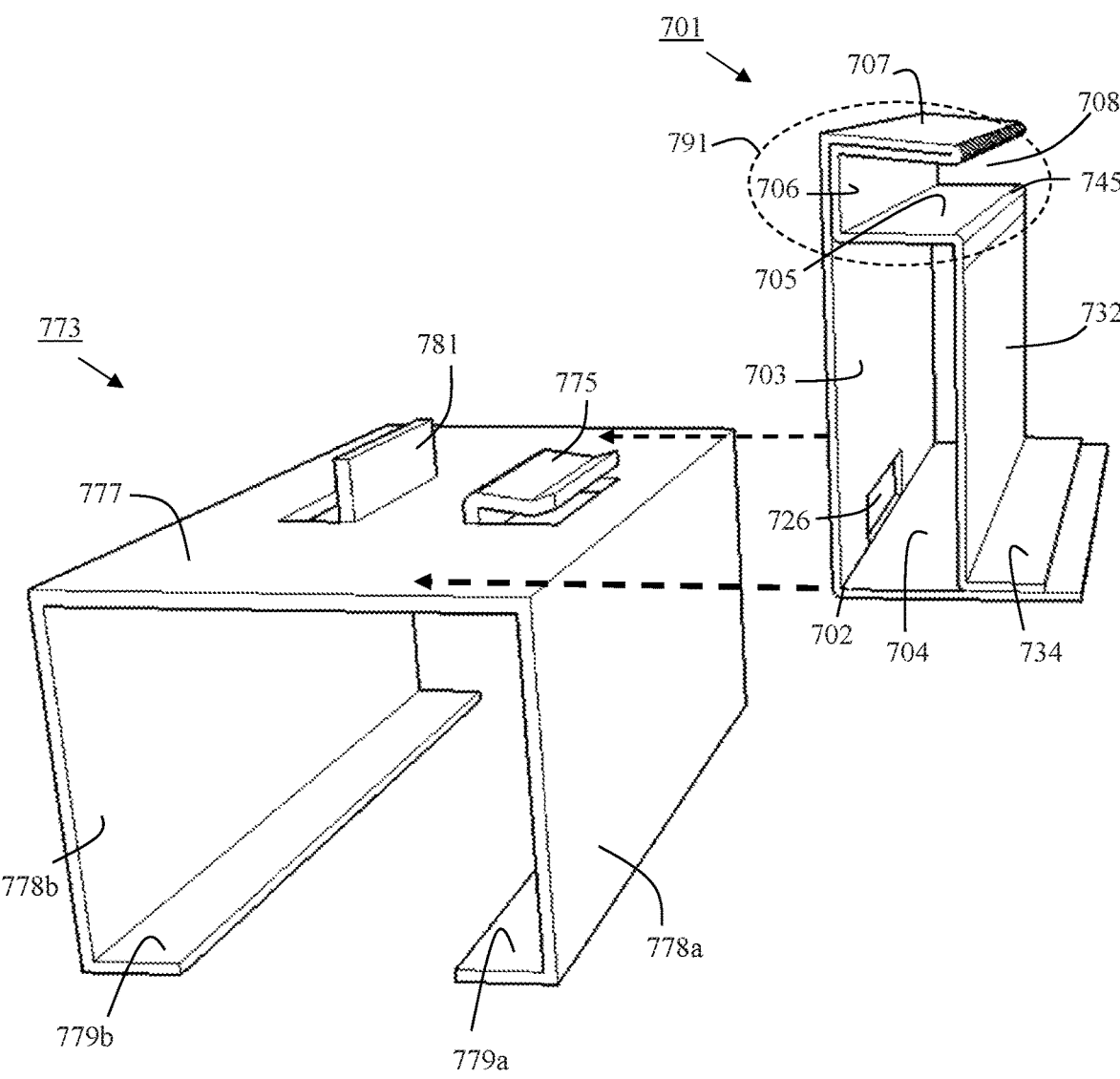
FIG. 7A is a perspective view of a cutaway portion of a non-limiting example of a frame section and a support structure according to some embodiments.

In some embodiments, a mounting system for a framed panel structure may include a frame section having an opening in its sidewall and a support structure having an attachment feature that extends through the wall opening and engages the frame. In some cases, such a mounting system, structure, or method may be referred to as a "side-mount". FIG. 7A is a perspective view of a cutaway portion of a non-limiting example of a frame section and a support structure according to some embodiments. Frame section

701 may include a framework material that has been cut and folded into a desired shape. Frame section 701 may include a lengthwise fold 702 that may define an intersection of a frame sidewall 703 with a bottom flange 704. In some embodiments, the lengthwise fold 702 may correspond to the bottom or base of the frame sidewall 703. The frame section may further include a series of folds that may form a panel containment structure 791 that may include at least a lower shelf 705, an optional pocket wall 706, an optional top lip 707, and perhaps even a pocket region 708. The frame section may include a lengthwise fold 745 that may define an intersection of the lower shelf 705 and a support wall 732. Frame section 701 may be considered to have a box frame structure. The support wall may extend from the lower shelf 705 to, and may engage with, the bottom flange 704, for example, at least a portion of the support wall may be held in place with respect to the bottom flange, by friction, geometry, spring forces, locking features, crimping, clinching, welding, adhesives, rivets, bolts, screws, or the like. The support wall may provide additional structural stability to the frame. The support wall may include an end flange 734 that may be flush with the bottom flange 704 and which may assist engaging the support wall with the bottom flange. The end flange and bottom flange together may represent a bottom flange having multiple layers of framework material. The frame sidewall may include a first wall opening 726. The panel (not shown for clarity) may engage with the panel containment structure and secured in place, optionally with a sealant that may have adhesive properties.

The support structure 773 may in some embodiments be a racking rail or a rail mount or the like. In some embodiments, support structure 773 may include an upper surface 777 formed of a support structure material. The upper surface 777 may be characterized by an upper surface plane. The upper surface 777 may be attached to support sidewalls 778a, 778b. The support structure may include support flanges 779a, 779b at the base of the support sidewalls. An attachment feature 775 may be provided as part of the support structure, for example, on the upper surface 777. At least a portion of the attachment feature may be positioned above the upper surface plane. In some embodiments, support structure 773 may include a mounting feature 781 that may be used for mounting a separate framed panel structure as discussed elsewhere herein. Although shown as generally flat, an upper surface and even an upper surface plane may in some embodiments have a non-flat structure or even a rounded shape or the like. In such case, an upper surface plane may correspond to a plane at the highest point or even an area where a frame section base may rest on the support structure, and which plane may be approximately parallel to the intended plane of a panel. An attachment feature may extend above an upper surface and may extend into a wall opening to engage a frame.

As indicated by the dashed arrows, in some embodiments, the frame section 701 may be attached to support structure 773 by providing relative motion so that the frame slides over the frame over upper surface 777 such that the attachment feature 775 may extend through first wall opening 726 and engages the frame to hold it in a desired position. In some embodiments, engagement of the attachment feature with the frame may include friction, spring forces, locking features, geometry, crimping, clinching, welding, adhesives, rivets, bolts, screws, or the like. In some embodiments, the engagement may allow some limited movement between the frame and support structure that may be useful when aligning and attaching the opposite side of the framed panel structure to another support structure. For example, a side-mount system may have a high (e.g., wide) tolerance for alignment and at least initial assembly, but a mounting system on the opposing side of the panel may have a low (e.g., narrow) tolerance for alignment. In some embodiments, engagement may include an initial engagement followed by a secondary engagement. The secondary engagement may increase the engagement strength and/or reduce relative motion between the frame and the support structure as compared to the initial engagement. In some non-limiting examples, an initial engagement may utilize friction, spring forces, locking features, geometry, or the like and a secondary engagement may include crimping, clinching, welding, adhesives, rivets, bolts, screws, or the like.

Figure 7B:
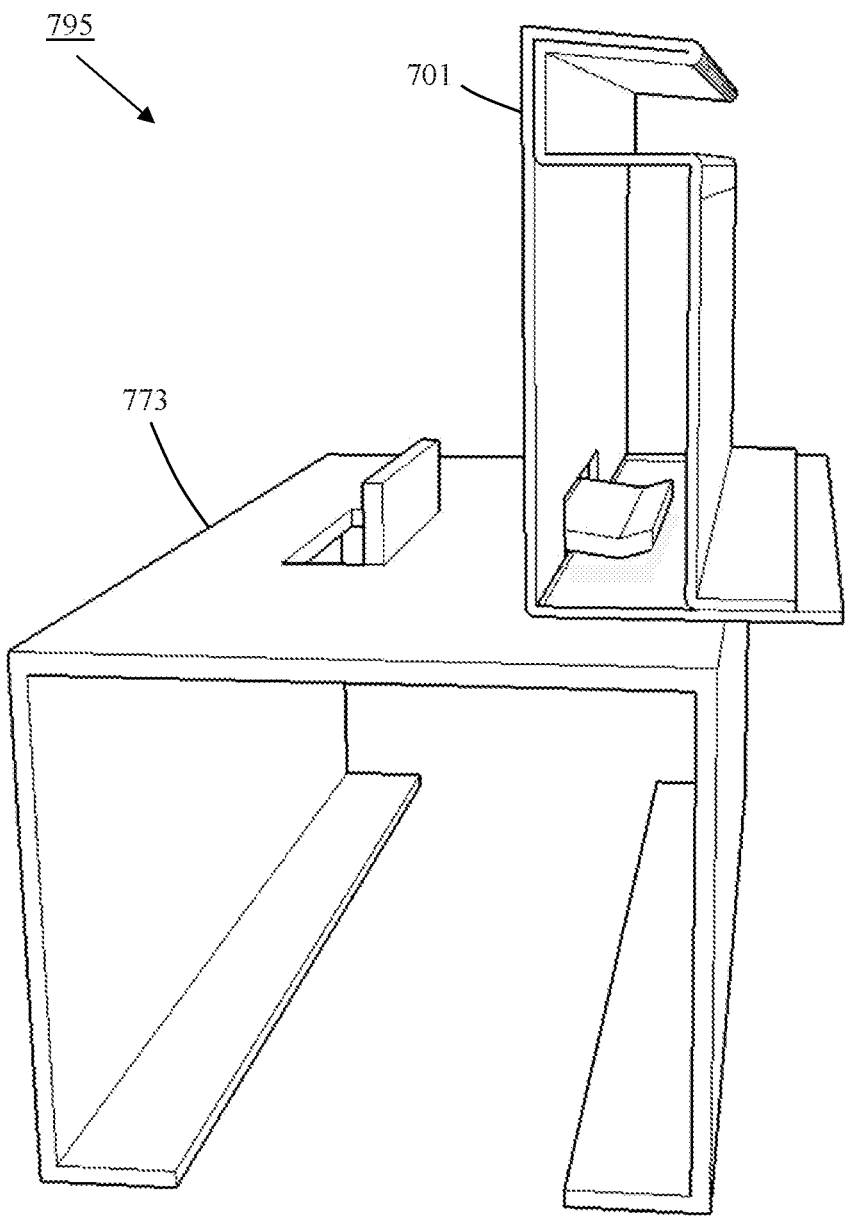
FIG. 7B is a perspective view of a cutaway portion of a non-limiting example of a mounted frame structure according to some embodiments.

FIG. 7B illustrates the frame and the support structure from FIG. 7A, but with the frame now attached or mounted to the support structure (mounted frame structure 795) according to some non-limiting example embodiments. For clarity the part numbers are generally not labelled.

In some embodiments, the attachment feature may be formed in part or entirely from the support structure material. For example, a portion of the upper surface may be cut and folded to form the attachment feature. In some embodiments the attachment feature may be formed in part or entirely from a separate piece of attachment material that is mounted to the support structure, e.g., by welding, adhesives, crimping, clinching, bolts, screws, press-fitting, or the like. In some cases, an attachment feature may be a clamp mounted to the support structure and having a portion that may extend into the frame sidewall opening. In some embodiments, an attachment feature may be mounted to, or formed from, some part of the support structure other than the upper surface. In some embodiments, the attachment feature may form a gap with the upper surface plane that is about equal or less than the thickness of the framework material. In some cases (not illustrated in FIG. 7A or 7B), the first wall opening may be spaced above the bottom of the frame side wall and the attachment feature may form a gap with the upper surface plane that is about equal to or less than the distance between the upper surface plane and the bottom of the first wall opening.

Figure 8:
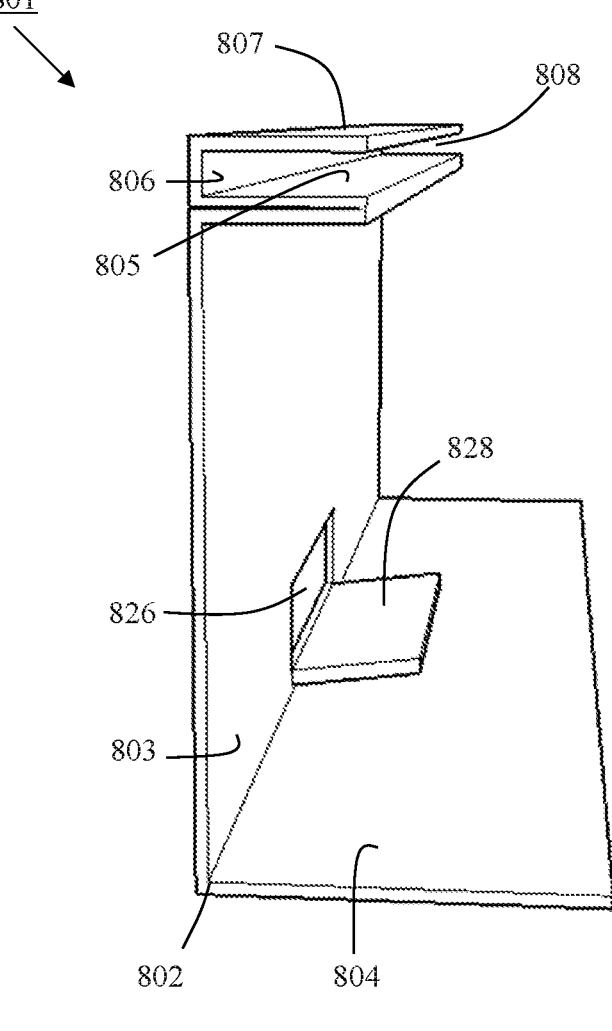
FIG. 8 is a perspective view of a cutaway portion of a non-limiting example of a frame section according to some embodiments.

In some embodiments, the frame section may include a flap that may be engaged by the attachment feature. FIG. 8 is a perspective view of a cutaway portion of a non-limiting example of a frame section according to some embodiments. Frame section 801 may include a framework material that has been cut and folded into a desired shape. Frame section 801 may include a lengthwise fold 802 that may define an intersection of a frame sidewall 803 with a bottom flange 804. In some embodiments, the lengthwise fold 802 may correspond to the bottom or base of the frame sidewall 803. The frame section may further include a series of folds that may form a panel containment structure that includes a lower shelf 805, an optional pocket wall 806, an optional top lip 807, and perhaps even a pocket region 808. The frame sidewall may include a wall opening 826 and a flap 828. In some embodiments, flap 828 may be formed, for example, by cutting and folding down a portion of the frame sidewall 803 when forming the wall opening 826. The panel (not shown for clarity) may engage with the panel containment structure and secured in place, optionally with a sealant that may have adhesive properties. In some embodiments, the flap 828 may engage with the attachment feature of a support structure (not shown in FIG. 8).

FIGS. 9A-9J are cross-sectional views illustrating just a few non-limiting examples of attachment features on support structures and their engagement with frames to form mounted frame structures according to some embodiments.

Figure 9A:
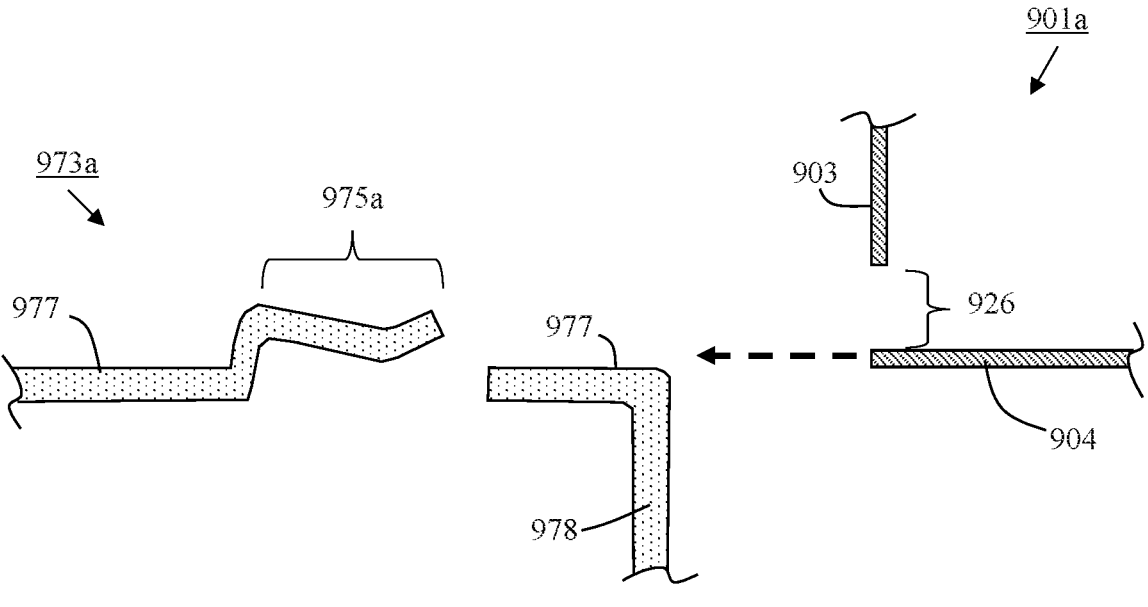
FIGS. 9A-9J are cross-sectional views illustrating non-limiting examples of attachment features on support structures and their engagement with frames to form mounted frame structures according to some embodiments.
Figure 9B:
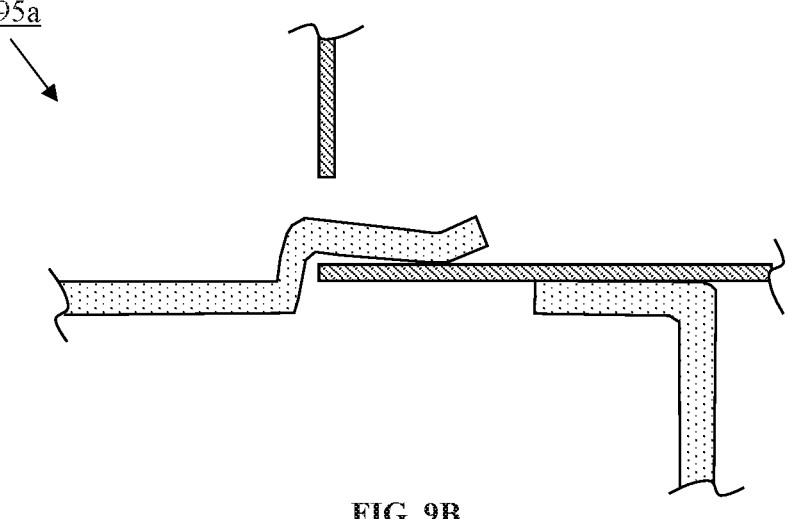

FIG. 9A shows a frame section 901a which may have sidewall 903, bottom flange 904, and wall opening 926. Also shown is support structure 973a, which may include an upper surface 977, support sidewall 978, and attachment feature 975a. At least a portion of the attachment feature 975a may be positioned above the upper surface plane, but in some embodiments, may be bent slightly downward toward the upper surface plane. Attachment feature may optionally include a second bend so that its end portion may be directed slightly away from the upper surface plane. As shown in FIG. 9B, when frame 901a may be moved into place (as indicated by the dashed arrow in FIG. 9A) to form mounted frame structure 995a, the attachment feature may be forced slightly upwards by the bottom flange thereby providing a spring force and/or friction that may assist in engaging the frame. For clarity, the various frame and support structure features are not labelled in FIG. 9B but can be understood from FIG. 9A.

Figure 9C:
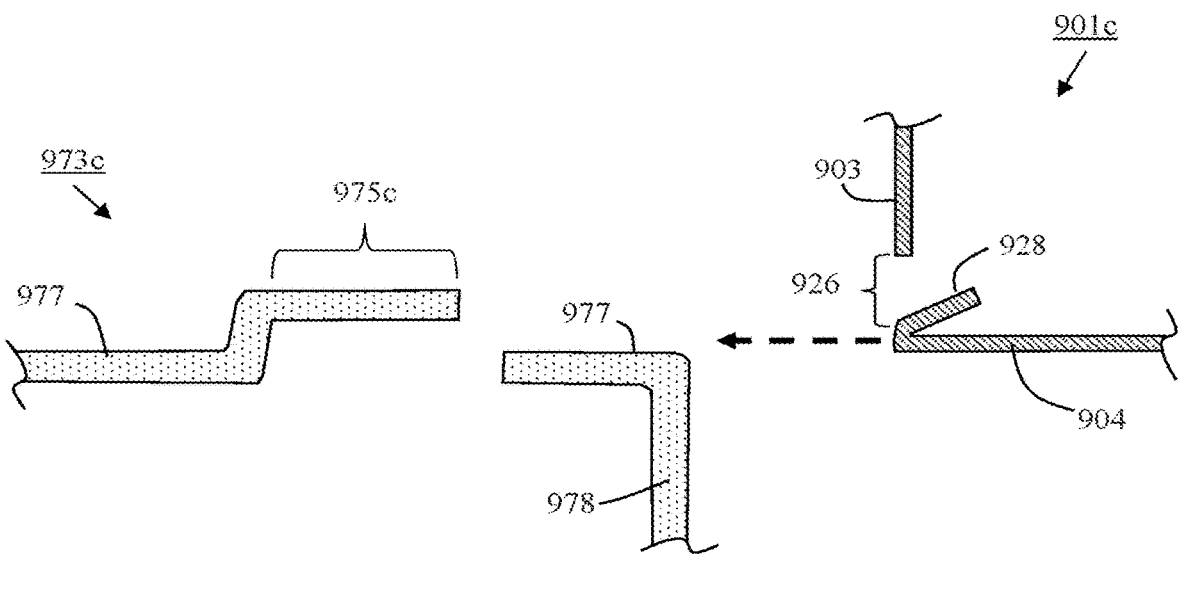
Figure 9D:
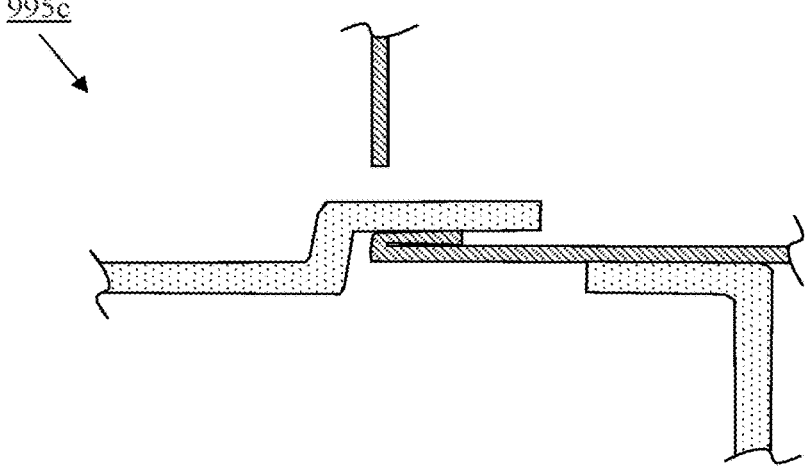

FIG. 9C shows a frame 901c which may have sidewall 903, bottom flange 904, wall opening 926, and flap 928. Also shown is support structure 973c, which may include an upper surface 977, support sidewall 978, and attachment feature 975c. At least a portion of the attachment feature 975c may be positioned above the upper surface plane. As shown in FIG. 9D, when frame 901c may be moved into place (as indicated by the dashed arrow in FIG. 9C) to form mounted frame structure 995c, the attachment feature may force the flap downwards thereby providing a spring force and/or friction that may assist in engaging the frame. For clarity, the various frame and support structure features are not labelled in FIG. 9D but can be understood from FIG. 9C.

Figure 9E:
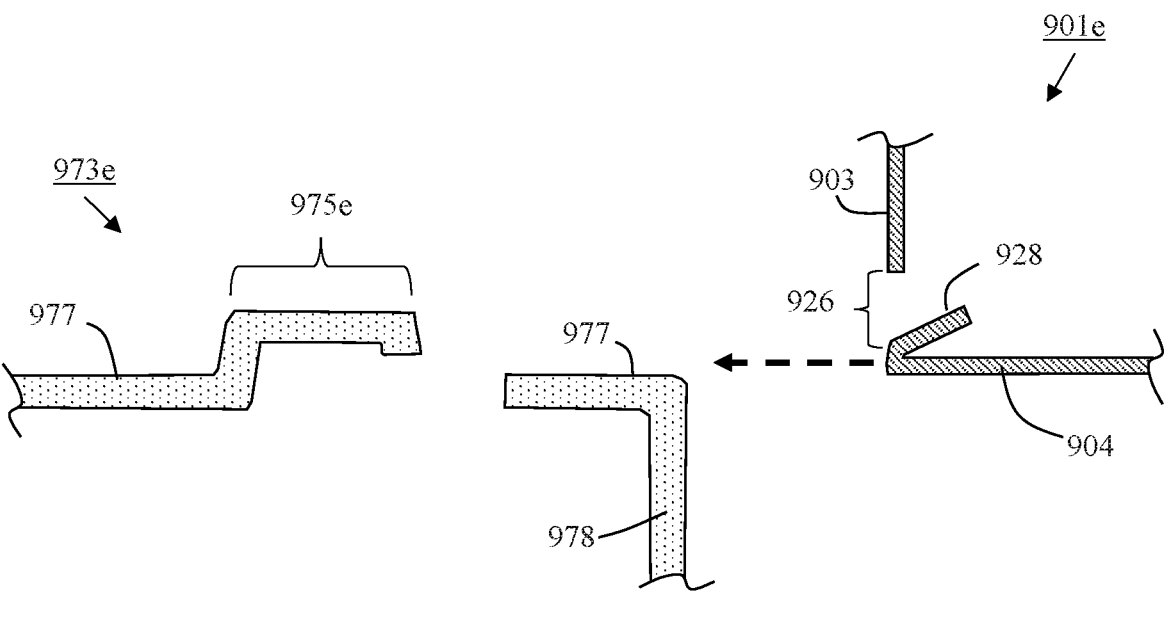
Figure 9F:
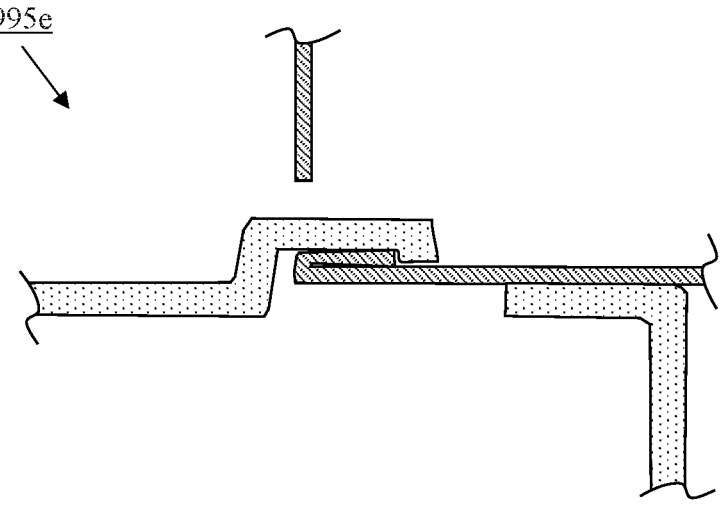

FIG. 9E shows a frame section 901e which may have sidewall 903, bottom flange 904, wall opening 926, and flap 928. Also shown is support structure 973e, which may include an upper surface 977, support sidewall 978, and attachment feature 975e. At least a portion of the attachment feature 975e may be positioned above the upper surface plane. In some embodiments, attachment feature 675e may include a lip at its end. As shown in FIG. 9F, when frame section 901e may be moved into place (as indicated by the dashed arrow in FIG. 9E) to form mounted frame structure 995e, the attachment feature lip may catch the end of flap 928 (which may also be forced downwards) and may thereby lock the frame in place in addition to potentially providing a spring force and/or friction that may assist in engaging the frame. For clarity, the various frame and support structure features are not labelled in FIG. 9F but can be understood from FIG. 9E.

Figure 9G:
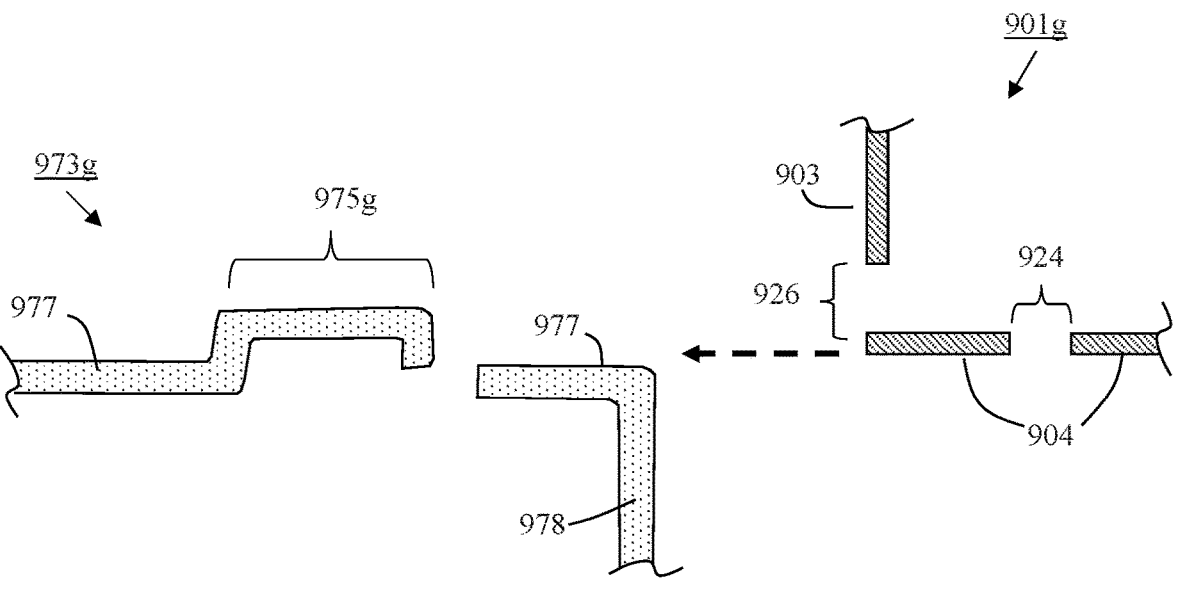
Figure 9H:
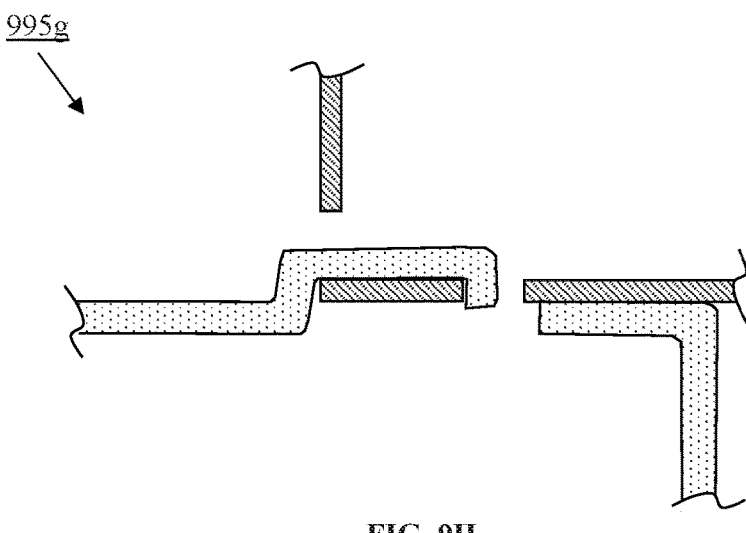

FIG. 9G shows a frame section 901g which may have sidewall 903, bottom flange 904, and wall opening 926, and an opening 924 in bottom flange 904. For example, the opening 924 may be a hole or even a slot that has been cut or even punched in the bottom flange. Also shown is support structure 973g, which may include an upper surface 977, support sidewall 978, and attachment feature 975g. At least a portion of the attachment feature 975g may be positioned above the upper surface plane. In some embodiments, attachment feature 975g may include a hook or similar feature at its end. As shown in FIG. 9H, when frame section 901g may be moved into place (as indicated by the dashed arrow in FIG. 9G) to form mounted frame structure 995g, the attachment feature hook (or similar feature) may slip into opening 924 and may thereby lock the frame in place in addition to potentially providing a spring force and/or friction that may assist in engaging the frame. For clarity, the various frame and support structure features are not labelled in FIG. 9H but can be understood from FIG. 9G.

Figure 9I:
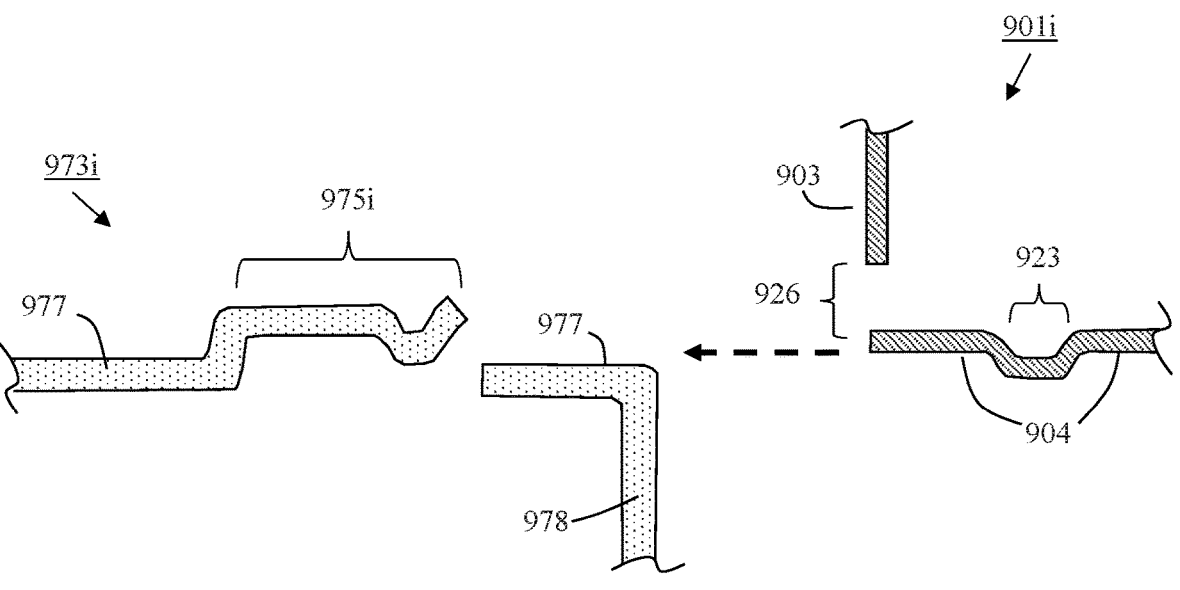
Figure 9J:
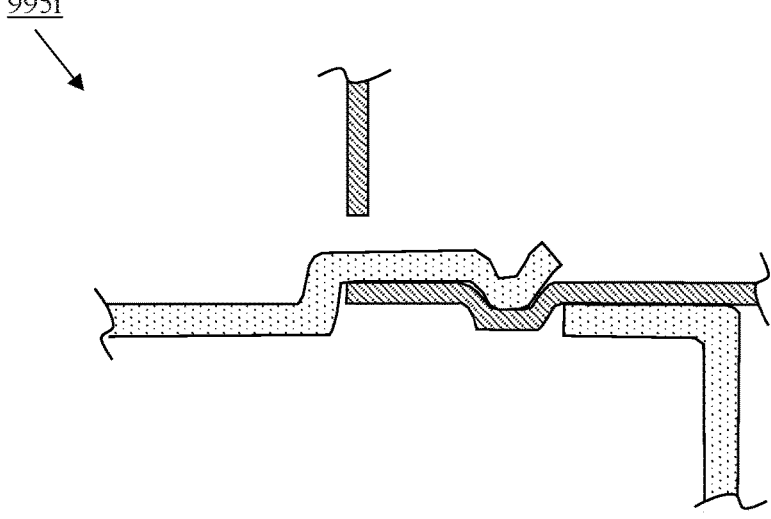

FIG. 9I shows a frame section 901*i* which may have sidewall 903, bottom flange 904, and wall opening 926, and a depression 923 in bottom flange 904. For example, the depression 923 may be a pit or a trench or the like that has been formed in the bottom flange. Also shown is support structure 973*i*, which may include an upper surface 977, support sidewall 978, and attachment feature 975*i*. At least a portion of the attachment feature 975*i* may be positioned above the upper surface plane. In some embodiments, attachment feature 975*i* may include a plug or similar feature that may optionally mirror the shape of depression 923. As shown in FIG. 9J, when frame section 901*i* may be moved into place (as indicated by the dashed arrow in FIG. 9I) to form mounted frame structure 995*i*, the attachment feature plug (or similar feature) may slip into depression 923 and may thereby lock the frame in place in addition to potentially providing a spring force and/or friction that may assist in engaging the frame. For clarity, the various frame and support structure features are not labelled in FIG. 9J but can be understood from FIG. 9I.

In some embodiments, successful engagement of an attachment feature with the frame may include audible, haptic, or other sensory feedback to the assembler, or the like. As a non-limiting example, a hook passing over the top of a flap and then springing into place as a latch may cause a sound or vibration that signals the assembler of proper attachment. In some embodiments, the side-mount system may include features that may be easily identified or even tracked by internal or external sensors to signal when proper engagement has been achieved. Some non-limiting examples of such sensors may include optical sensors, electrical conductivity/resistivity sensors, acoustic sensors, magnetic sensors, accelerometers, or the like.

In some embodiments, relative to the figures shown above, the wall opening(s) may be further up on the frame sidewall, and similarly, the attachment feature of the support structure may extend further up engage the frame. FIGS. 10A-10E are perspective views of a cutaway portion of a non-limiting example of a frame section (FIGS. 10A and 10B), a support structure (FIGS. 10C and 10D) and a mounted frame structure (FIG. 10E) according to some embodiments.

Figure 10A:
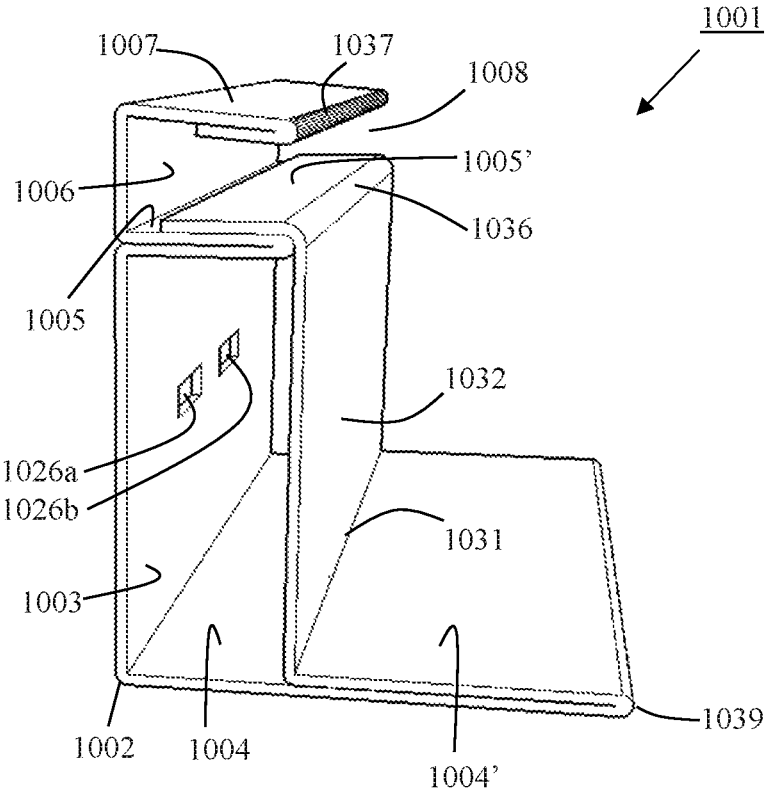
FIGS. 10A and 10B are two perspective views of a cutaway portion of a non-limiting example of a frame section according to some embodiments.
Figure 10B:
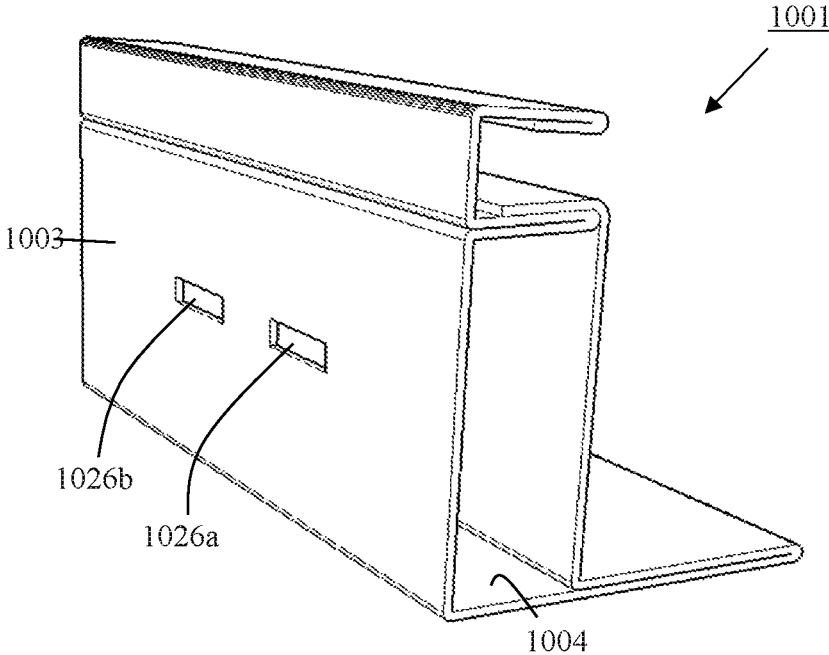

FIGS. 10A and 10B are views of frame section 1001 from two perspectives. Frame section 1001 may include a framework material that has been cut and folded into a desired shape. Frame section 1001 may include a lengthwise fold 1002 that may define an intersection of a frame sidewall 1003 with a bottom flange 1004. In some embodiments, the lengthwise fold 1002 may correspond to the bottom or base of the frame sidewall 1003. The frame may further include a series of folds that may form a panel containment structure that may include a lower shelf 1005, an optional pocket wall 1006, an optional top lip 1007, and perhaps even a pocket region 1008. The frame section may include a reversing flange fold 1039 such that a portion 1004' of the bottom flange may include a double layer of framework material. Another lengthwise fold 1031 may define an intersection of a support wall 1032 with the bottom flange 1004'. Support wall 1032 may extend from the bottom flange to lower shelf 1005 (part of the panel containment structure). Another lengthwise fold 1036 may define the intersection of the support wall with a lower shelf layer 1005' folded over a portion of lower shelf 1005 (the lower shelf here may be formed from multiple layers of framework material). In some embodiments, the top lip 1007 may include a top lip fold 1037 to form a rounded top lip edge. Frame section

1001 may be considered a type of box frame. Frame sidewall may include first and second wall openings, 1026*a* and 1026*b*, respectively.

Figure 10C:
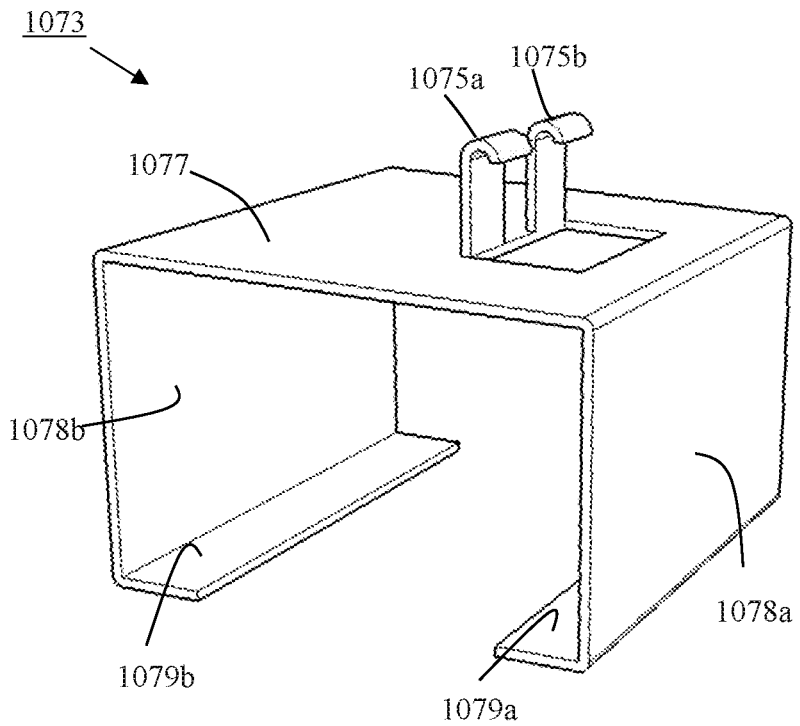
FIGS. 10C and 10D are two perspective views of a cutaway portion of a non-limiting example of a support structure according to some embodiments.
Figure 10D:
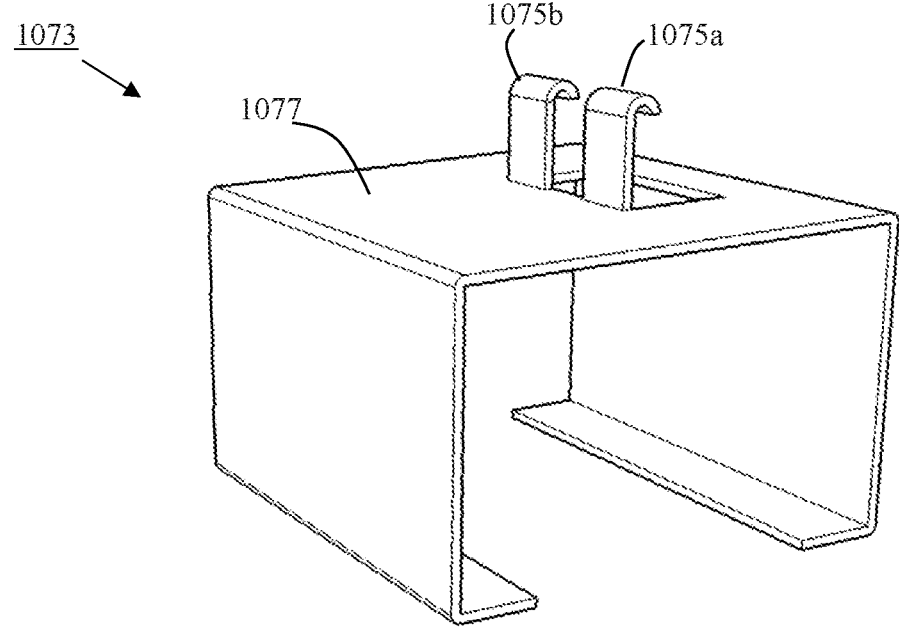

FIGS. 10C and 10D are views of support structure 1073 from two perspectives. The support structure 1073 may in some embodiments be a racking rail or a rail mount or the like. In some embodiments, support structure 1073 may include an upper surface 1077 formed of a support structure material. The upper surface 1077 may be characterized by an upper surface plane. The upper surface 1077 may be attached to support sidewalls 1078*a*, 1078*b*. The support structure may include support flanges 1079*a*, 1079*b* at the base of the support sidewalls. First and second attachment features, 1075*a* and 1075*b*, respectively, may be provided on the upper surface 1077, at least a portion of which is positioned above the upper surface plane. In some embodiments the first and second attachment features may include a hooked edge perhaps designed to extend through the first and second wall openings and engage the frame, e.g., the frame sidewall, perhaps to a form mounted frame structure. The hooked end of attachment features 1075*a* and 1075*b* show the hook as curved but it may be any shape which can allow the frame to be held to the upper surface 1077. The hook shape may have a horizontal flat portion which may allow for more horizontal movement, for example, as shown in cross-sectional view in FIG. 10G as attachment feature 1075*g*.

Figure 10E:
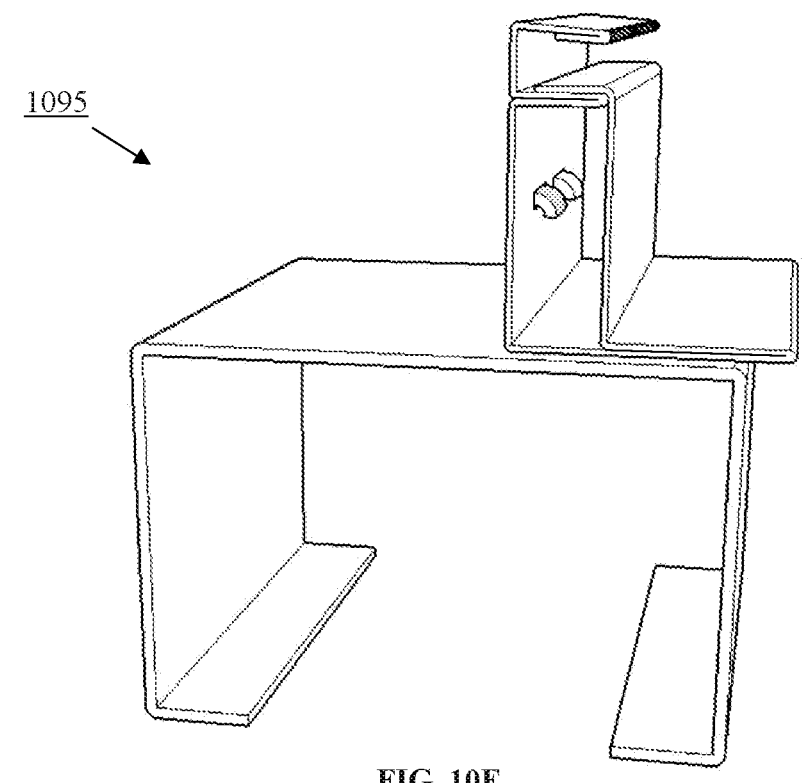
FIGS. 10E and 10F are two perspective views of a cutaway portion of a non-limiting example of a mounted frame structure according to some embodiments.
Figure 10F:
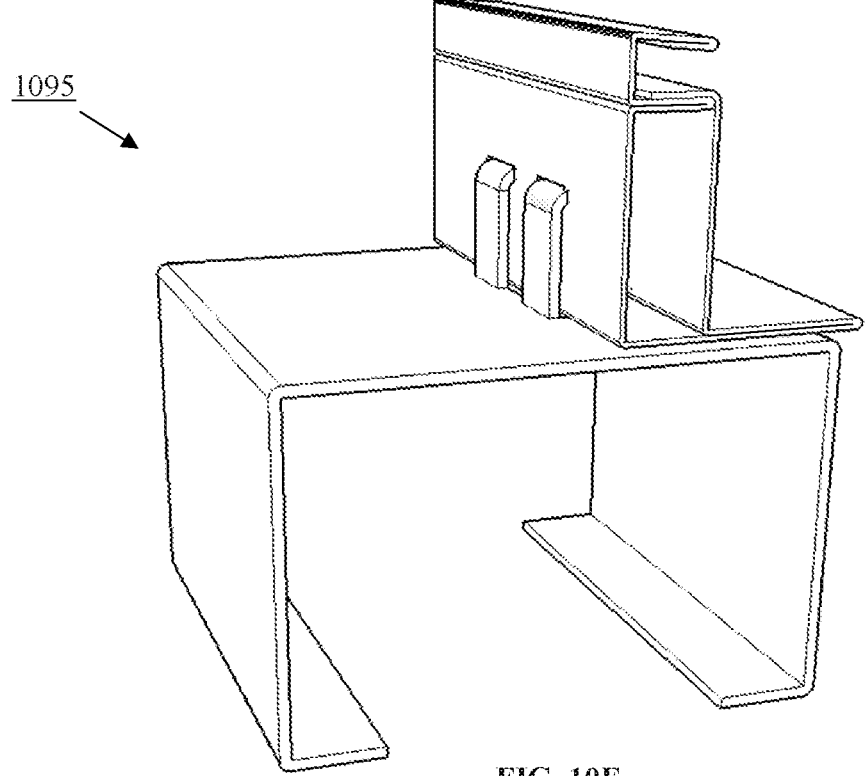
Figure 10G:
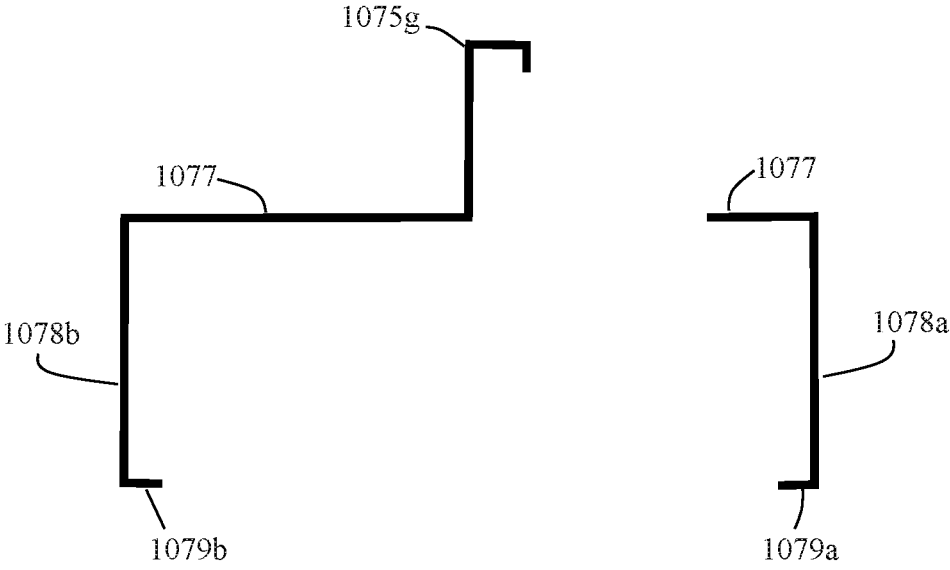
FIG. 10G is a cross-sectional view of a non-limiting example of a support structure according to some embodiments.

FIGS. 10E and 10F are views of mounted frame structure 1095 formed from frame 1001 and support structure 1073 from two perspectives. For clarity, various part numbers are not shown, but they are evident from FIGS. 10A-10D.

The embodiments herein represent only a few of the many possible embodiments of attachment features and wall openings that may be useful for mounting a frame to a support structure. Variations will be readily apparent to the skilled artisan in light of the present application. In some embodiments, combinations of different sets of attachment features and wall openings may be used in a frame or frame section. In some embodiments, a wall opening near the bottom of the frame sidewall may result in a stronger connection. In some embodiments, a wall opening near the middle or upper portion of the sidewall may result in an improved angle for installation.

Figure 11:
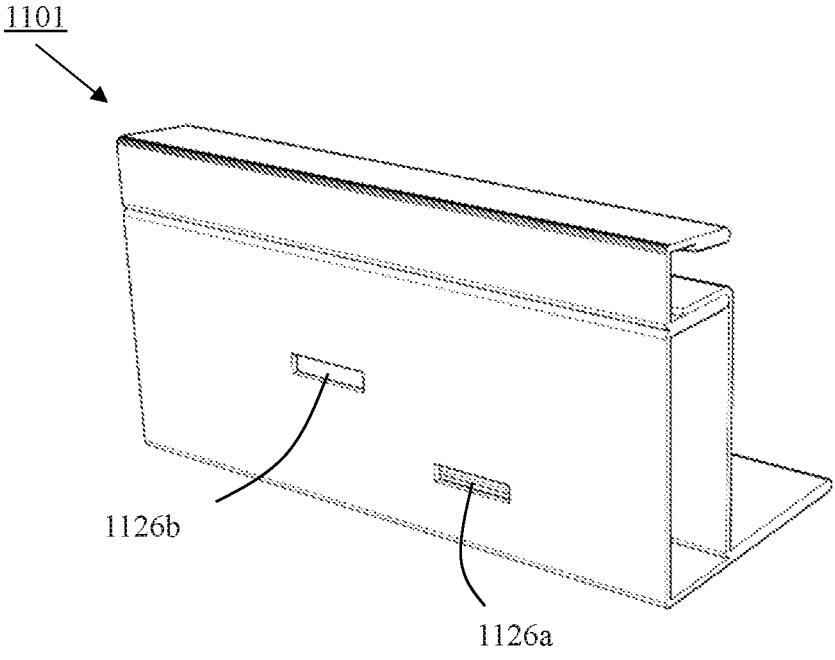
FIG. 11 is a perspective view of a cutaway portion of a non-limiting example of a frame section according to some embodiments.

In some embodiments, multiple wall openings in a frame section may be aligned with respect to height, shape or some other property (e.g., as in FIGS. 10A-10B), or alternatively, may be different with respect to height, shape, or some other property. The latter may result in added strength of the frame or connection or improved alignment. FIG. 11 is a perspective view of a cutaway portion of a non-limiting example of a frame section according to some embodiments. Frame section 1101 may in some cases be similar to the box frame section of FIG. 10A, but the wall openings 1126*a* and 1126*b* may not be aligned with respect to height. Not shown, attachment features from a support structure may be appropriately positioned to provide proper engagement when forming the mounted frame structure. In some embodiments, non-aligned wall openings may result in a stronger frame or attachment. In some cases, non-aligned wall openings may provide more versatility and allow mounting of a single type of frame to different types of support structures.

Figure 12:
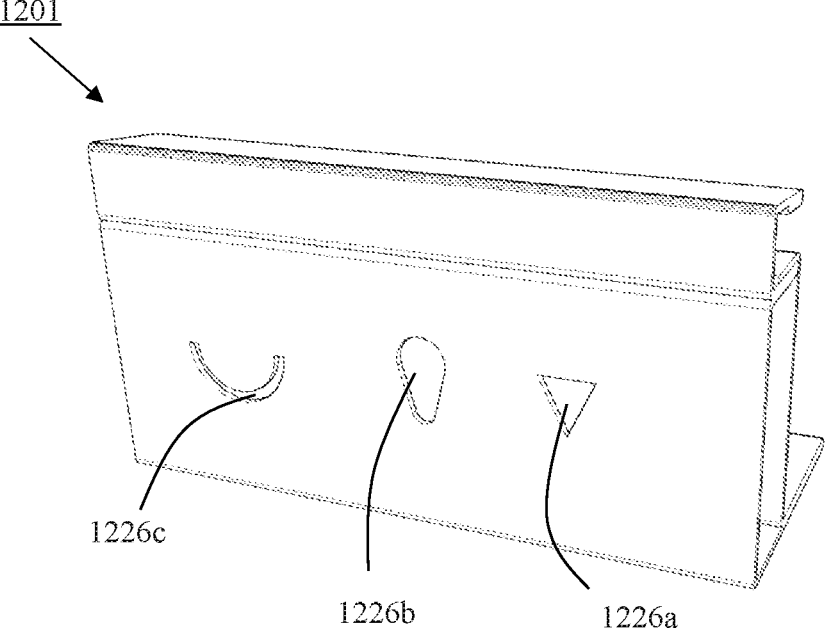
FIG. 12 is a perspective view of a cutaway portion of a non-limiting example of a frame section according to some embodiments.

The wall openings may take a variety of shapes and dimensions other than square or rectangular and may add greater flexibility to optimize the side-mount for a variety of environmental, aesthetic, structural, and operational conditions. For example, a wall opening may be oblong, oval, star-shaped, pentagonal, hexagonal, some other polygonal shape, irregular, or the like. FIG. 12 is a perspective view of a cutaway portion of a non-limiting example of a frame section according to some embodiments. Frame section 1201 may in some cases be similar to the box frame section of FIG. 10A, but may include three differently shaped wall openings, 1226*a*, 1226*b*, and 1226*c*. In some embodiments, differently shaped wall openings may result in a stronger frame or attachment. In some cases, non-aligned wall openings may provide more versatility and allow mounting of a single type of frame to different types of support structures.

Figure 13A:
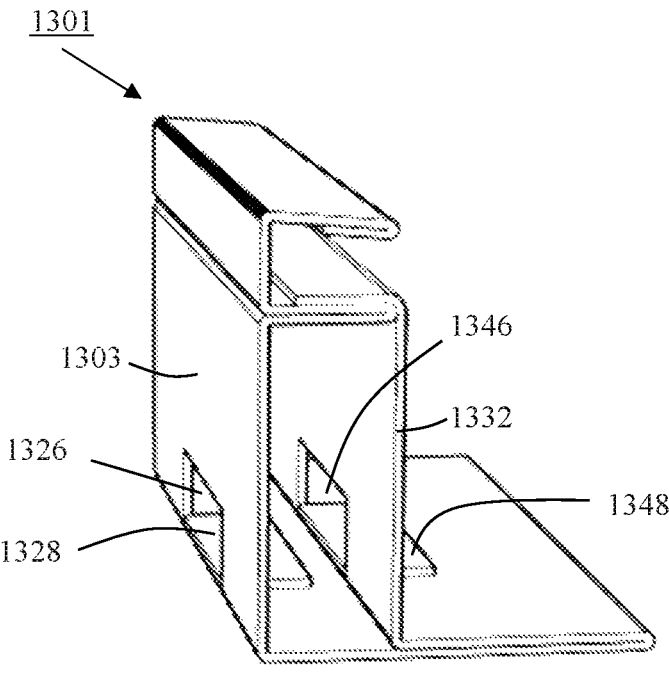
FIG. 13A is a perspective view of a cutaway portion of a non-limiting example of a frame section according to some embodiments.
Figure 13B:
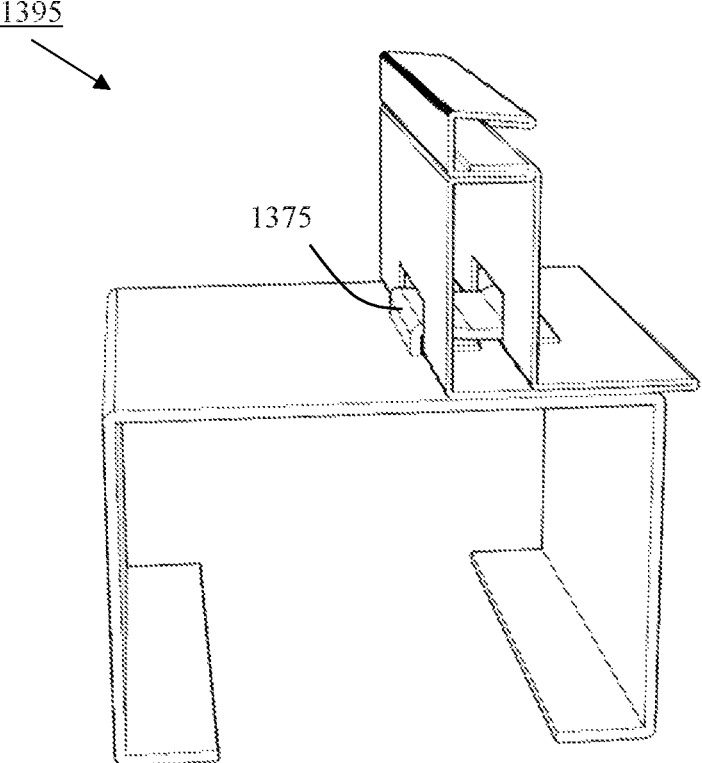
FIG. 13B is a perspective view of a cutaway portion of a non-limiting example of a mounted frame structure according to some embodiments.

In some embodiments perhaps involving a box frame, the support wall may include a support wall opening. A second flap may optionally be formed, for example, by cutting and folding down a portion of the support wall when forming the support wall opening. FIG. 13A is a perspective view of a cutaway portion of a non-limiting example of a frame section according to some embodiments. Frame section 1301 may in some cases be similar to the box frame section of FIG. 10A. Frame section 1301 may include a first flap 1328 formed from the wall opening 1326 in the frame sidewall 1303 and a second flap 1348 formed from the support wall opening 1346 provided in support wall 1332. Wall opening 1326 may in some cases (as shown here) be provided at the bottom or base of frame sidewall 1303. Similarly, support wall opening may in some cases (as shown here) be provided at a bottom or base of support wall 1332. In some cases, the flaps may fold onto or over the bottom flange. FIG. 13B is a perspective view of a cutaway portion of a non-limiting example of the frame section 1301 now mounted to a support structure according to some embodiments to form mounted frame structure 1395. In some embodiments the attachment feature 1375 may extend only through the wall opening in the sidewall and engage the first flap. In some embodiments, the attachment feature may extend through both the wall opening in the frame sidewall and through the support wall opening. In some embodiments, the attachment feature may engage the second flap, the first flap, or both. In addition to potentially improving mounting strength, the support wall opening may allow improved access to the engagement or connection area. In some embodiments, (not shown), one or both of the flaps may not be present, and the box frame may have at least a wall opening in the sidewall and optionally an opening in the support wall.

Figure 13C:
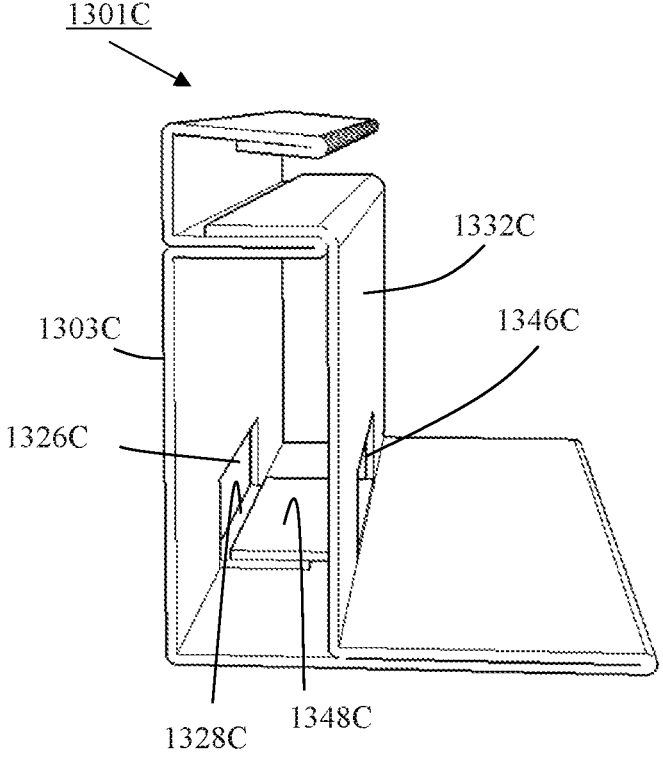
FIG. 13C is a perspective view of a cutaway portion of a non-limiting example of a frame section according to some embodiments.

In some embodiments, a second flap of a box frame may be folded back towards the wall opening in the sidewall, optionally over or under the first flap. FIG. 13C is a perspective view of a cutaway portion of a non-limiting example of a frame section according to some embodiments. Frame section 1301C may include a first flap 1328C formed from the wall opening 1326C in the frame sidewall 1303C and a second flap 1348C formed from the support wall opening 1346C in support wall 1332C and folded over the first flap 1328C. Alternatively, the first flap may be folded over the second flap.

Figure 14A:
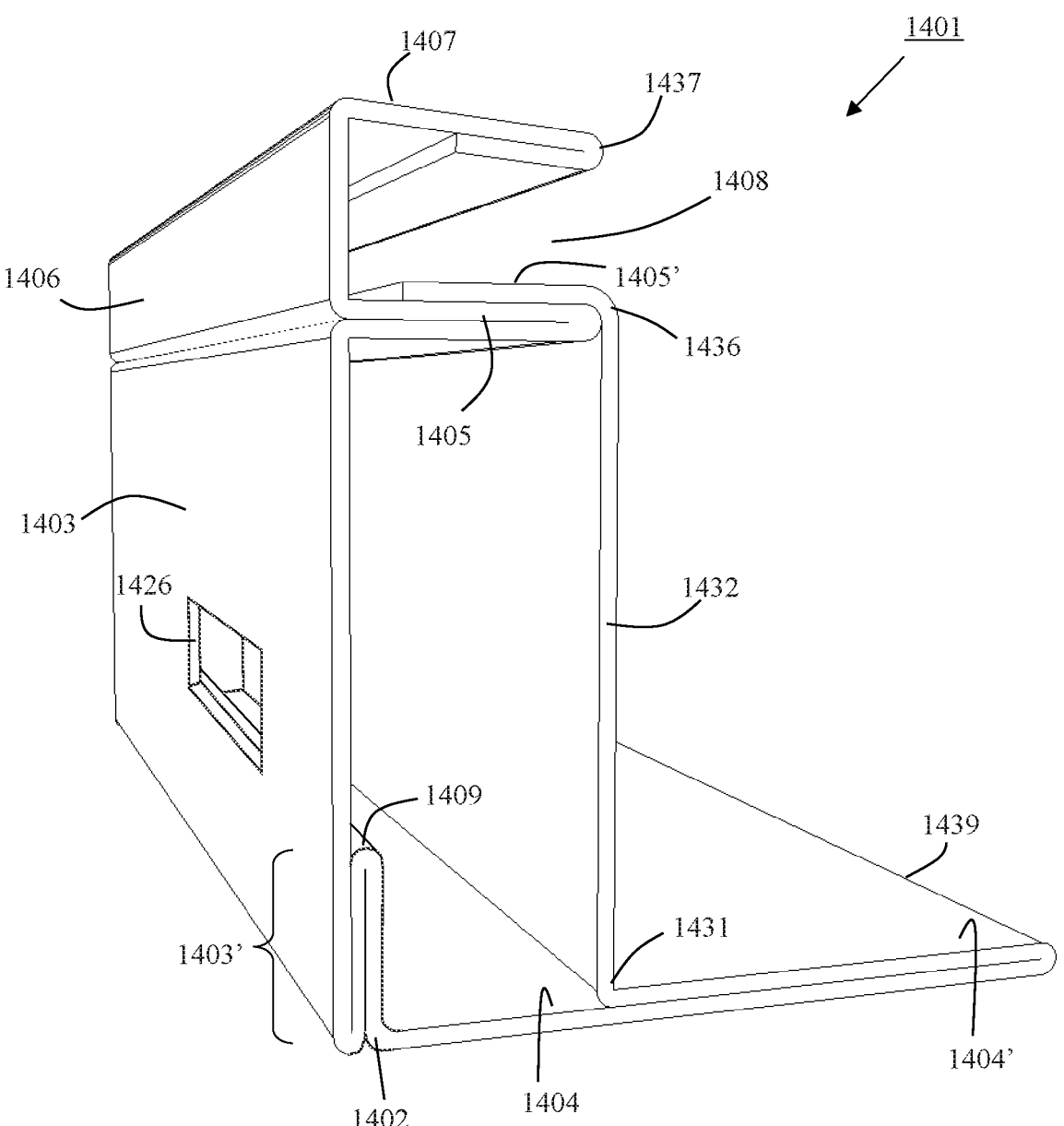
FIG. 14A is a perspective view of a cutaway portion of a non-limiting example of a frame section according to some embodiments.

FIG. 14A is a perspective view of a cutaway portion of a non-limiting example of a frame section according to some embodiments. Frame section 1401 may include a framework material that has been cut and folded into a desired shape. Frame section 1401 may include a lengthwise fold 1402 that may define an intersection of a frame sidewall 1403 with a bottom flange 1404. In some embodiments, the lengthwise fold 1402 may correspond to the bottom or base of the frame sidewall 1403. The frame may further include a series of folds that may form a panel containment structure that may include a lower shelf 1405, an optional pocket wall 1406, an optional top lip 1407, and perhaps even a pocket region

1408. The frame section may include a reversing flange fold 1439 such that a portion 1404' of the bottom flange may include a double layer of framework material. Another lengthwise fold 1431 may define an intersection of a support wall 1432 with the bottom flange 1404'. Support wall 1432 may extend from the bottom flange to lower shelf 1405 (part of the panel containment structure). Another lengthwise fold 1436 may define the intersection of the support wall with a lower shelf layer 1405' folded over a portion of lower shelf 1405 (the lower shelf here may be formed from multiple layers of framework material). In some embodiments, the top lip 1407 may include a top lip fold 1437 to form a rounded top lip edge. Frame section 1401 may be considered a type of box frame. Frame sidewall may include a wall opening 1426. In some cases, a lower portion 1403' of frame sidewall 1403 may include a multiple layers of framework material that may be formed in part by an additional lengthwise fold 1409. In some cases, the bottom of wall opening 1426 may be positioned at about the level of fold 1409 so that the frame sidewall includes multiple layers of framework material at least below the first wall opening. In some embodiments, multiple layers of framework material may increase the strength of the frame sidewall when it engages an attachment feature.

Figure 14B:
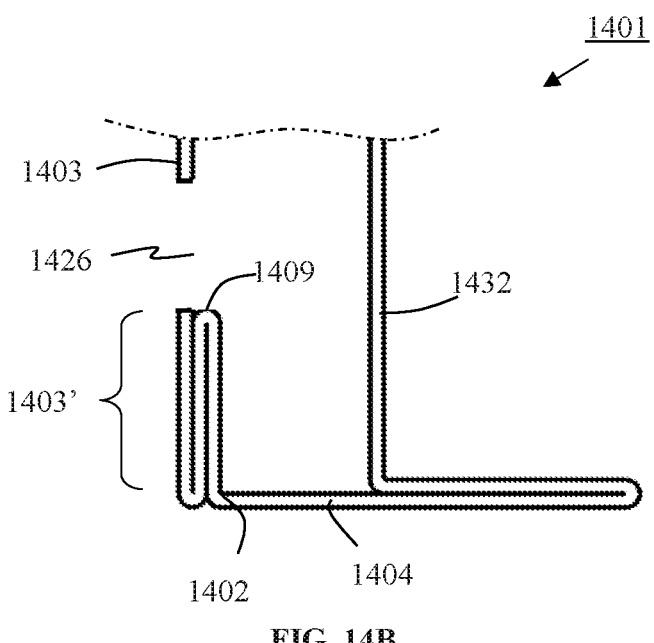
FIG. 14B is a cross-sectional view of a non-limiting example of a frame section according to some embodiments.
Figure 14C:
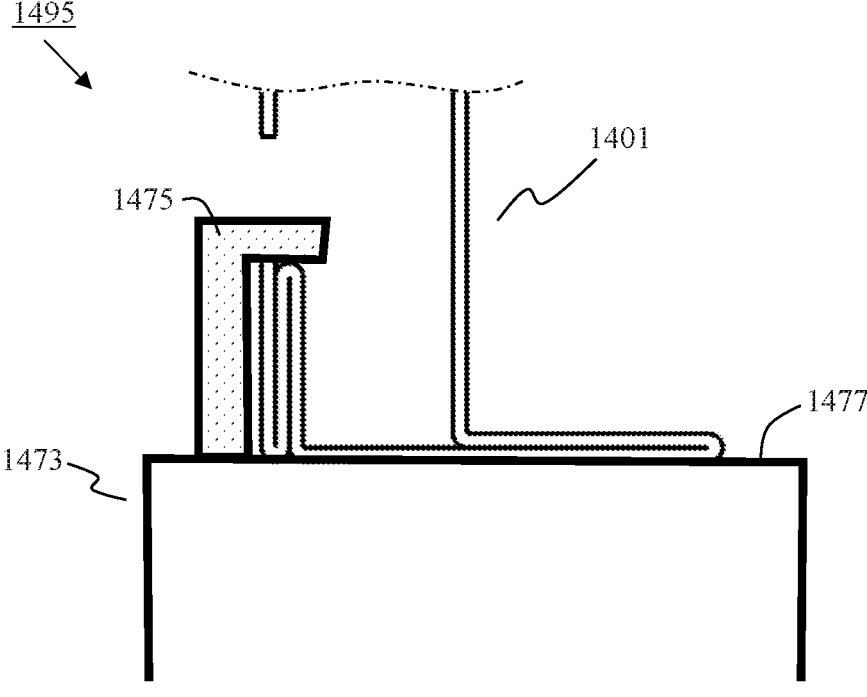
FIG. 14C is a cross-sectional view of a non-limiting example of amounted frame structure according to some embodiments.

FIG. 14B is a cross-sectional view of frame section 1401 excluding the panel containment structure. FIG. 14C is a cross sectional view of a mounted frame structure 1495 formed from frame section 1401 and support structure 1473. Support structure 1473 may include an upper surface 1477 that may be characterized by an upper surface plane. The support structure may include an attachment feature 1475 that may extend through the wall opening of the frame section 1401 and engage the frame. In this example, the attachment feature 1475 may engage the frame sidewall portion 1403' having multiple layers of framework material.

Figure 14D:
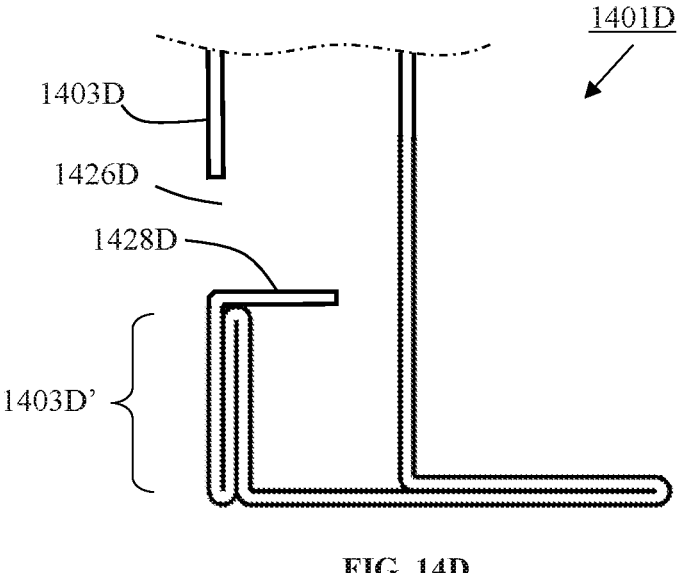
FIG. 14D-14G are cross-sectional views of non-limiting examples of frame sections according to some embodiments.

FIG. 14D is a cross sectional view of a non-limiting example of a frame section according to some embodiments. FIG. 14D shows a frame section 1401D excluding the panel containment structure. Frame section 1401D may in some cases be similar to frame section 1401 but may further include a flap 1428D formed from the wall opening 1426D in the frame sidewall 1403D above portion 1403D'.

Figure 14E:
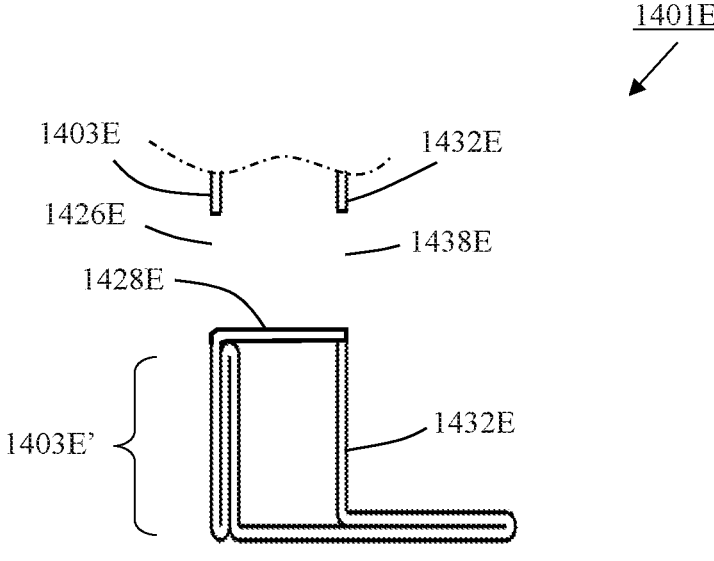

FIG. 14E is a cross sectional view of a non-limiting example of a frame section according to some embodiments. FIG. 14E shows a frame section 1401E excluding the panel containment structure. Frame section 1401E may in some cases be similar to frame section 1401 but may further include a flap 1428E formed from the wall opening 1426E in the frame sidewall 1403E above portion 1403E'. Frame section 1401E may further include a support wall opening 1438E in support wall 1432E. In some embodiments, flap 1428E may form a bridge between the frame sidewall and the support wall. In some cases, this may add additional strength to the frame section when engaged by an attachment feature. For example, compressive forces that might be applied by an attachment feature may be distributed between the frame sidewall and the support wall rather than the frame sidewall alone.

Figure 14F:
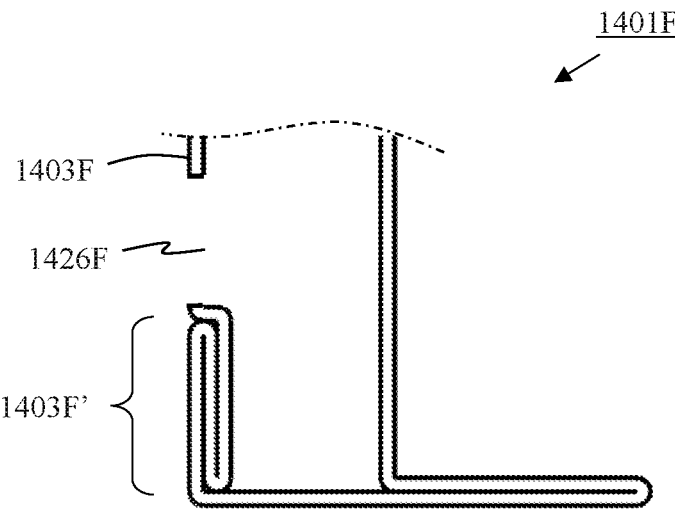

There are many other ways to provide a sidewall where at least a lower portion includes multiple layers of framework material. As just one alternative example, FIG. 14F is a cross-sectional view of a non-limiting example of a frame section according to some embodiments. FIG. 14F shows a frame section 1401F excluding the panel containment structure. Frame section 1401F may in some cases be similar to frame section 1401, but the series of folds used to create portion 1403F' of frame sidewall 1403F is different. Frame section 1401F may include a wall opening positioned above the multilayer framework portion of 1403F'.

Figure 14G:
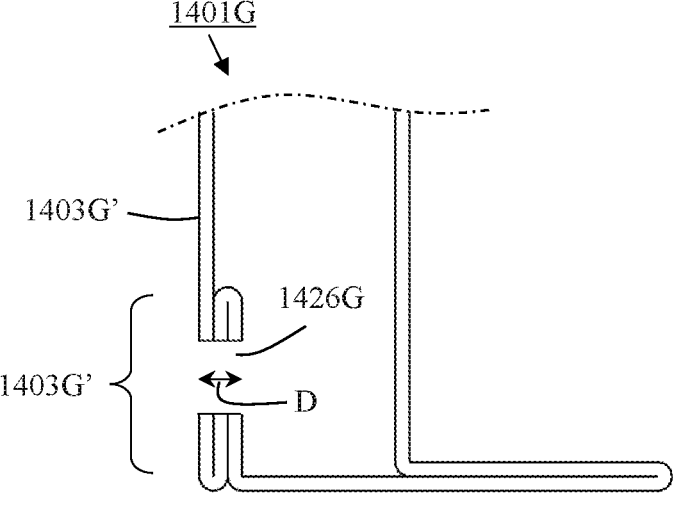

In some embodiments, the wall opening may go through a multiple layers of framework material. In some cases, a wall opening may be a reinforced mounting hole. FIG. 14G is a cross-sectional view of a non-limiting example of a frame section according to some embodiments. FIG. 14G shows a frame section 1401G excluding the panel containment structure. Frame section 1401G may in some cases be similar to frame section 1401, but where wall opening 1426G goes through portion 1403G' of frame sidewall 1403G having several layers, perhaps three layers, of framework material. In some embodiments, wall opening 1426G may be referred to as a reinforced mounting hole or a reinforced wall opening where the opening 1426G is characterized by an effective depth D greater than the framework material thickness.

Figure 15A:
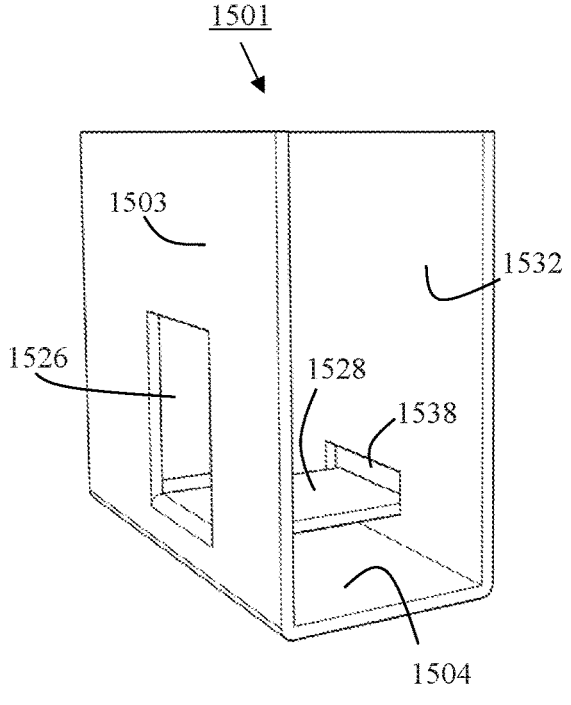
FIGS. 15A-15B are perspective views of a cutaway portion of a non-limiting example of a frame section according to some embodiments.
Figure 15B:
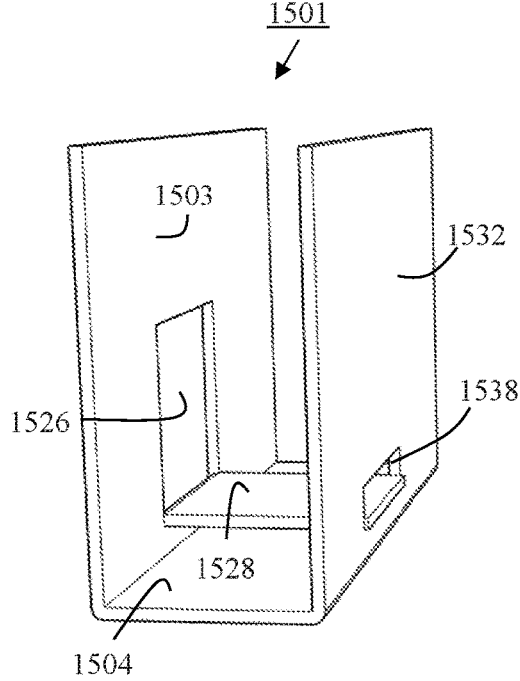
Figure 15C:
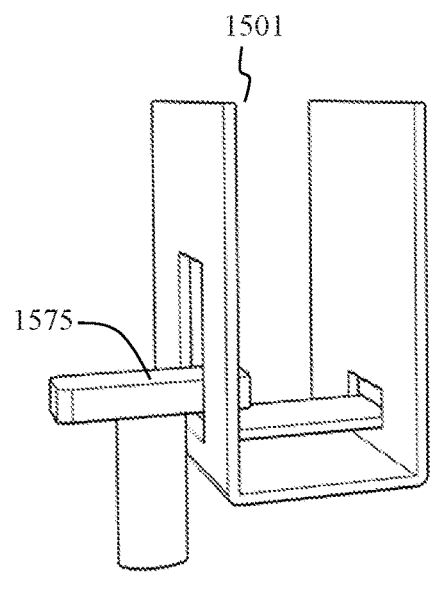
FIGS. 15C-15D are perspective views of a cutaway portion of a non-limiting example of a frame section engaged with an attachment feature according to some embodiments.
Figure 15C:
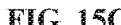
Figure 15D:
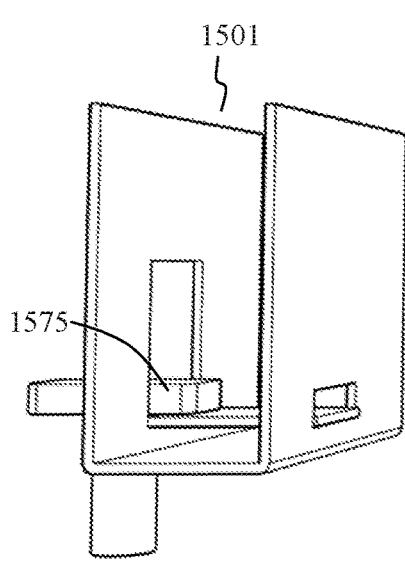

In some embodiments, a bridge structure may be provided between a frame sidewall and a support wall where the sidewall does not necessarily include multiple layers of framework material. FIGS. 15A-15D are perspective views of a cutaway portion of a non-limiting example of a frame section according to some embodiments. For clarity, the panel containment structure is not shown in these figures. Frame section 1501 may include a bottom flange 1504, a frame sidewall 1503, support wall 1532, a wall opening 1526, and a support wall opening 1538. A flap 1528 may be formed from wall opening 1526 extending to the support wall opening and forming a bridge structure. FIGS. 15C and 15D further illustrate how frame section 1501 may engage with an attachment feature 1575. Although not shown, the attachment feature 1575 may be part of a support structure and the frame section may rest on an upper surface of a support structure. In some cases, the attachment feature may apply a compressive force which may be distributed between the frame sidewall and the support wall. In some cases, rather than or in addition to a bridge structure, the attachment feature itself may extend all the way to the support wall opening so that it may engage both the frame sidewall and support wall.

In some embodiments, the bottom flange may have a structure other than generally flat in the horizontal orientation (e.g., approximately parallel to the intended plane of the panel). In some cases, a non-flat structure may cooperate with the wall opening in engaging an attachment feature. FIGS. 16A-16G are cross-sectional views of non-limiting examples of frame sections according to some embodiments. For simplicity, the frame sections of FIGS. 16A-16G are shown without a panel containment structure. Each of these frame sections includes a generally non-flat bottom flange, such that at least a portion of the bottom flange may not be in a common horizontal plane with another part of the bottom flange. Such bottom flanges or frame bases may be referred to herein as a structured bottom flange or a structured frame base and these terms may be used interchangeably.

While a support wall opening is shown in each of FIGS. 16A-16G, such support wall openings are optional and other embodiments may not include them. It should also be noted that the size of the openings may be different than as shown. Further, although not shown, an optional flap may extend from the wall opening and/or the support wall opening into the box portion of the frame. Such optional flap may in some embodiments extend all the way across to the opposing support wall or frame sidewall, as the case may be. In some cases, the optional flap may form a bridge structure. Although FIGS. 16A-16G all include a structured bottom flange having a horizontal portion, in some other embodiments, the structured bottom flange may not include any horizontal portion. Attachment features are not illustrated in FIGS. 16A-16G, but they may engage any or all of the frame sidewall, the structured bottom flange, or the optional support wall opening.

Figures 16A, 16B, 16C, 16D:
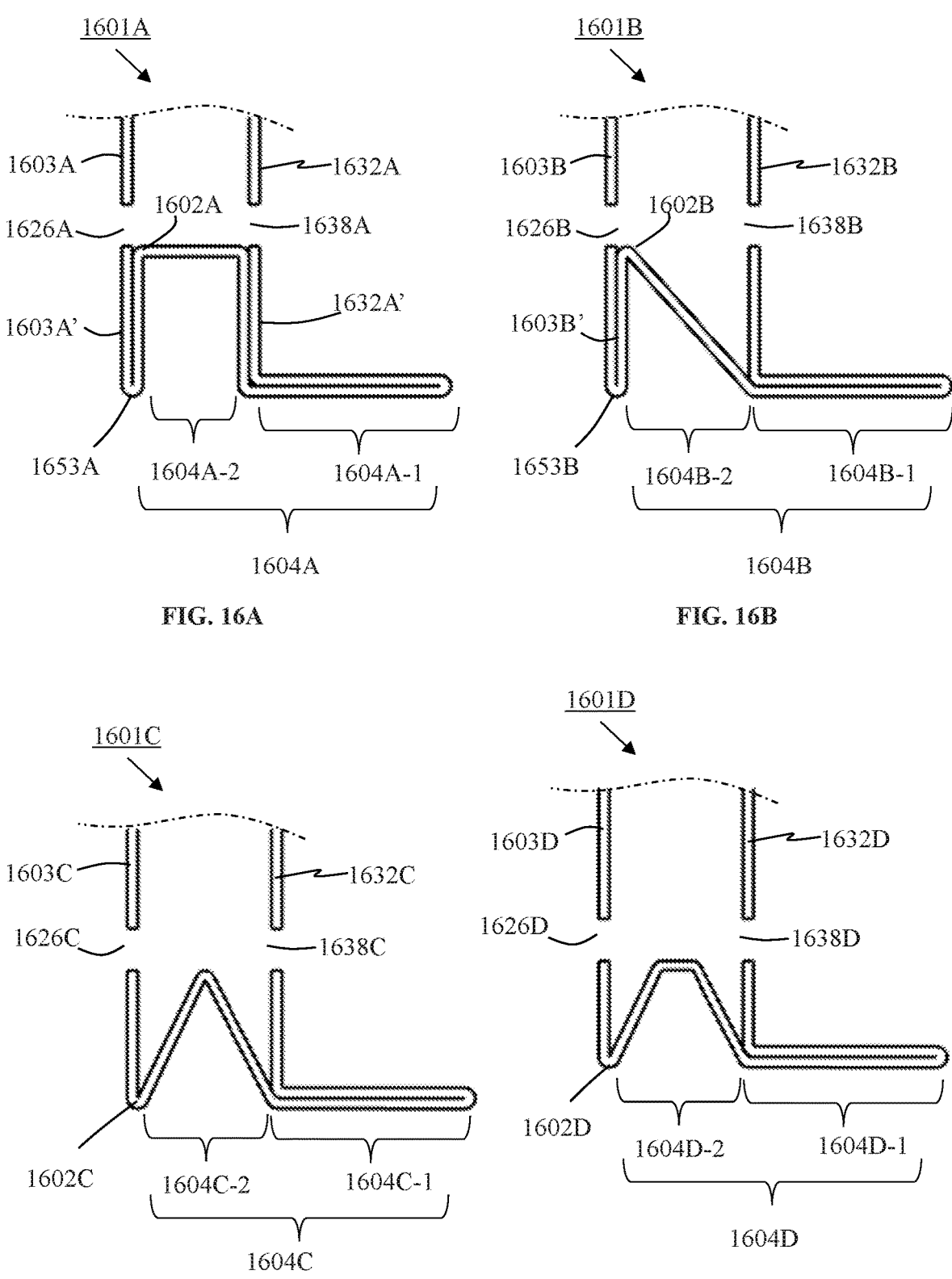

Frame section 1601A in FIG. 16A may include a structured bottom flange 1604A that may include a lower horizontal portion 1604A-1 and a structured portion 1604A-2 that may lie at least partially outside the general plane of the lower horizontal portion. As mentioned, a horizontal orientation herein may refer to a plane that may be generally parallel to a panel. Structured portion 1604A-2 may in some cases be characterized as a step that may be parallel to the horizontal portion 1604A-1. A lengthwise fold 1602A may define an intersection with frame sidewall 1603A, which may include a portion 1603A' having multiple layers of framework material. Unlike some other embodiments, lengthwise fold 1602A may not represent the bottom or base of frame sidewall 1603A. Rather, a fold 1653A may instead represent the bottom or base of frame sidewall 1603A. A wall opening 1626A may be provided in frame sidewall 1603A. A support wall opening 1638A may be provided in support wall 1632A. A portion 1632A' of the support wall may include multiple layers of framework material formed in part from folds used to make bottom flange structured portion 1604A-2. In some embodiments, structured portion 1604A-2 may align with the bottom of the wall opening 1626A.

Frame section 1601B in FIG. 16B may include a structured bottom flange 1604B that may include a horizontal portion 1604B-1 and a structured portion 1604B-2 that may lie at least partially outside the general plane of the horizontal portion 1604B-1. Structured portion 1604B-2 may in this cross-section be angled relative to horizontal portion 1604B-1. A lengthwise fold 1602B may define an intersection with frame sidewall 1603B, which may include a portion 1603B' having multiple layers of framework material. Unlike some other embodiments, lengthwise fold 1602B may not represent the bottom or base of frame sidewall 1603B. Rather, a fold 1653B may instead represent the bottom or base of frame sidewall 1603B. A wall opening 1626B may be provided in frame sidewall 1603B. A support wall opening 1638B may be provided in support wall 1632B.

Frame section 1601C in FIG. 16C may include a structured bottom flange 1604C that may include a horizontal portion 1604C-1 and a structured portion 1604C-2 that may lie at least partially outside the general plane of the horizontal portion 1604C-1. Structured portion 1604C-2 may in this cross-section include a peak that may formed from a bend in framework material. A lengthwise fold 1602C may define an intersection with frame sidewall 1603C. A wall opening 1626C may be provided in frame sidewall 1603C. A support wall opening 1638C may be provided in support wall 1632C. In some embodiments, the peak of structured portion 1604C-2 may align with the bottom of the wall opening 1626C.

Frame section 1601D in FIG. 16D may include a structured bottom flange 1604D that may include a horizontal portion 1604D-1 and a structured portion 1604D-2 that may lie at least partially outside the general plane of the horizontal portion 1604D-1. Structured portion 1604D-2 may in this cross-section include a flat-topped peak that may be formed from bends in framework material. A lengthwise fold 1602D may define an intersection with frame sidewall 1603D. A wall opening 1626D may be provided in frame sidewall 1603D. A support wall opening 1638D may be provided in support wall 1632D. In some embodiments, the flat-topped peak of structured portion 1604D-2 may align with the bottom of the wall opening 1626D.

Frame section 1601E in FIG. 16E may include a structured bottom flange 1604E that may include a horizontal portion 1604E-1 and a structured portion 1604E-2 that may lie at least partially outside the general plane of the horizontal portion 1604E-1. Structured portion 1604E-2 may in this cross-section be angled relative to horizontal portion 1604E-1. Frame section 1601E may be similar to frame section 1601B except that structured portion 1604E-2 may include a shelf area, e.g., near the frame sidewall. A lengthwise fold 1602E may define an intersection with frame sidewall 1603E, which may include a portion 1603E' having multiple layers of framework material. Unlike some other embodiments, lengthwise fold 1602E may not represent the bottom or base of frame sidewall 1603E. Rather, a fold 1653E may instead represent the bottom or base of frame sidewall 1603E. A wall opening 1626E may be provided in frame sidewall 1603E. A support wall opening 1638E may be provided in support wall 1632E. In some embodiments, the shelf area of structured portion 1604E-2 may align with the bottom of the wall opening 1626E.

Frame section 1601F in FIG. 16G may include a structured bottom flange 1604F that may include a horizontal portion 1604F-1 and a structured portion 1604F-2 that may lie at least partially outside the general plane of the horizontal portion 1604F-1. Structured portion 1604F-2 may in this cross-section include a flat shelf that may formed from bends in framework material. A lengthwise fold 1602F may define an intersection with frame sidewall 1603F. A wall opening 1626F may be provided in frame sidewall 1603F. A support wall opening 1638F may be provided in support wall 1632F. In some embodiments, the flat shelf of structured portion 1604F-2 may align with the bottom of the wall opening 1626F.

Frame section 1601G in FIG. 16G may include a structured bottom flange 1604G that may include a horizontal portion 1604G-1 and a structured portion 1604G-2 that may lie at least partially outside the general plane of the horizontal portion 1604G-1. Structured portion 1604G-2 may in this cross-section include a vertical fold formed from a bend in the framework material. A lengthwise fold 1602G may define an intersection with frame sidewall 1603G. A wall opening 1626G may be provided in frame sidewall 1603G. A support wall opening 1638G may be provided in support wall 1632G. In some embodiments, the top of the vertical fold of structured portion 1604G-2 may align with the bottom of the wall opening 1626G.

There can be numerous ways for an attachment feature to a engage frame section. As mentioned, an attachment feature may engage any or all of the frame sidewall, the bottom flange (including, where applicable, a structured bottom flange), or the optional support wall. Turning to FIGS. 24A-24I, there are shown just a few non-limiting ways that an attachment feature may engage a frame. For simplicity, the frame sections are shown without a panel containment structure.

Figure 24A:
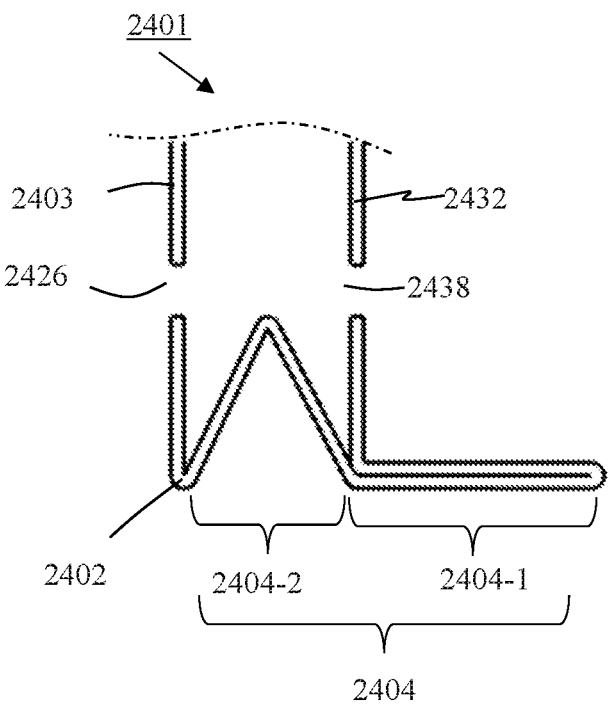
FIG. 24A is a cross-sectional view of a non-limiting example of a frame section according to some embodiments.

FIG. 24A is a cross-sectional view of a non-limiting example of a frame section according to some embodiments. Frame section 2401 may in some cases be similar to frame section 1601C described in FIG. 16C. Frame section 2401 in FIG. 24A may include a structured bottom flange 2404 that may include a horizontal portion 2404-1 and a structured portion 2404-2 that may lie at least partially outside the general plane of the horizontal portion 2401-1. Structured portion 2404-2 may in this cross-section include a peak that may formed from a bend in framework material. A lengthwise fold 2402 may define an intersection with frame sidewall 2403. A wall opening 2426 may be provided in frame sidewall 2403. In some cases, a support wall opening 2438 may be provided in support wall 2432. In some embodiments, the peak of structured portion 2404-2 may align with the bottom of the wall opening 2426 and perhaps even to the bottom of support wall 2438.

Figure 24B:
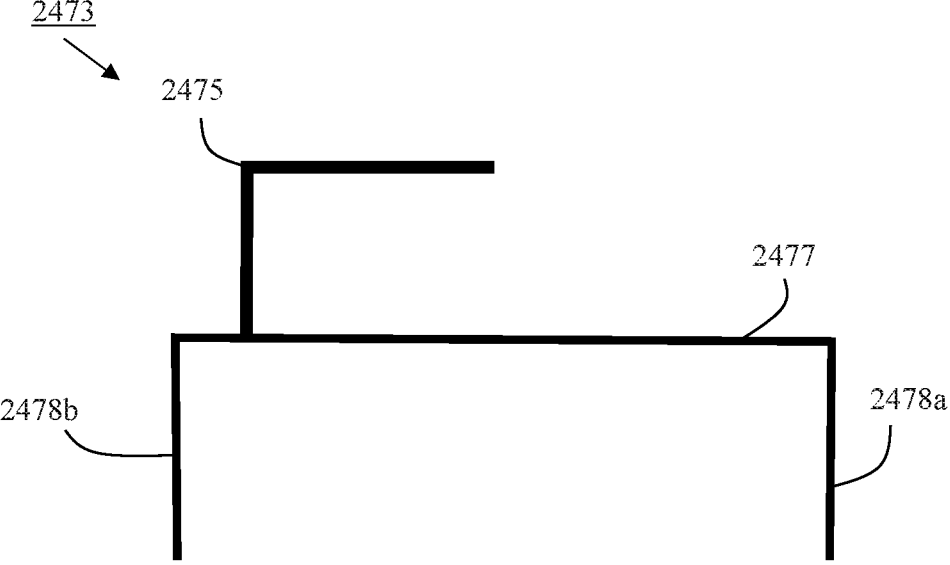
FIG. 24B is a cross-sectional view of a non-limiting example of a support structure according to some embodiments.

FIG. 24B is a cross-sectional view of a non-limiting example of a support structure according to some embodiments. Support structure 2473 may include an upper surface 2477 formed of a support structure material. The upper surface 2477 may be characterized by an upper surface plane. The upper surface 2477 may be attached to support sidewalls 2478a and 2478b. The support structure may include attachment feature 2475, at least a portion of which is positioned above the upper surface plane. In some embodiments, the attachment feature may be formed at least in part from the support structure material. In some embodiments, the attachment feature may be a component that is mounted onto, and form part of, the support structure.

Figure 24C:
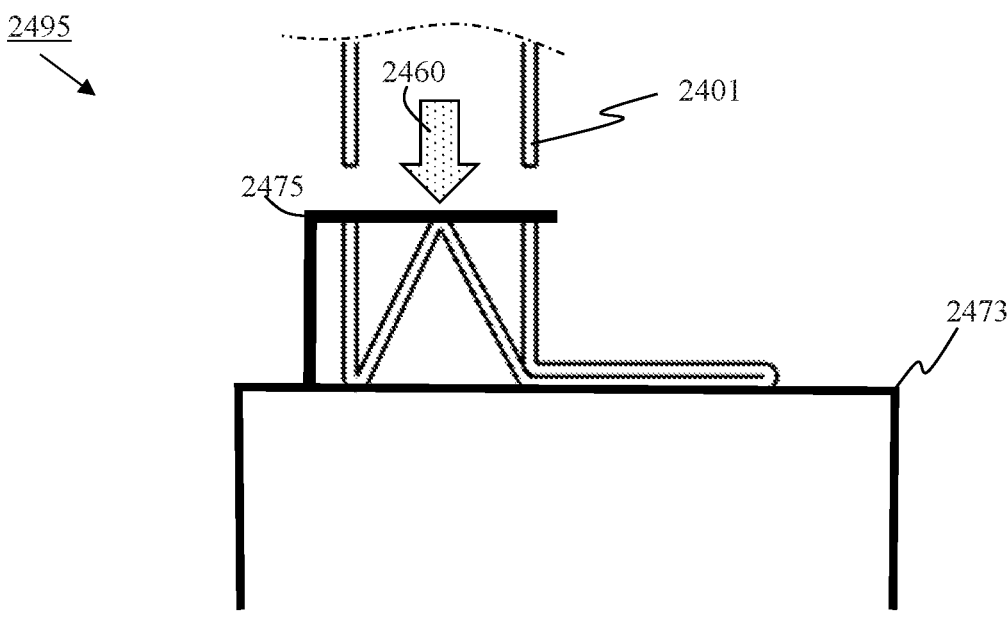
FIGS. 24C-24I are cross-sectional views of non-limiting examples of mounted frame structures according to some embodiments.

FIG. 24C is a cross-sectional view of a non-limiting example of a mounted frame structure according to some embodiments. For clarity, not all of the components are labelled, but their identities may be understood with reference to FIGS. 24A and 24B. The mounted frame structure 2495 may be formed from frame section 2401 (FIG. 24A) and support structure 2473 (FIG. 24B). At least a portion of the frame section may rest on at least a portion of the support structure, e.g., on a portion of the upper surface or the like. The attachment feature 2475 may engage the frame section. As shown in FIG. 24C, in some embodiments, the attachment feature may engage the frame sidewall at the bottom of the wall opening, the peak of the structured portion of the bottom flange, and even the support wall at the bottom of the wall opening. That is, three areas of the frame section may be engaged by the attachment feature. In some cases, this may result in a desirable distribution of a compressive force 2460 that may be applied to the frame section by the attachment feature. Such embodiments may benefit from tight tolerances in feature alignment (e.g., the bottom of wall opening, the top of the structured portion of the bottom flange, and perhaps even the bottom of the support wall opening) to ensure a reasonably uniform distribution of compressive forces. That is, the resultant force may change depending on the contact points with the attachment feature. If one of the three mentioned features may be higher than the other two, it may receive more force. That may not be a concern, but in some embodiments, it may be less desirable. For example, if the primary contact point may be at the frame sidewall, it may in some cases result in unwanted deformations in the frame sidewall. Further, the stability of the mounted frame structure itself may be reduced if the attachment feature primarily engages only with the frame sidewall. For example, the framed panel structure may be more prone to tipping or pivoting at the engagement point in response to external forces (e.g., wind, snow, or the like). Similarly, engagement with only the support wall may result in reduced stability, in particular if there the frame section does not include a bottom flange having horizontal portion such as 2401-1. Thus, in some embodiments, it may be desirable that the resulting compressive force be, on average, located interior of the frame sidewall, e.g., between the frame sidewall and the support wall (if present). This may be the case for mounted frame structure 2495 when the attachment feature properly engages the frame sidewall, the structured portion of the bottom flange, and the support wall.

FIGS. 24D-24I are cross-sectional views of some non-limiting examples of mounted frame structures according to some embodiments. The parts are generally not labelled, but their identities may be understood with reference to FIGS. 24A and 24B.

Figure 24D:
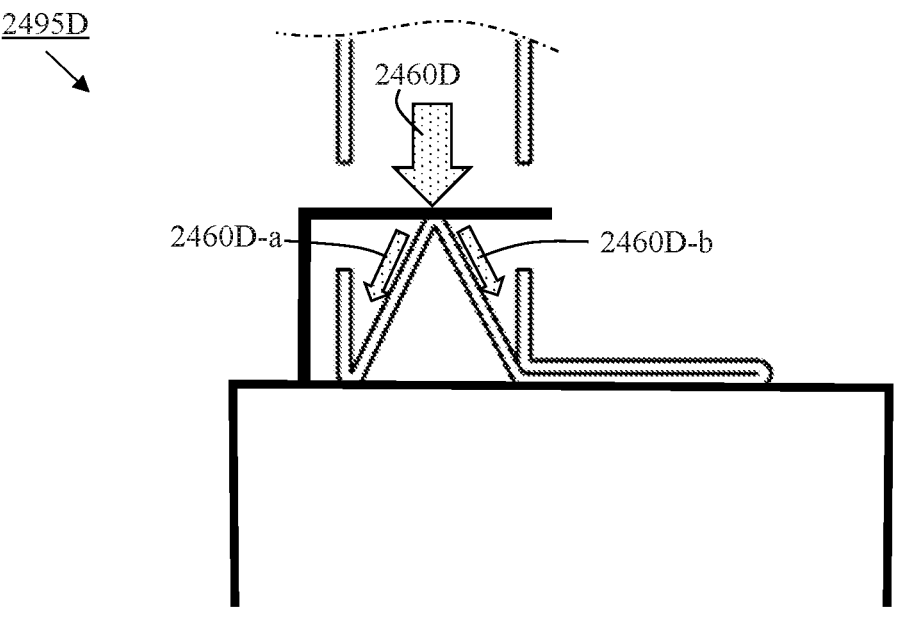
Figure 24E:
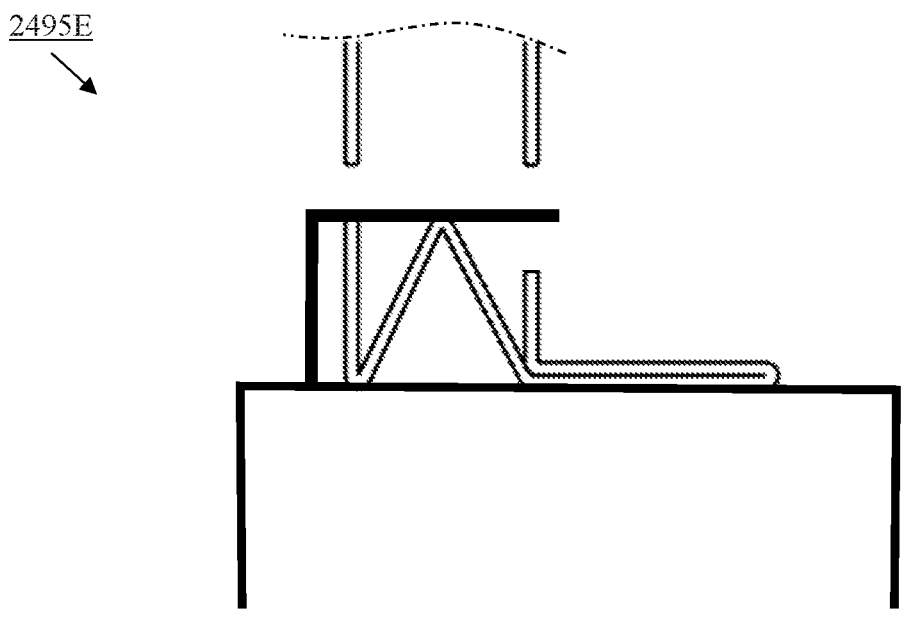
Figure 24F:
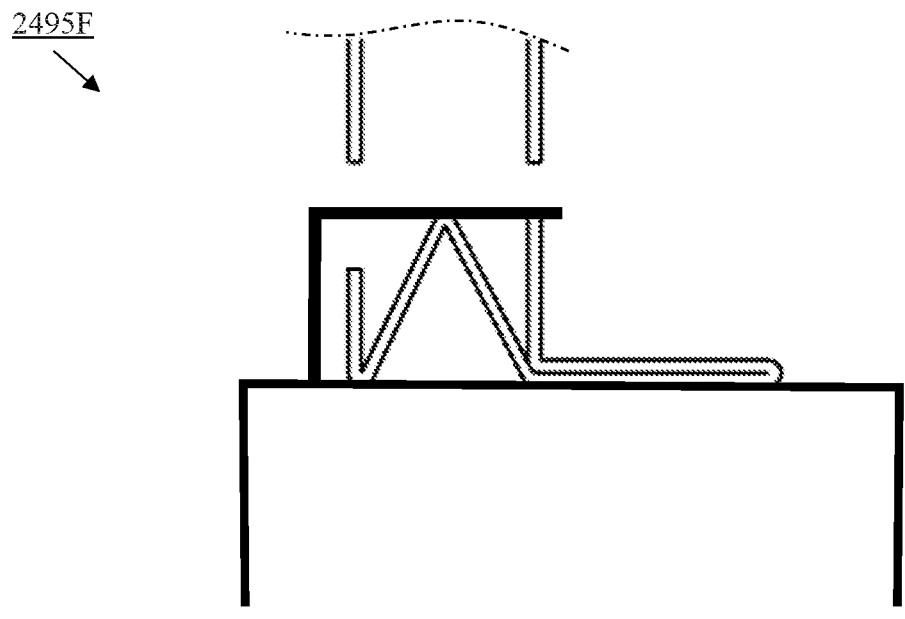

Mounted frame structure 2495D in FIG. 24D may be similar to mounted frame structure 2495 of FIG. 24C. In FIG. 24D, however, the bottom of the wall opening and the bottom of the support wall opening may each be lower than the peak of the structured portion of the bottom flange. When the frame may be engaged by the attachment feature, it may be that only the top or peak of the structured portion of the bottom flange is engaged. It is worth noting that this engagement may in some cases allow approximately even distribution of a compressive force between the base of the frame sidewall and to the base of the support wall via the structured portion of the bottom flange. That is, a portion 2460D-a of the compressive force 2460D may be transferred to the base of the frame sidewall, and a portion 2460C-b of the compressive force 2460D (that may be similar in magnitude to portion 2460D-a) may be transferred to the base of the support wall via the structured portion of the bottom flange. For example, the portion 2460D-a may be transferred by the part of the structured bottom flange between the peak structure and the base of the frame sidewall. The portion 2460D-b may be transferred by the part of the structured bottom flange between the peak structure and the base of the support wall (which may also correspond to the horizontal or non-structured portion of the bottom flange). The resulting compressive force may, on average, be located between the frame sidewall and the support wall. Such an embodiment may not require high tolerances in alignment so long as the peak of the structured portion of the bottom flange is higher than the bottom of the wall opening and the bottom of the support wall opening. Embodiments such as this may represent a simple and cost-effective mounted frame structure having high stability.

Although not shown, with high compression, there may in some embodiments be a slight spread in the distance between the frame sidewall and the support wall in the base area of the frame section (e.g., if the peak of the structured portion of the bottom flange is pushed downward). Such spread may, however, be self-limiting when the attachment feature pushes down the peak so far as to also engage the frame sidewall and support wall at the bottoms of the wall opening and the support wall opening, respectively.

In some embodiments, the wall opening may not align with the support wall opening. For example, with respect to mounted frame structure 2495E in FIG. 24E, the engagement feature may only engage the frame sidewall and the peak of the structured portion of the bottom flange. With respect to mounted frame structure 2495F in FIG. 24F, the engagement feature may only engage the support wall and the peak of the structured portion of the bottom flange. In either embodiment, the resulting compressive force may, on average, be located between the frame sidewall and the support wall.

Figure 24G:
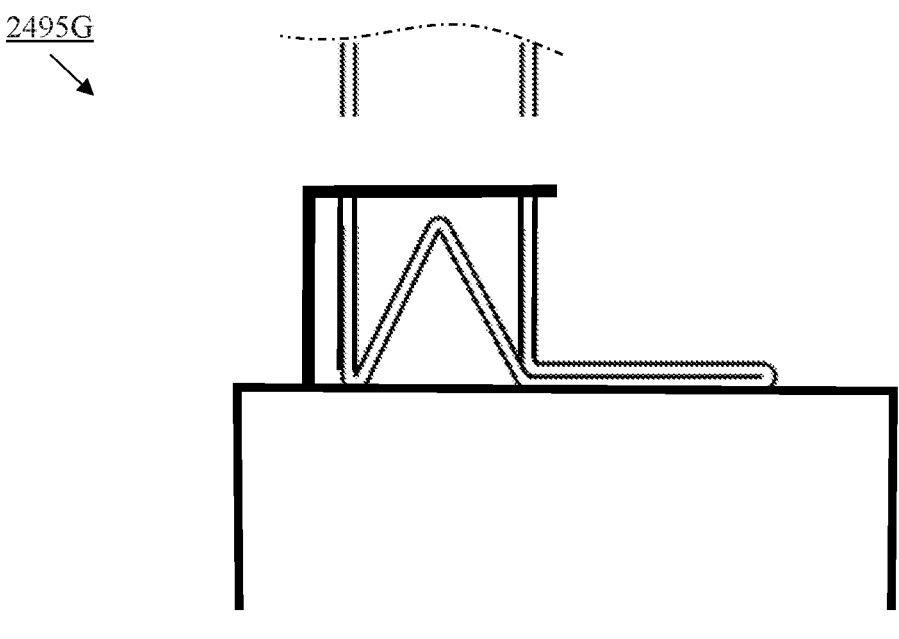
Figure 24H:
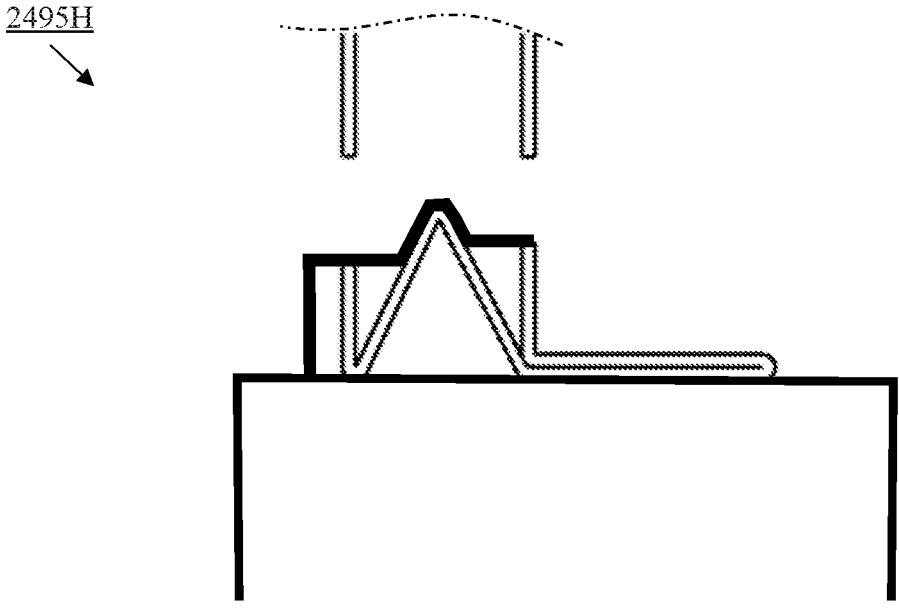
Figure 24I:
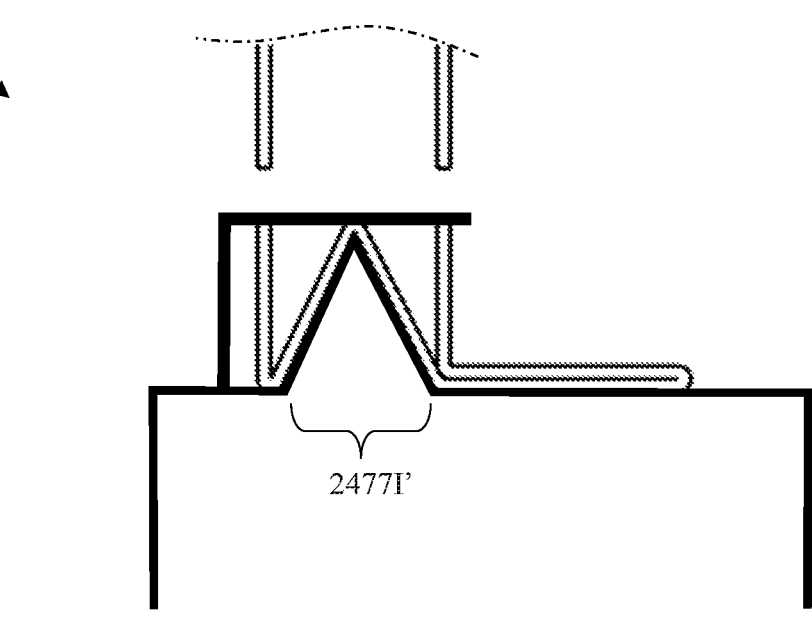

In some embodiments, as shown with respect to mounted frame structure 2495G in FIG. 24G, the attachment feature may engage the frame sidewall and the support wall, but the peak of the structured portion of the bottom flange may be lower and not engage. The resulting compressive force may, on average, be located between the frame sidewall and the support wall.

In some embodiments, the portion of the attachment feature which may physically contact the frame may not be flat. For example, as shown for mounted frame structure 2495H in FIG. 24H, the attachment feature may be a structured attachment feature that may include one or more bends or folds to form a shape that may be complementary to the portion(s) of the frame section it may engage with. In some embodiments, this may improve alignment during mounting and/or increase the surface area of engagement.

Although support structures may have a generally flat upper surface, in some embodiments, a support structure may have an upper surface structure that may cooperate with a structured bottom flange. In some cases, a structured upper surface may have a shape complementary to that of a structured bottom flange. For example, as shown with respect to mounted frame structure 2495I in FIG. 24I, a support structure upper surface may include a structured portion 2477I' which may generally match the structured portion of the bottom flange. In some cases, this may provide additional mounting alignment benefits and/or mounting strength. In some embodiments, a frame section may be placed onto the support structure having the structured upper surface and the attachment feature may then be moved into an engagement position.

Figure 24J:
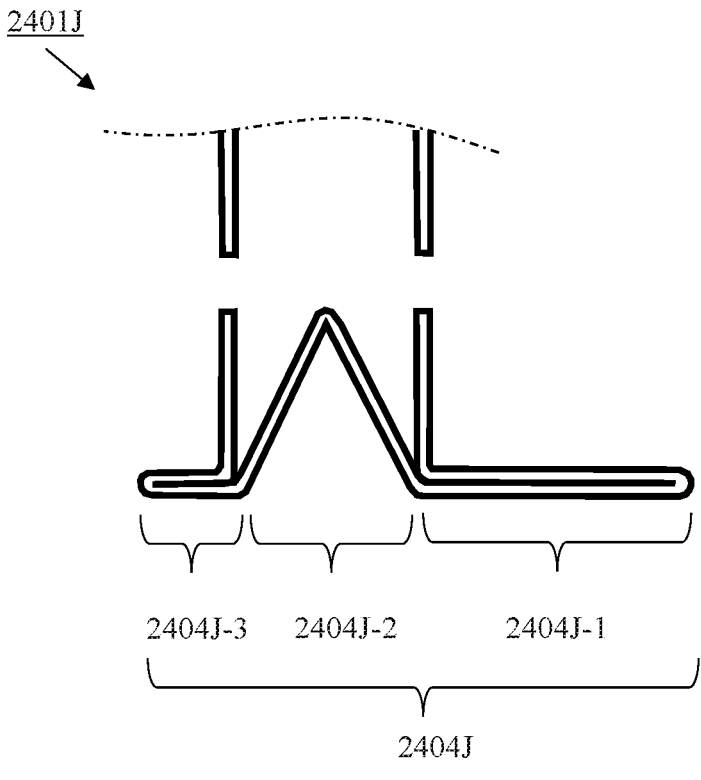
FIG. 24J is a cross-sectional view of a non-limiting example of a frame section according to some embodiments.

FIG. 24J is a cross-sectional view of a non-limiting example of a frame section according to some embodiments. In some cases, a frame section may include a bottom flange that extends outwardly from the frame sidewall. Frame section 2401J may be similar to frame section 2401 of FIG. 24A but may include additional folds so that the bottom flange 2404J may include a first horizontal portion 2404J-1 (extending inwardly in the present figure), a structured portion 2404J-2, and even a second horizontal portion 2404J-3 (extending outwardly in the present figure). Although not shown, the outwardly extending portion 2404J-3 of the bottom flange may in some embodiments be non-horizontal or even have a non-flat structure. Any frame section of the present application may optionally include an outwardly extending bottom flange perhaps so long as it does not interfere with mounting. In some cases, an outwardly extending bottom flange may cooperate with the support structure to aid in mounting alignment or strength. In some embodiments, an outwardly extending bottom flange may improve the stability of the mounted frame structure.

Figure 17:
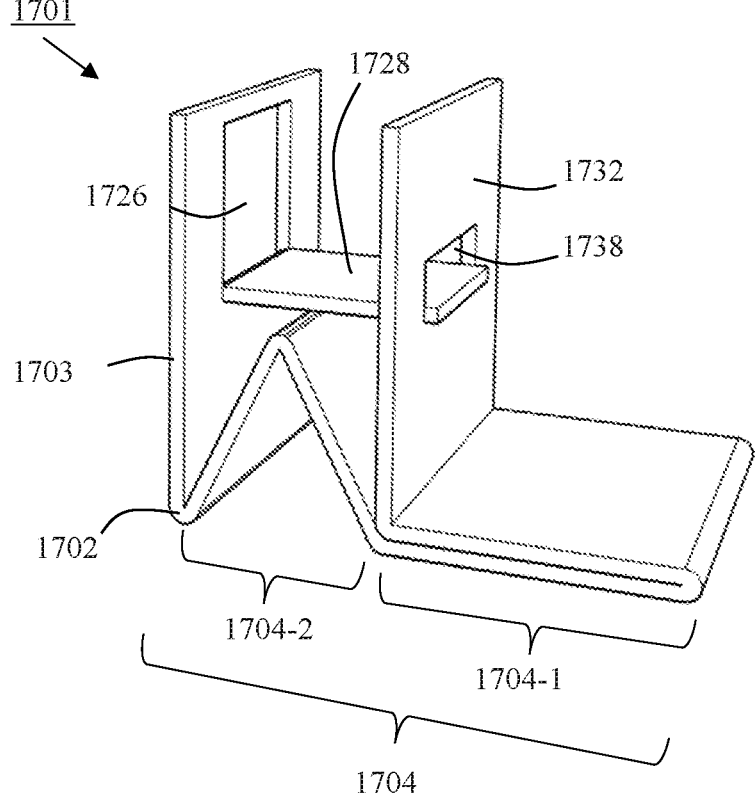
FIG. 17 is a perspective view of a cutaway portion of a non-limiting example of a frame section according to some embodiments.

FIG. 17 is a perspective view of a cutaway portion of a non-limiting example of a frame section according to some embodiments. For clarity, the panel containment structure is not shown. Frame section 1701 may include a structured bottom flange 1704 that may include a horizontal portion 1704-1 and a structured portion 1704-2 that may lie at least partially outside the general plane of the horizontal portion 1704-1. Structured portion 1704-2 may include a peak that may be formed from a bend in the framework material. A lengthwise fold 1702 may define an intersection with frame sidewall 1703. A wall opening 1726 may be provided in frame sidewall 1703. A support wall opening 1738 may be provided in support wall 1732. A flap 1728 may be formed from wall opening 1726 extending to the support wall opening and forming a bridge structure. In some embodiments, the peak of structured portion 1704-2 may align with the bottom of the wall opening 1726 or flap 1728. In some cases, this may add additional strength to the frame section when engaged by an attachment feature (not shown). For example, compressive forces that might be applied by an attachment feature may be distributed between the frame sidewall, the support wall, and the structured portion 1704-2 of the bottom flange.

In some embodiments, a mounting system may include more than one support structure. For example, a mounting system may include a first support structure for attaching a first frame section of a framed panel structure (e.g., using one or more side-mount structures as described herein) and even an opposing support structure for attaching another side of the framed panel structure. The attachment of the opposing support structure may also employ side-mount structures, or alternatively, may use some other mounting system or method. In some embodiments, the opposing support structure may be used to mount the frame section on a side of the framed panel structure opposite that of first frame section which may be the opposing frame section. In some embodiments, the opposing frame section may include one or more wall openings in the opposing frame section sidewall and the opposing support structure may include one or more attachment features that may be the same or different from each other and may be the same or different from one or more attachment features of the first support structure.

Figure 18A:
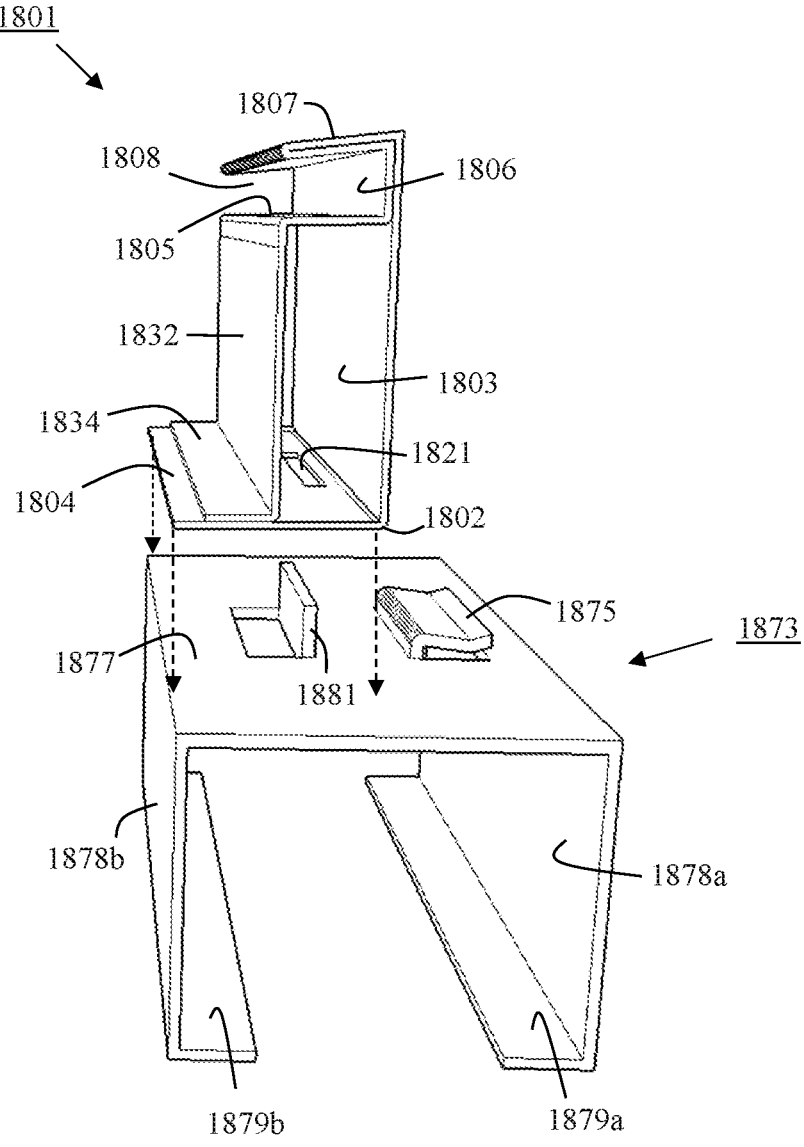
FIG. 18A is perspective view of a cutaway portion of a non-limiting example of a frame section that may have a mounting hole, and a support structure that may include a mounting feature according to some embodiments.

In some embodiments, a framed panel structure may be mounted to a set of support structures using side-mount system on one side of the panel and another (perhaps non-side-mount) mounting system on the opposite side. As a non-limiting example, the other system may include mounting holes in the bottom flange and mounting features in the support structure. FIG. 18A is perspective view of a cutaway portion of a non-limiting example of a frame section that may have a mounting hole, and a support structure that may include a mounting feature according to some embodiments. In some embodiments, frame section 1801 may be characterized as a box frame and may include a framework material that has been cut and folded into a desired shape. Frame section 1801 may include a lengthwise fold 1802 that may define an intersection of a frame sidewall 1803 with a bottom flange 1804. The frame section may further include a series of folds that may form a panel containment structure that may include a lower shelf 1805, an optional pocket wall 1806, an optional top lip 1807, and perhaps even a pocket region 1808. The frame section may include a lengthwise fold 1845 that may define an intersection of the lower shelf 1805 and a support wall 1832. The support wall may extend from the lower shelf 1805 to, and may engage with, the bottom flange 1804. The support wall may include an end flange 1834 that may be flush with the bottom flange 1804 and which may assist engaging the support wall with the bottom flange. The end flange and bottom flange together may represent a bottom flange having multiple layers of framework material. The bottom flange 1804 may include a mounting hole 1821. The mounting hole may be designed to receive a mounting feature in the support structure as discussed herein. The panel (not shown for clarity) may engage with the panel containment structure and secured in place, optionally with a sealant or the like, that may have adhesive properties.

The support structure 1873 may in some embodiments be a racking rail or a rail mount. In some embodiments, support structure 1873 may include an upper surface 1877 formed of a support structure material. The upper surface 1877 may be characterized by an upper surface plane. The upper surface 1877 may be attached to support sidewalls 1878a, 1878b. The support structure may include support flanges 1879a, 1879b at the base of the support structure sidewalls. A mounting feature 1881 may extend upwardly away from the upper surface plane. In some embodiments, the mounting feature may be formed of the support structure material. Although shown as a tab, mounting feature may take the form of a post or some other shape that may work cooperatively with mounting hole to engage the frame for mounting, or the like. In some embodiments, the mounting feature may be substantially orthogonal with the upper surface plane, but alternatively, may be at an angle. In some embodiments, support structure 1873 may include an attachment feature 1875 that may be used for side-mount systems as discussed herein.

As indicated by the dashed arrows, in some embodiments, the frame section 1801 may be attached to support structure 1873 by providing relative motion so that the mounting feature 1881 may extend through mounting hole 1821. In some embodiments, the mounting feature may engage the frame and to hold it in a desired position. In some embodiments, engagement of the mounting feature with the frame may include friction, spring forces, locking features, geometry, crimping, clinching, welding, adhesives, rivets, bolts, screws, or the like. In some embodiments, engagement may include an initial engagement followed by a secondary engagement. The secondary engagement may increase the engagement strength and/or reduce relative motion between the frame and the support structure perhaps as compared to the initial engagement. In a non-limiting example, an initial engagement may utilize friction, spring forces, locking features, geometry, or the like, and a secondary engagement may include crimping, clinching, welding, adhesives, rivets, bolts, screws, or the like. In some embodiments, the mounting hole may be a reinforced mounting hole, e.g., as described in PCT application PCT/US2022/025388 filed on Apr. 19, 2022, which is incorporated by reference herein for all purposes.

Figure 18B:
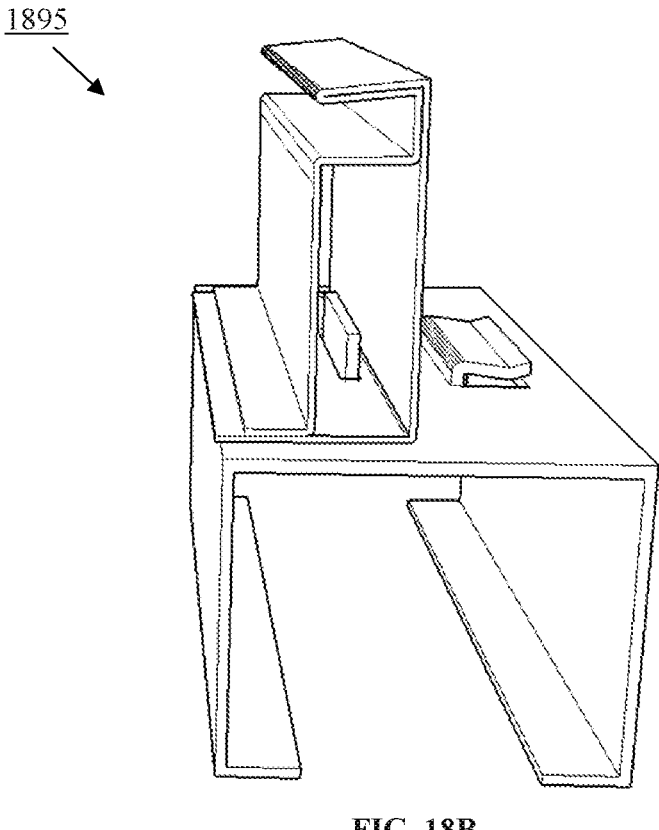
FIG. 18B is a perspective view of a cutaway portion of a non-limiting example of a mounted frame structure according to some embodiments.

FIG. 18B illustrates the frame and the support structure from FIG. 18A, but with the frame now attached or perhaps mounted to the support structure which may be a mounted frame structure 1895 according to some non-limiting example embodiments. For clarity the part numbers are generally not labelled. In some embodiments (not shown), after mounting, the mounting feature may be bent over to lock the frame to the support structure.

Figure 18C:
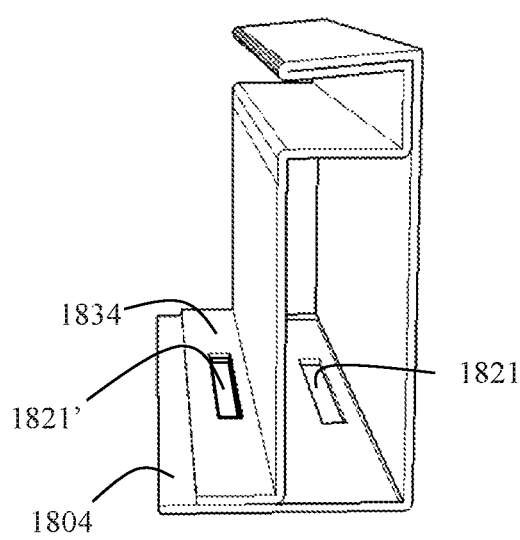
FIG. 18C is a perspective view of a cutaway portion of a non-limiting example of a frame section that may have multiple mounting holes according to some embodiments.

In some embodiments, the mounting hole may be located at the end flange 1834 and may extend through both the end flange 1834 and bottom flange 1804. In some cases, having the mounting hole go through multiple layers of framework material may reinforce the strength of the mounting hole area. In some embodiments, the frame section may include multiple mounting holes. FIG. 18C is a perspective view of a cutaway portion of a non-limiting example of a frame section that may have multiple mounting holes according to some embodiments. The frame may be similar to that described with respect to FIG. 18A and may include mounting hole 1821 in bottom flange 1804 and mounting hole 1821' located at the end flange 1834 and may extend through both end flange 1834 and bottom flange 1804. Not shown, each mounting hole may be designed to receive a respective mounting feature in the support structure. Among other potential advantages, in some cases, multiple mounting holes and mounting features may allow for more accurate alignment and/or provide additional structural support to the mounted frame structure.

FIGS. 19A-19E are cross-sectional views of a non-limiting example of a mounting system and method for mounting according to some embodiments.

Figure 19A:
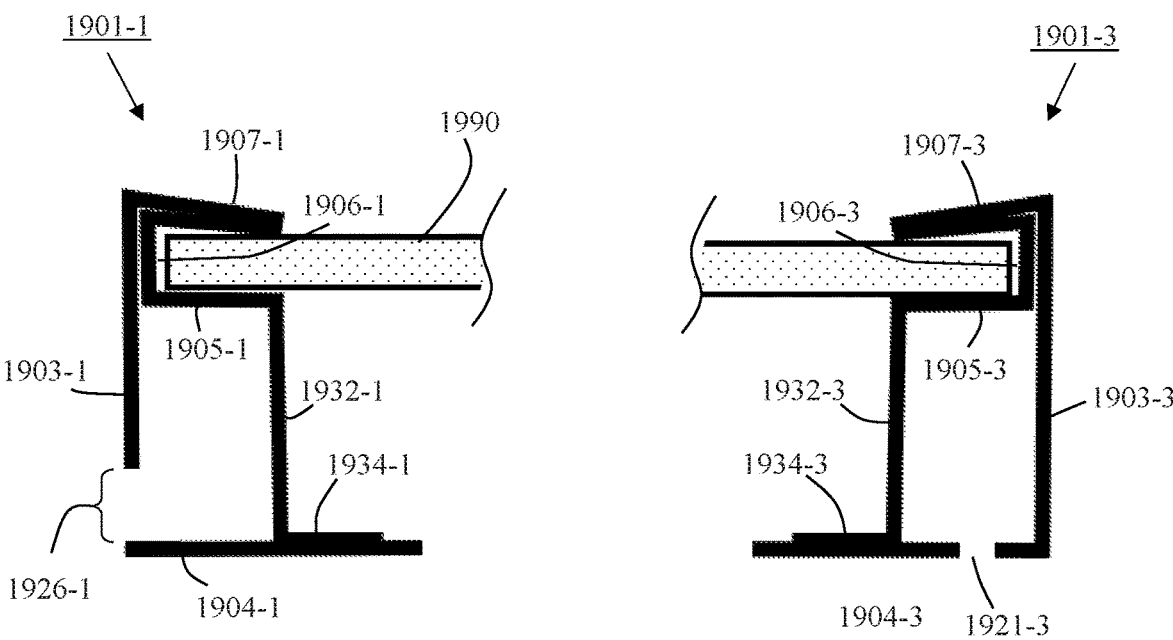
FIG. 19A is a cross-sectional view of a non-limiting example of a framed panel structure according to some embodiments.

FIG. 19A shows a framed panel structure including a first frame section 1901-1 and an opposing frame section 1901-3 on an opposite side of the first frame section. In some embodiments, the framed panel structure may optionally be similar to any of the frame sections described elsewhere herein.

Frame section 1901-1, 1901-3 may include a lengthwise fold that may define an intersection of a frame sidewall 1903-1, 1903-3 with a bottom flange 1904-1, 1904-3. The frame may further include a series of folds that may form a panel containment structure that may include a lower shelf 1905-1, 1905-3, an optional pocket wall (not labelled) and an optional top lip 1907-1, 1907-3. The frame section may include a lengthwise fold that may define an intersection of the lower shelf 1905-1, 1905-3 and even a support wall 1932-1, 1932-3. The support wall may extend from the lower shelf 1905-1, 1905-3 to, and may engage with, the bottom flange 1904-1, 1904-3. The support wall may include an end flange 1934-1, 1934-3 that may be flush with the bottom flange 1904-1, 1904-3 and which may assist engaging the support wall with the bottom flange. The end flange and bottom flange together may represent a bottom flange having multiple layers of framework material. Panel 1990 may engage with the panel containment structure and secured in place, optionally with a sealant that may have adhesive properties. First frame section 1901-1 may include a wall opening 1926-1 in its sidewall. Opposing frame section 1901-3 may include a mounting hole 1921-3 in its bottom flange.

Figure 19B:
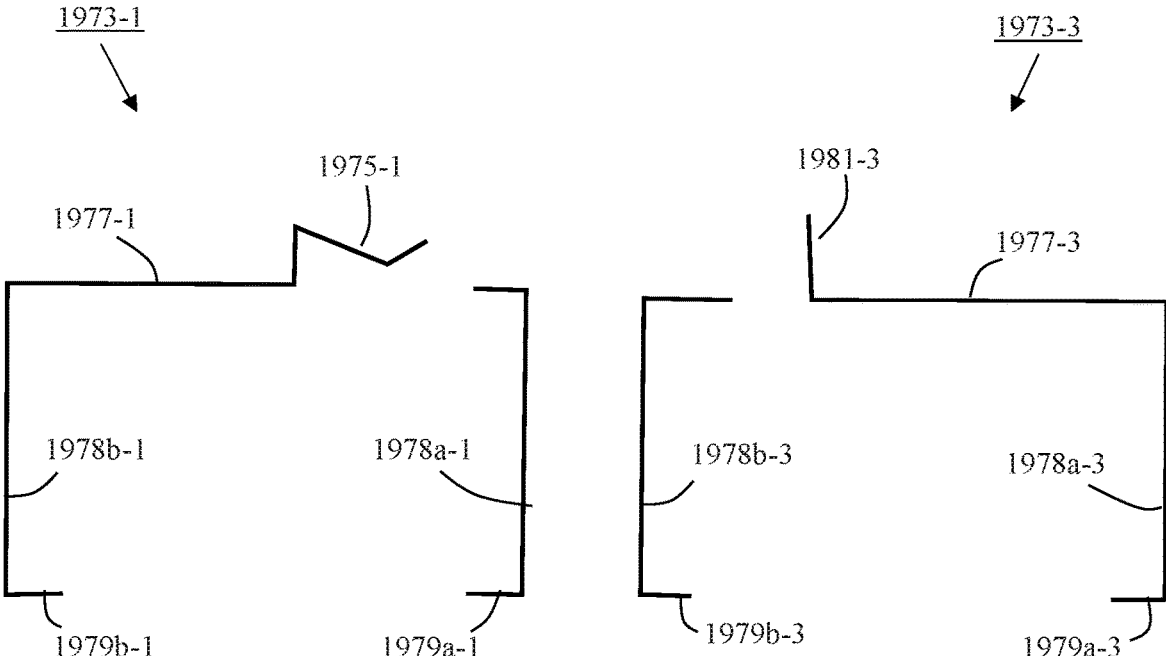
FIG. 19B is a cross-sectional view of a non-limiting example of a first support structure and an opposing support structure according to some embodiments.

In FIG. 19B, first support structure 1973-1 may be designed for mounting frame section 1901-1 and in some embodiments may be similar to support structure 773 shown in FIG. 7A. Opposing support structure 1973-3 may be designed for mounting frame section 1901-3 and in some embodiments may be similar to support structure 1873 shown in FIG. 18A. In some embodiments, the support structure 1973-1, 1973-3 may include an upper surface 1977-1, 1977-3 formed of a support structure material. The upper surface 1977-1, 1977-3 may be characterized by an upper surface plane. The upper surface 1977-1, 1977-3 may be attached to support sidewalls 1978a-1, 1978b-3. The support structure may include support flanges 1979a-1, 1979b-1 at the base of the support sidewalls. First support structure 1973-1 may include an attachment feature 1975-7 may be provided on the upper surface 1977-1, at least a portion of which may be positioned above the upper surface plane. Opposing support structure 1973-3 may include a mounting feature 1981-3 that may extend upwardly away from the upper surface plane of upper surface 1977-3.

Figure 19C:
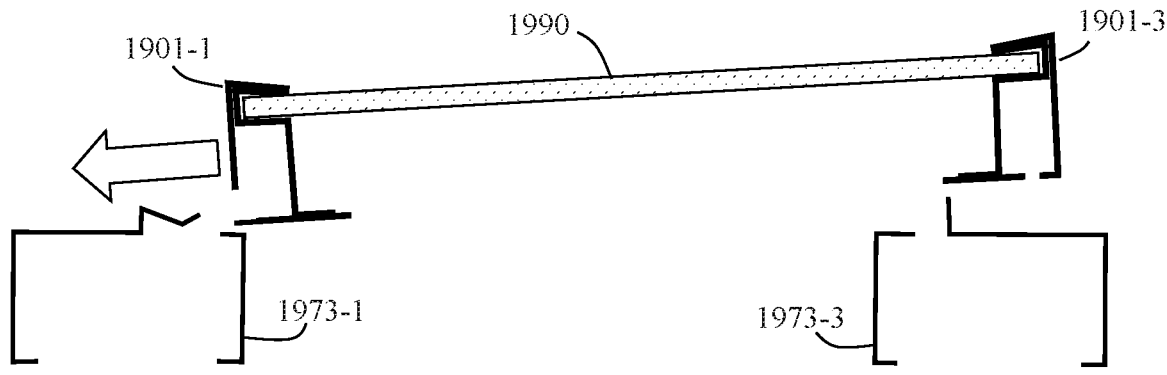
FIGS. 19C-19E are cross-sectional views illustrating a non-limiting example of a method for mounting a framed panel structure according to some embodiments.
Figure 19D:
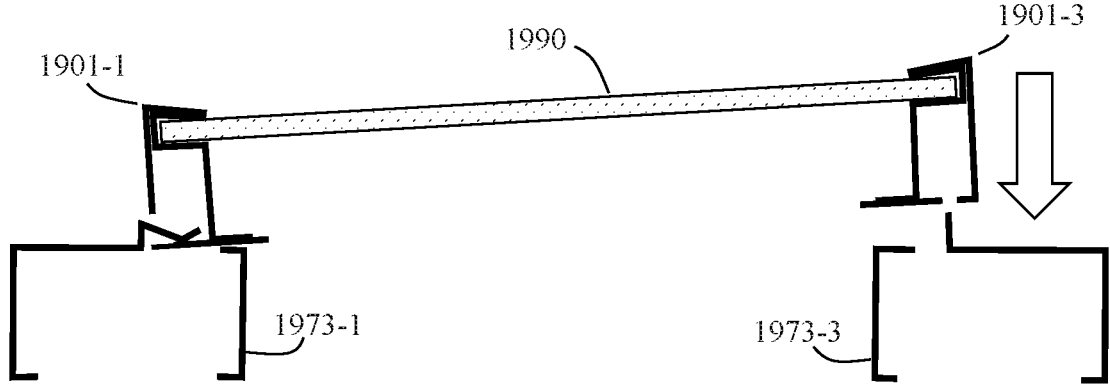
Figure 19E:
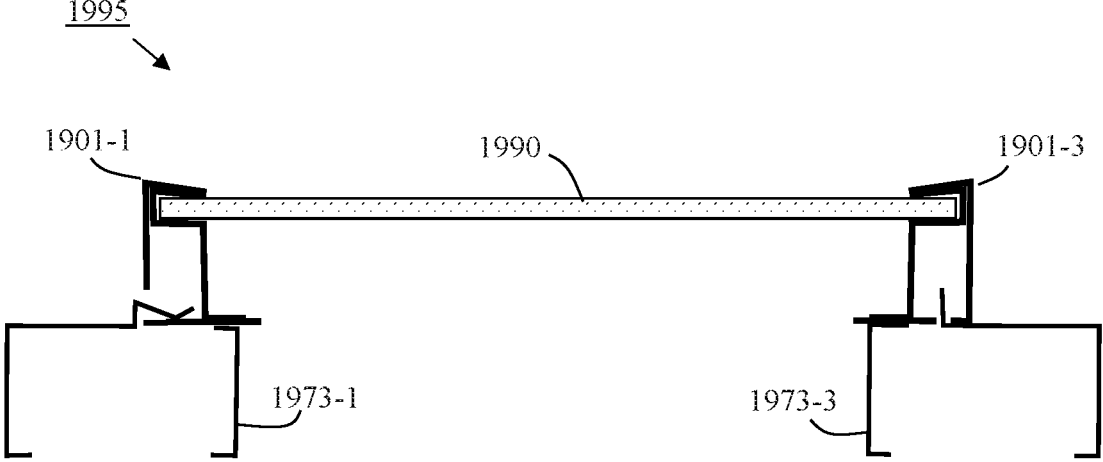

FIGS. 19C-19E illustrate a non-limiting example of a method for mounting a framed panel structure according to some embodiments. In FIG. 19C, the first frame section 1901-1 may be initially aligned at the edge of the first support structure 1973-1. The opposing frame section 1901-3 and panel 1990 may be held at a slightly elevated angle so that the bottom flange of the opposing frame section 1901-3 may be higher than the top of the mounting feature of opposing support structure 1973-3. The framed panel structure may be slid or even moved sideways as shown by the arrow so that the attachment feature of the first support structure 1973-1 engages the first frame section 1901-1 to form an intermediate assembly state as shown in FIG. 19D. In some embodiments, the alignment tolerance for the mounting feature with the mounting hole may be tighter than that for the side-mount system. In some embodiments, the engagement between the first frame section and the first support structure may allow some lateral movement so that mounting hole of the opposing frame section may be more easily aligned with the mounting feature of the opposing support structure. The opposing frame section 1901-3 may then be pushed down onto the opposing support structure 1973-3 as indicated by the arrow to form mounted panel structure 1995 in FIG. 19E.

Figure 20A:
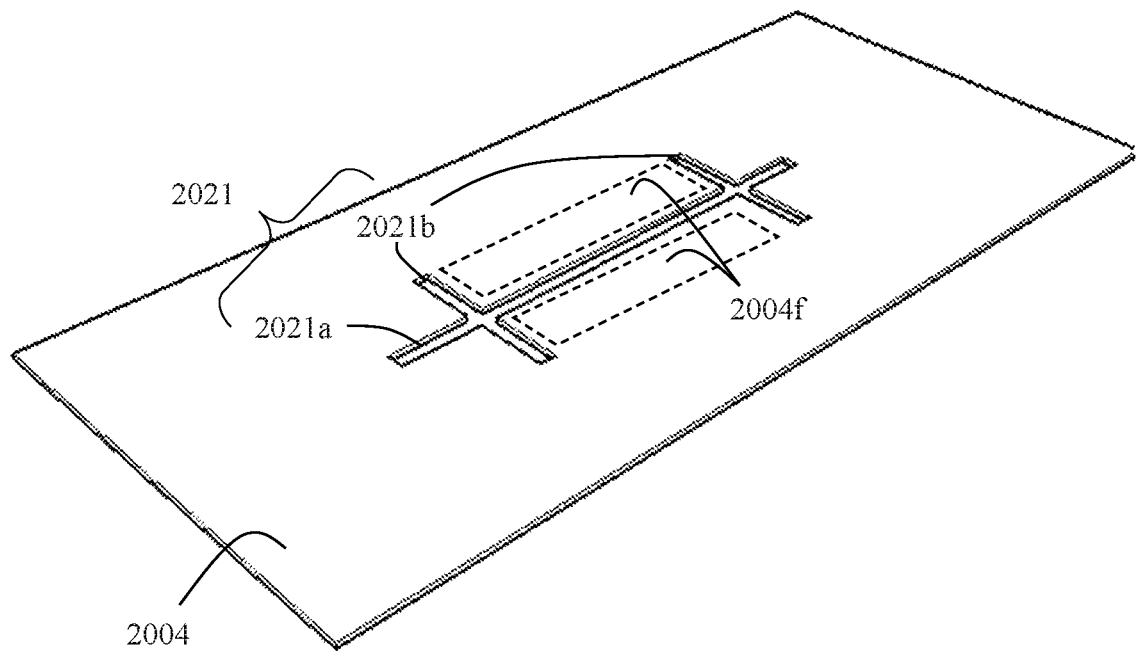
FIG. 20A is a perspective view of a cutaway portion of a non-limiting example of a mounting hole in a bottom flange according to some embodiments.
Figures 20B, 20C:
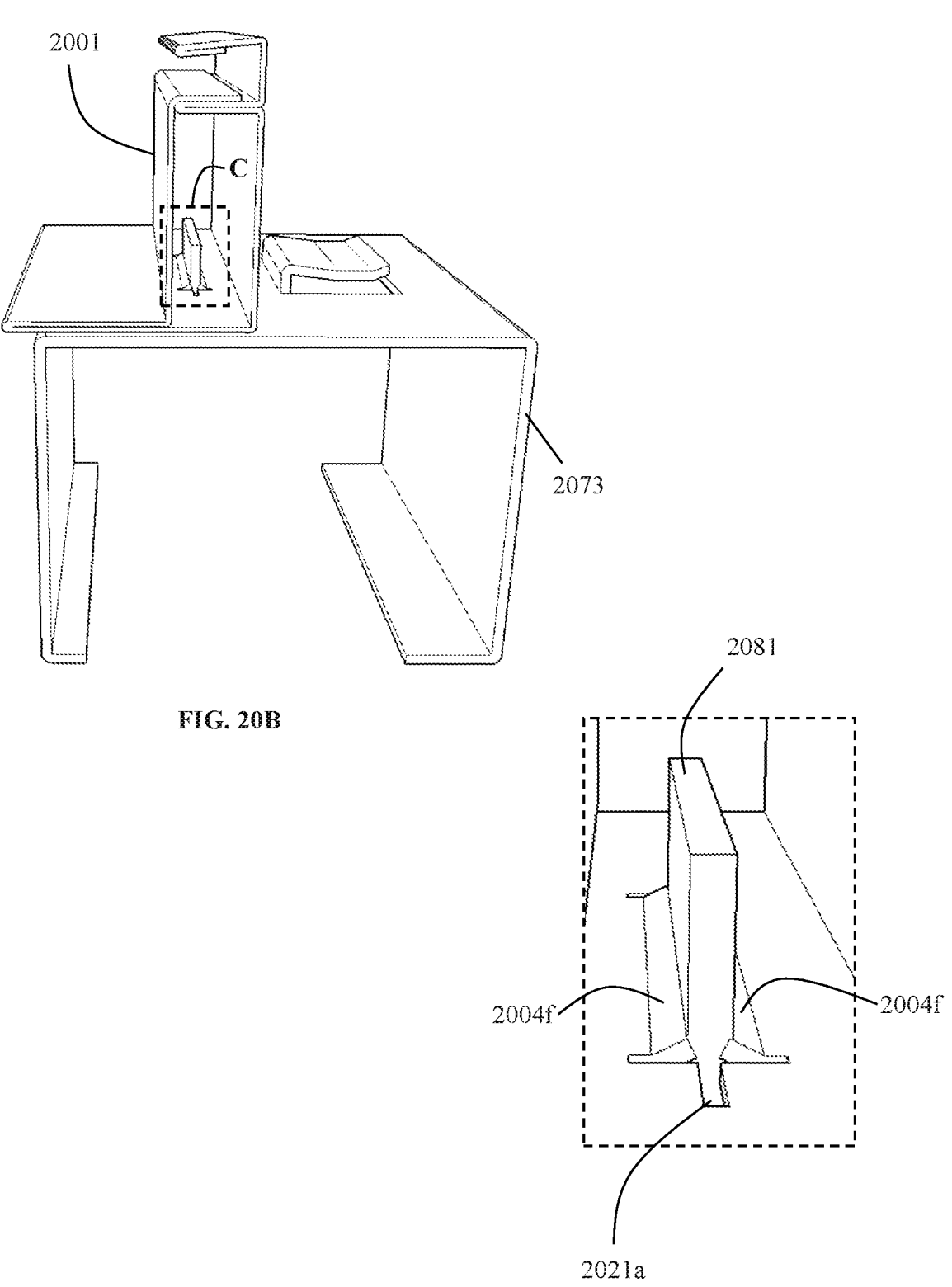
FIG. 20B is perspective view of a cutaway portion of a non-limiting example of a frame section mounted to a support structure according to some embodiments.
FIG. 20C is a closeup view of area C from FIG. 20B.

FIG. 20A is a perspective view of a non-limiting example of a mounting hole. In some embodiments, a mounting hole 2021 may be provided in a bottom flange 2004 of a frame section and may include multiple slits, for example a long slit 2021a and even two shorter slits 2021b that can intersect the long slit. Such a structure may form bendable flaps 2004f in the bottom flange The space shown in FIG. 20A. In some cases, mounting hole 2021 may be referred to as a crossed-slot mounting hole or even a press-fit mounting hole. When a mounting feature, e.g., a tab-type mounting feature or the like, may be pushed through the mounting hole, the flaps of the mounting hole may bend upwards and a spring force and/or friction may be generated between the flap and the mounting feature that may act to lock the frame with the support structure. In some embodiments, such a mounting hole/mounting feature may be characterized as a type of press fit mounting system. In some cases, the mounting feature such as a tab may include a groove or even a series of grooves that may catch the flaps of the mounting hole that may act to engage lock the frame with the support structure. FIG. 20B is perspective view of a cutaway portion of a non-limiting example of a frame section mounted to a support structure according to some embodiments. Frame section 2001 and support structure 2073 may optionally be similar to any of those described herein. FIG. 20C is a closeup view of area C from FIG. 20B. This figure illustrates a press-fit embodiment where the mounting hole flaps 2004 may be bent upwards when mounting feature 2081 may be pushed through mounting hole 2021 as described above.

Figure 21A:
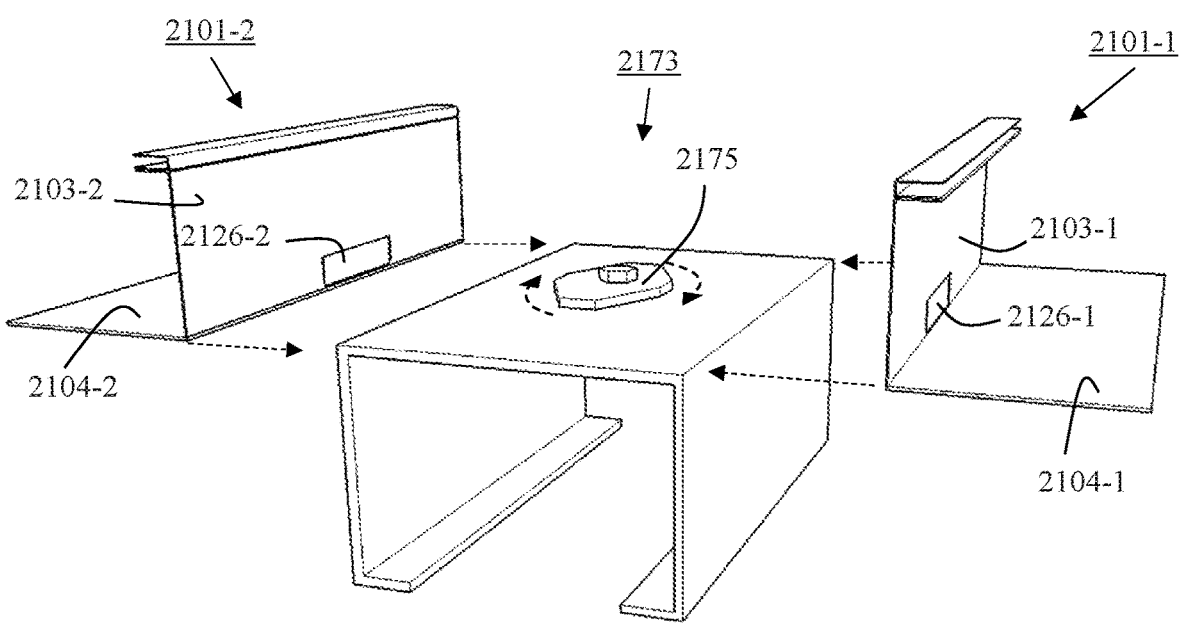
FIG. 21A is a perspective view of a cutaway portion of a non-limiting example of frame sections from two framed panel structures and a support structure according to some embodiments.
Figure 21B:
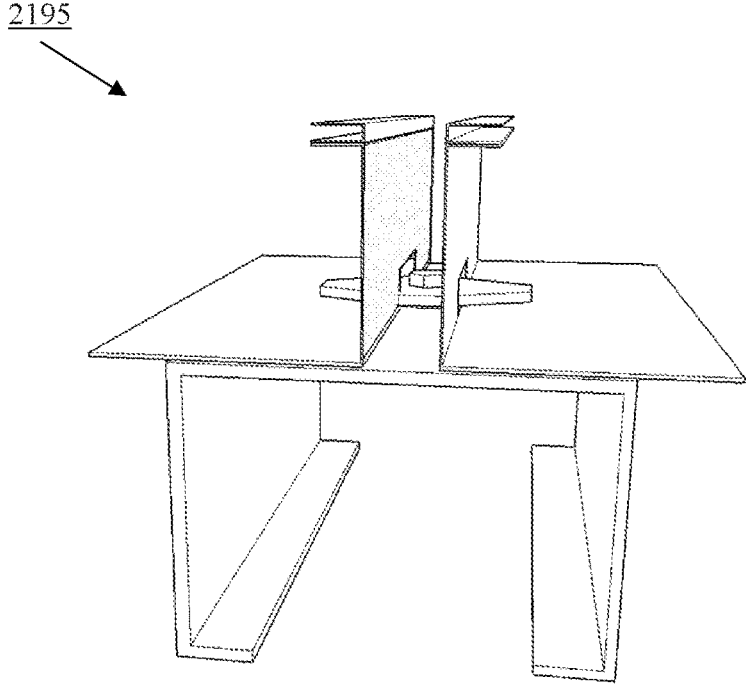
FIG. 21B is a perspective view of a cutaway portion of a non-limiting example of a mounted frame structure according to some embodiments.

FIG. 21A is a perspective view of a cutaway portion of a non-limiting example of frame sections from two framed panel structures and a support structure according to some embodiments. The support structure 2173 may include an attachment feature 2175 that may have a rotatable structure that may be at least partially pivotable in a plane approximately parallel to an upper surface plane of the support structure. In some embodiments, the rotatable structure may be in the form of a blade or an arm or the like. In some cases, a first frame section 2101-1 may be part of a first framed panel structure and a second frame section 2101-2 may be part of a second framed panel structure, where both framed panel structures may be mounted to the same support structure. The frame sections may include a bottom flange 2104-1, 2104-2 and even a wall opening 2126-1, 2126-2 provided in a frame sidewall 2103-1, 2103-2. Each frame section may further include a panel containment structure provided at an upper portion of the frame sidewall. For clarity, the respective panels and other frame components are not shown. In some embodiments, the wall openings of the frames may be long enough to permit the rotatable structure to pivot perhaps between a first position outside the wall opening and a second position extending through the wall opening. FIG. 21B illustrates the mounted frame structure 2195 where both frames may be mounted to the support structure with the rotatable structure perhaps in its second position. In some embodiments, the rotatable structure attachment feature and the frames may include additional features that may promote engagement including, but not limited to, flaps, openings, lips, hooks and other features described herein, or the like. In some embodiments, the rotatable structure may apply a downward force when in its second (mounted) position. In some embodiments, the rotatable structure may include a spring that may be activated in its second position or may even be a tightenable feature such as a bolt, screw, or the like. In some embodiments, rather than being substantially rotatable, the attachment feature may include two blades or arms, or the like (such as shown in FIG. 21B) and the frames may be slid or even moved into mounting position such that the attachment feature may engage the frames in any manner previously discussed or the like.

As mentioned, in some embodiments, a wall opening, a support wall opening, a mounting hole, or the like may be a reinforced mounting hole, perhaps as described in PCT application PCT/US2022/025388 filed on Apr. 19, 2022, which is incorporated by reference herein for all purposes. In some embodiments, the reinforced mounting hole may be formed by providing an opening through multiple layers of framework material perhaps so that the effective depth of the hole or opening may be greater than the thickness of the framework material. A non-limiting example is shown in FIG. 14G. However, other types of reinforced mounting holes may be used. In the figures below, much of the discussion may be with respect to wall openings having reinforced mounting holes (which may be also called reinforced wall openings), but the same principals may apply to support wall openings and other mounting holes, or the like.

Figure 22A:
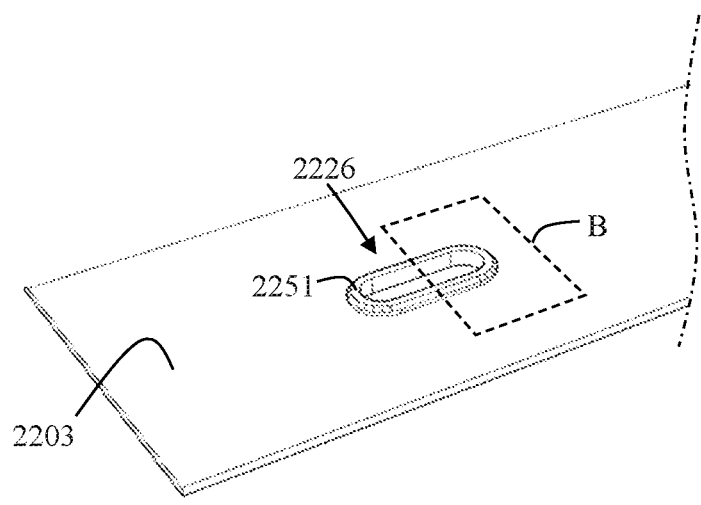
FIG. 22A is a perspective view of a cutaway portion of a non-limiting example of a frame sidewall having a reinforced wall opening according to some embodiments.
Figure 22B:
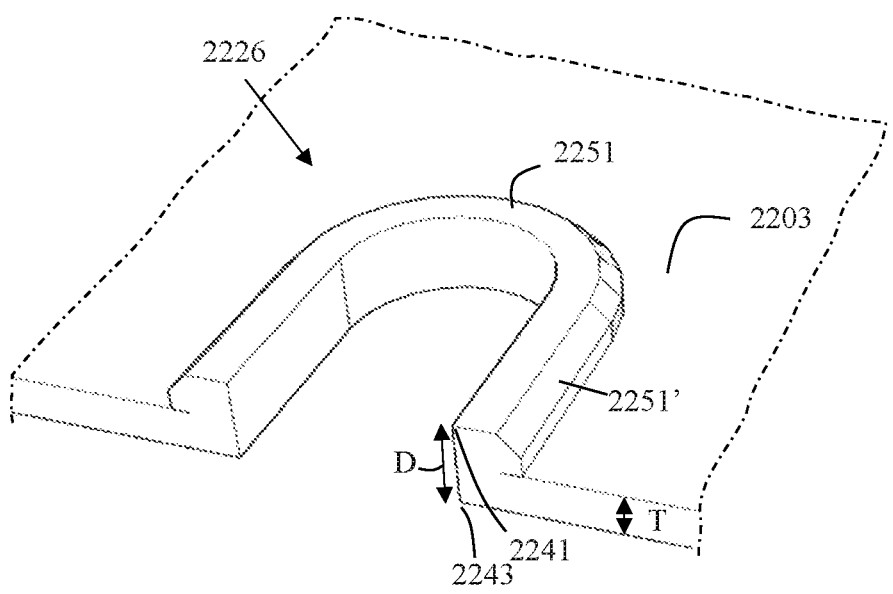
FIG. 22B is a perspective view of a cutaway subsection corresponding to box B of FIG. 22A.

FIG. 22A is a perspective view of a cutaway portion of a non-limiting example of a frame sidewall having a reinforced wall opening according to some embodiments. FIG. 22B is a perspective view of a cutaway subsection corresponding to box B of FIG. 22A. Frame sidewall 2203 may include a reinforced wall opening 2226 which may include a raised rim structure 2251. The reinforced wall opening may be characterized by a depth D that may correspond to the distance between the uppermost 2241 and even the lowermost 2243 edges of the reinforced wall opening (which may correspond to the top of raised rim structure 2251 and even the opposite side of frame sidewall 2203, respectively). Depth D may be greater than the average thickness T of the framework material. In some embodiments, the raised rim structure may include a taper 2251'. In some embodiments, a raised rim structure may be formed from a tool that can push up a perimeter area of an initial hole and optionally forms a taper or other top feature, or the like. In some cases, a raised rim structure may be formed using a grommet tool. In some embodiments, a raised rim structure may be formed or partially formed at a roll forming station. In some embodiments, a raised rim structure may be formed or partially formed at a post process station. Although raised rim structures have been shown and discussed as extending upward from the plane of framework material, in some embodiments, a raised rim structure may instead extend downward with the similar effectiveness, and a raised rim structure herein can include either direction, or even both directions, generally orthogonal to the plane from the framework material.

In some embodiments a raised rim structure may be formed by flow drilling, friction drilling, or the like. In some cases, a flow drill may include a conical bit which may be made from a heat-resistant carbide, that can locally heat the framework material perhaps to a point where it can soften so that the bit may penetrate the framework material and perhaps form the opening. The softened framework material may form the raised rim structure upon cooling. Relative to the plane of the framework material, a raised rim structure may extend in either direction or both directions or the like. In some embodiments, flow drilling may be used on a single layer of framework material, or optionally on multiple layers of framework material. In some cases, flow drilling on multiple layers of framework material may cause the layers to form a bond. This may sometimes be referred to as a type of friction welding.

Figure 22C:
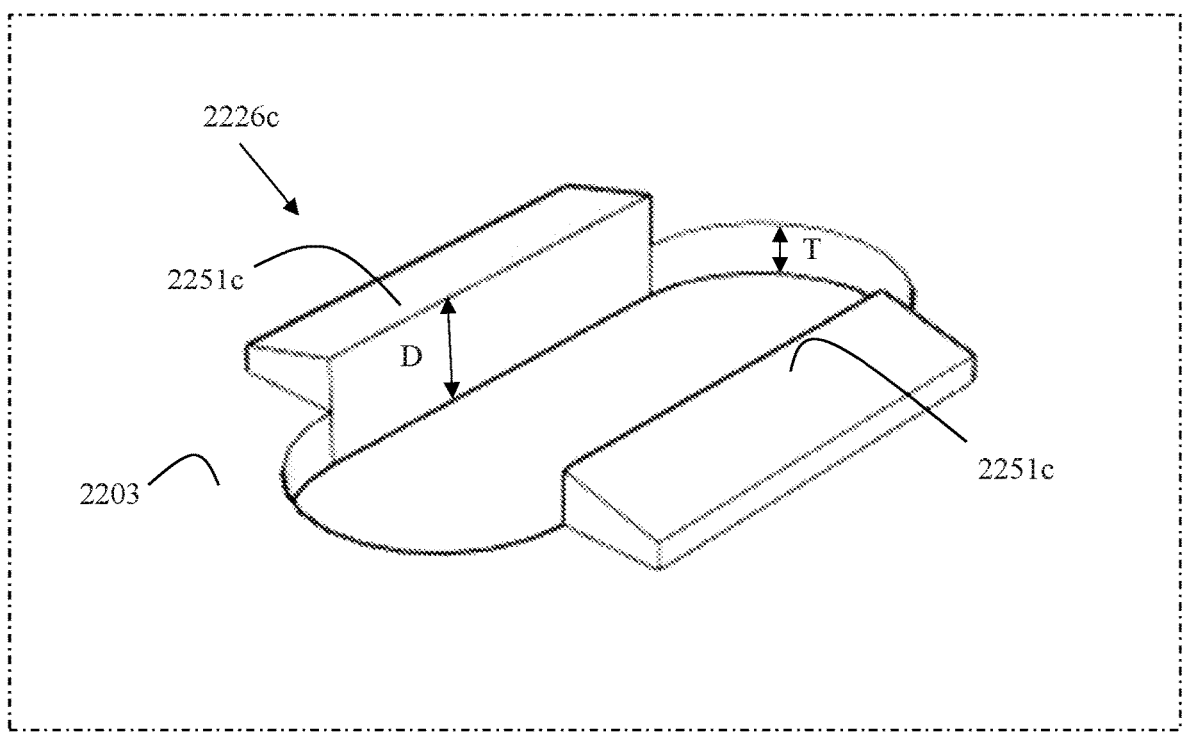
FIG. 22C is a perspective view of a cutaway portion of a non-limiting example of a frame section having a reinforced wall opening according to some embodiments.

In some embodiments, the raised rim structure may not necessarily be provided around the entire perimeter of the reinforced mounting hole. For example, FIG. 22C is a perspective view of a cutaway portion of a non-limiting example of a frame section having a reinforced wall opening 2226c according to some embodiments. FIG. 22C is similar to FIG. 22A except that the raised rim structure 2251c may be provided on either side of an oblong opening or at any other location. In some embodiments, depth D of the reinforced wall opening may be larger than thickness T of the framework material in at least one cross-sectional dimension, but perhaps not necessarily in all cross-sectional dimensions.

Figure 23A:
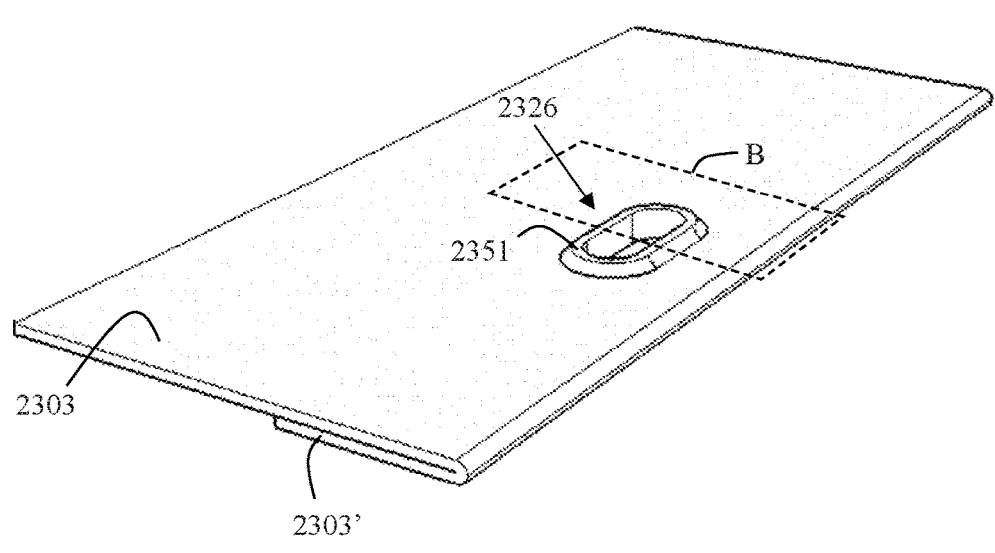
FIG. 23A is a perspective view of a cutaway portion of a non-limiting example of a reinforced wall opening according to some embodiments.
Figure 23B:
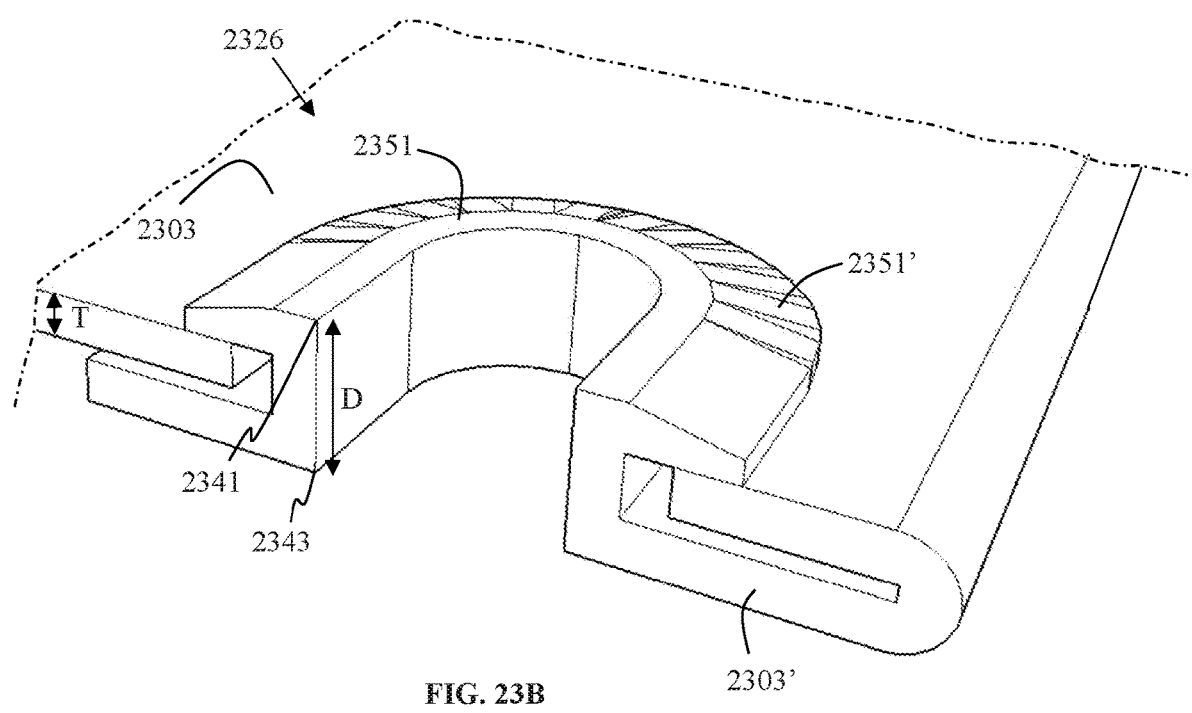
FIG. 23B is a perspective view of a cutaway subsection corresponding to box B of FIG. 23A.

In some embodiments, a reinforced mounting hole may include both multiple layers of framework material and even a raised rim structure. FIG. 23A is a perspective view of a cutaway portion of a non-limiting example of a reinforced wall opening according to some embodiments. FIG. 23B is a perspective view of a cutaway subsection corresponding to box B of FIG. 23A. The frame or even a frame precursor structure may include a framework material which may be characterized by an average thickness T and which may have been cut and even folded into a desired shape. For clarity, most of the frame section parts are not shown. The frame sidewall may include multiple layers of framework material, frame sidewall layer 2303 and perhaps even a frame sidewall layer 2303'. A reinforced wall opening 2326 may be formed in frame sidewall and may further include a raised rim structure 2351. In some embodiments, the raised rim structure may include a taper 2351'. In some embodiments, a raised rim structure may be formed from the framework material of frame sidewall layer 2303' that is, perhaps using an appropriate tool, may be pushed through an opening in frame sidewall layer 2303. Optionally a taper or other top feature may also be formed. The reinforced wall opening may have a depth D that may correspond to the distance between the first 2341 and even second 2343 edges of the reinforced wall opening (which may correspond to the top of raised rim structure 2351 and even the opposite surface of frame sidewall layer 2303', respectively). Depth D may be greater than the average thickness T of the framework material. In some embodiments, the frame sidewall layer 2303 may be described as a first layer of framework material perhaps having a first layer opening, the frame sidewall layer 2303' may be described as a second layer of framework material perhaps having a second layer opening in functional alignment with the first opening, and the raised rim structure 2351 may be characterized as formed at least in part from the second layer of framework material which may extend through the first layer opening. In some embodiments, the reinforcement and increased depth may be achieved by combining multiple layers of framework material perhaps at the reinforced wall opening location with raised rim structure features.

Although described herein with respect to their utility in making frames for solar panels, the methods, equipment, and devices of the present application may be used to manufacture many other products in many other fields. In some cases, such other products may be those formed at least in part from a generally flat starting material including, but not limited to, sheet metal (coated or uncoated).

It should be noted that various parts and frame features, including but not limited to, frame sidewalls and bottom flanges, have generally be represented in their respective figures as being straight or flat, but in some embodiments, one or more of these features (or other features shown as being straight or flat) may instead be non-straight or even non-flat. For example, one or more of these features may include one or more curves or additional bends or the like and still effectively perform their intended function.

Note also that in any of the figures herein, folds that may be represented as having sharp corners may be replaced with rounded corners. In some embodiments, a corner formed by a fold may be characterized by a bending radius.

In some embodiments, in areas where a portion of framework material may come into contact with another material including, but not limited to, another portion of framework material, a bolt, a washer, a support structure, or the like, such areas may optionally include an anti-corrosion coating or even an additional anti-corrosion coating treatment including, but not limited to, those discussed herein.

In some embodiments, in areas where multiple layers of framework material may be formed, such areas may optionally include a bonding or even an attachment feature perhaps to hold the layers together. Some non-limiting examples of attachment features may include a crimp, a clinch, an interlocking feature between the layers, double-sided adhesive tape, an adhesive, a weld, a braze, a solder, or the like. In some embodiments, an anticorrosion coating may also have adhesive properties and may act as an attachment feature.

Still further embodiments herein include the following enumerated embodiments. The terms "including" (and its variations, "includes", "include") in these enumerated embodiments encompasses its normal meaning in addition to "comprising" ("comprises", "comprise") and/or "consisting of" ("consists of", "consist of") and/or "consisting essentially of" ("consists essentially of", consist essentially of").

Enumerated embodiment 1. A mounting system for a solar panel including:

a frame including at least a first frame section, the first frame section including:

an elongated piece of framework material having a first end and a second end, wherein the first and second ends define a lengthwise dimension;

a lengthwise fold defining an intersection of a frame sidewall with a bottom flange, wherein at least a portion the frame sidewall extends above the bottom flange;

a first wall opening in the frame sidewall; and a panel containment structure at an upper portion of the frame sidewall, the panel containment structure including a lower shelf extending from the sidewall, wherein the panel containment structure engages a bottom surface of the solar panel at a first panel edge area; and a first support structure including:

an upper surface including a support structure material and an upper surface plane; and a first attachment feature, at least a portion of which is positioned above the upper surface plane, wherein at least a portion the first frame section rests on at least a portion of the upper surface, and wherein the first attachment feature extends through the first wall opening and engages the frame.

Enumerated embodiment 2. The mounting system of enumerated embodiment 1 or any other enumerated embodiment, wherein the attachment feature applies a compressive force between the frame and the upper surface of the support structure.

Enumerated embodiment 3. The mounting system of enumerated embodiment 1 or 2 or any other enumerated embodiment, wherein the attachment feature is formed at least in part from the support structure material.

Enumerated embodiment 4. The mounting system according to any of enumerated embodiments 1-3 or any other enumerated embodiment, wherein the attachment feature engages with the bottom flange.

Enumerated embodiment 5. The mounting system according to any of enumerated embodiments 1-4 or any other enumerated embodiment, wherein the attachment feature engages the frame sidewall.

Enumerated embodiment 6. The mounting system according to any of enumerated embodiments 1-5 or any other enumerated embodiment, wherein the first wall opening includes a reinforced mounting hole.

Enumerated embodiment 7. The mounting system according to any of enumerated embodiments 1-6 or any other enumerated embodiment, wherein the first wall opening is positioned at the bottom of the frame sidewall.

Enumerated embodiment 8. The mounting system according to any of enumerated embodiments 1-6 or any other enumerated embodiment, wherein the first wall opening is spaced above the bottom of the frame sidewall.

Enumerated embodiment 9. The mounting system of enumerated embodiment 8 or any other enumerated embodiment, wherein the frame sidewall includes multiple layers of framework material at least below the first wall opening.

Enumerated embodiment 10. The mounting system according to any of enumerated embodiments 1-9 or any other enumerated embodiment, wherein the first frame section further includes a flap of framework material extending from the bottom of the first wall opening over at least a portion of the bottom flange.

Enumerated embodiment 11. The mounting system of enumerated embodiment 10 or any other enumerated embodiment, wherein the attachment feature further includes a lip that engages with an end of the flap.

Enumerated embodiment 12. The mounting system according to any of enumerated embodiments 1-11 or any other enumerated embodiment, wherein the attachment feature includes a rotatable structure that is at least partially pivotable in a plane approximately parallel to the upper surface plane.

Enumerated embodiment 13. The mounting system of enumerated embodiment 12 or any other enumerated embodiment, wherein the rotatable structure includes an arm or a blade.

Enumerated embodiment 14. The mounting system of enumerated embodiment 12 or 13 or any other enumerated embodiment, wherein the wall opening includes a length that permits the rotatable structure to pivot between a first position outside of the wall opening and a second position extending through the wall opening.

Enumerated embodiment 15. The mounting system according to any of enumerated embodiments 12-14 or any other enumerated embodiment, wherein the rotatable attachment feature engages with the bottom flange.

Enumerated embodiment 16. The mounting system according to any of enumerated embodiments 1-15 or any other enumerated embodiment, wherein the first frame section further includes a second wall opening, and the support structure includes a second attachment feature extending through the second wall opening and engages the frame.

Enumerated embodiment 17. The mounting system according to any of enumerated embodiments 1-16 or any other enumerated embodiment, wherein at least a portion of the bottom flange of the first frame section rests over at least a portion of the upper surface.

Enumerated embodiment 18. The mounting system according to any of enumerated embodiment 1-17 or any other enumerated embodiment, further including a support wall extending between an inner portion of the lower shelf and the bottom flange.

Enumerated embodiment 19. The mounting system of enumerated embodiment 18 or any other enumerated embodiment, wherein the support wall includes a first support wall opening.

Enumerated embodiment 20. The mounting system of enumerated embodiment 19 or any other enumerated embodiment, wherein a flap of framework material extends between the bottom of the first wall opening and the bottom of the first support wall opening.

Enumerated embodiment 21. The mounting system of enumerated embodiment 19 or 20 or any other enumerated embodiment, wherein the attachment feature engages the frame sidewall and the support wall.

Enumerated embodiment 22. The mounting system according to any of enumerated embodiments 1-21 or any other enumerated embodiment, wherein the bottom flange includes a structured bottom flange portion.

Enumerated embodiment 23. The mounting system of enumerated embodiment 22 or any other enumerated embodiment, wherein the attachment feature engages the structured bottom flange portion.

Enumerated embodiment 24. The mounting system according to any of enumerated embodiments 1-23 or any other enumerated embodiment, wherein the solar panel is approximately square or rectangular and includes an opposing edge panel area on an opposite side relative to the first panel edge area.

Enumerated embodiment 25. The mounting system of enumerated embodiment 24 or any other enumerated embodiment, further including an opposing frame section including:

an elongated piece of framework material having a first end and a second end, wherein the first and second ends define a lengthwise dimension;

a lengthwise fold defining an intersection of a frame sidewall with a bottom flange, wherein at least a portion the frame sidewall extends above the bottom flange;

a first wall opening in the frame sidewall; and a panel containment structure at an upper portion of the frame sidewall, the panel containment structure including a lower shelf extending from the sidewall, wherein the panel containment structure engages a bottom surface of the solar panel at the opposing panel edge area.

Enumerated embodiment 26. The mounting system of enumerated embodiment 25, further including a second support structure including a second support structure material and a second upper surface, wherein at least a portion the opposing frame section rests on at least a portion of the second upper surface.

Enumerated embodiment 27. The mounting system of enumerated embodiment 26 or any other enumerated embodiment, wherein the frame sidewall of the opposing frame section includes an opposing wall opening.

Enumerated embodiment 28. The mounting system of enumerated embodiment 27 or any other enumerated embodiment, wherein the second support structure includes an opposing attachment feature, at least a portion of which is positioned above the second upper surface, and wherein the opposing attachment feature extends through the opposing wall opening and engages the frame Enumerated embodiment 29. The mounting system of enumerated embodiment 26 or any other enumerated embodiment, wherein the bottom flange of the opposing frame section includes a mounting hole.

Enumerated embodiment 30. The mounting system of enumerated embodiment 29 or any other enumerated embodiment, wherein the second support structure includes a mounting feature including the second support structure material and extending upwardly from the second upper surface, and wherein the mounting feature extends through the mounting hole.

Enumerated embodiment 31. The mounting system of enumerated embodiment 30 or any other enumerated embodiment, wherein the mounting hole includes a slot and the mounting feature includes a tab.

Enumerated embodiment 32. The mounting system according to any of enumerated embodiments 1-31 or any other enumerated embodiment, wherein at least one panel containment structure further includes a pocket wall extending from the lower shelf and a top lip extending from the pocket wall and partially over the solar panel.

Enumerated embodiment 33. The mounting system according to any of enumerated embodiments 1-32 or any other enumerated embodiment, wherein the framework material for at least one frame section includes coated steel.

Enumerated embodiment 34. The mounting system of enumerated embodiment 30 or any other enumerated embodiment, wherein the coated steel has a thickness in a range of about 0.7 mm to about 1.4 mm.

Enumerated embodiment 35. A framed panel structure including:

a solar panel having four sides, including a first panel edge, a second panel edge approximately orthogonal to the first panel edge, a third panel edge opposite and approximately parallel to the first panel edge, and a fourth panel edge opposite and approximately parallel to the second panel edge; and a frame including at least a first frame section including a first panel containment structure that engages the first panel edge, and an opposing frame section including an opposing panel containment structure that engages the third panel edge, wherein:

each frame section includes a lengthwise fold in an elongated single piece of framework material, the lengthwise fold defining a frame sidewall and a bottom flange;

the first frame section includes a wall opening in its frame sidewall; and the opposing frame section includes a mounting hole in its bottom flange.

Enumerated embodiment 36. The framed panel structure of enumerated embodiment 35 or any other enumerated embodiment, wherein the first frame section further includes a flap of framework material extending from the bottom of the wall opening over a portion of the first frame section bottom flange.

Enumerated embodiment 37. The framed panel structure of enumerated embodiment 35 or 36 or any other enumerated embodiment, wherein the mounting hole includes a slot.

Enumerated embodiment 38. The framed panel structure according to any of enumerated embodiments 35-37 or any other enumerated embodiment, wherein the first frame section, the opposing frame section, or each of the first and opposing frame sections includes a support wall.

Enumerated embodiment 39. The framed panel structure according to any of enumerated embodiments 35-38 or any other enumerated embodiment, wherein the framework material for at least one frame section includes coated steel.

Enumerated embodiment 40. The framed panel structure according to any of enumerated embodiments 35-39 or any other enumerated embodiment, wherein the framework material for all frame sections includes coated steel.

Enumerated embodiment 41. The framed panel structure of enumerated embodiment 39 or 40 or any other enumerated embodiment, wherein the coated steel has a thickness in a range of about 0.7 mm to about 1.4 mm.

Enumerated embodiment 42. A method of installing a framed panel structure, the method including:

providing a framed panel structure according to any of enumerated embodiments 35-41;

providing a first support structure including:

a first upper surface including a first support structure material, the first upper surface characterized by a first upper surface plane; and a first attachment feature, at least a portion of which is positioned above the upper surface plane;

providing a second support structure including:

a second upper surface including a second support structure material, the second upper surface characterized by a second upper surface plane; and a mounting feature formed from the second support structure material and extending upwardly from the second upper surface plane;

while holding the opposing frame section elevated relative to the first upper surface plane, sliding the first frame section of the framed panel structure over the first upper surface of the first support structure so that the first attachment feature moves into and through the wall opening thereby engaging the first frame section; and lowering the opposing frame section onto the second support structure so that the mounting feature moves into and through the mounting hole, thereby engaging the opposing frame section.

As can be easily understood from the foregoing, the basic concepts of the various embodiments of the present application(s) may be embodied in a variety of ways. It involves mounting technology techniques as well as devices to accomplish the appropriate mount and mounting technology. In this application, the mounting technology techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the various embodiments of the present application(s) and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application. As used herein and in the appended claims, the singular forms "a", "an", and "the" include plural referents unless the context clearly dictates otherwise. Thus, for example, reference to "a method" includes a plurality of such methods and reference to "the anode" includes reference to one or more anodes and equivalents thereof known to those skilled in the art, and so forth. Terms like "overlaying", "over" or the like may be direct contact, indirect contact, above, upon, cover, or the like.

It should also be understood that a variety of changes may be made without departing from the essence of the various embodiments of the present application(s). Such changes are also implicitly included in the description. They still fall within the scope of the various embodiments of the present application (s). A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the present application (s) both independently and as an overall system.

Further, each of the various elements of embodiments of the present application (s) and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the present application (s), the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which embodiments of the present application (s) are entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of an "attachment" should be understood to encompass disclosure of the act of "attaching"—whether explicitly discussed or not—and, conversely, were there effectively disclosure of the act of "attaching", such a disclosure should be understood to encompass disclosure of an "attachment" and even a "means for attaching." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components that are configured to, or configured and arranged to, achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this present application for patent are hereby incorporated by reference. Any priority case(s) claimed by this present application is hereby appended and hereby incorporated by reference. In addition, as to each term used it should be understood that unless its utilization in this present application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in any list of references or other information statement filed with the application are hereby appended and hereby incorporated by reference, however, as to each of the above, to the extent that such information or statements incorporated by reference might be considered inconsistent with the patenting of the various embodiments of present application (s) such statements are expressly not to be considered as made by the applicant(s).

Thus, the applicant(s) should be understood to have support and make claims to embodiments including at least: i) each of the mounting technologies as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent applications, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all applications described herein.

In addition and as to computer aspects and each aspect amenable to programming or other electronic automation, it should be understood that in characterizing these and all other aspects of the various embodiments of the present application(s)—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant (s) should be understood to have support to claim and make a statement of application to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, and the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent applications, and xxxiii) the various combinations of each of the above and of any aspect, all without limiting other aspects in addition. In addition, the applicant(s) should be understood to have support to claim and make a statement of application that may include claims directed to any of the enumerated embodiments and any permutation or combination thereof.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group*, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this present application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of various embodiments of the present application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as desired to define the matter for which protection is sought by this present application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this present application including any subsequent continuation, division, or continuation-in-part application thereof or any reissue or extension thereon.

We claim:

1. A frame for supporting a solar panel, the frame comprising at least a first frame section, the first frame section comprising:

a structured bottom flange provided at a base of the frame section;

a frame sidewall extending from the structured bottom flange; and a panel containment structure at an upper portion of the frame sidewall, the panel containment structure comprising a lower shelf extending from the frame sidewall, wherein (i) the structured bottom flange comprises a first portion defining a first plane and a structured portion, (ii) the structured portion is positioned above the first plane and beneath the lower shelf, and (iii) the first portion extends from the structured portion in a direction away from the frame sidewall; and wherein the structured portion comprises a pair of separate and distinct upwardly extending walls, the pair of upwardly extending walls intersecting at a peak of the structured portion below the lower shelf.

2. The frame of claim 1, wherein the structured portion abuts the frame sidewall.

3. The frame of claim 1, wherein the structured portion is spaced from the frame sidewall.

4. The frame of claim 1, wherein the first portion is configured to be approximately parallel to a plane of the solar panel.

5. The frame of claim 1, further comprising a first wall opening in the frame sidewall.

6. The frame of claim 1, wherein the panel containment structure comprises a pocket wall extending from the lower shelf and a top lip extending from the pocket wall and at least partially over the lower shelf.

7. The frame of claim 1, wherein the frame comprises a coated steel material.

8. The frame of claim 7, wherein the coated steel has a thickness in a range of about 0.5 mm to about 1.4 mm.

9. The frame of claim 1, further comprising a support wall extending between an inner portion of the lower shelf and the structured bottom flange, wherein the structured portion is provided between the frame sidewall and the support wall, and the first portion extends away from the support wall.

10. The frame of claim 9, wherein the structured portion abuts the frame sidewall, the support wall, or both.

11. The frame of claim 9, wherein the structured portion is spaced from the frame sidewall and from the support wall.

12. The frame of claim 9, wherein the first portion is configured to be approximately parallel to a plane of the solar panel.

13. The frame of claim 9, further comprising a first wall opening in the frame sidewall.

14. The frame of claim 13, further comprising a first support wall opening.

15. The frame of claim 9, wherein the panel containment structure comprises a pocket wall extending from the lower shelf and a top lip extending from the pocket wall and at least partially over the lower shelf.

16. The frame of claim 9, wherein the frame for at least one frame section comprises a coated steel material.

17. The frame of claim 16, wherein the coated steel has a thickness in a range of about 0.5 mm to about 1.4 mm.

18. The frame of claim 1, wherein the peak of the structured portion abuts the lower shelf.

19. A frame for supporting a solar panel, the frame comprising at least a first frame section, the first frame section comprising:

a structured bottom flange provided at a base of the frame section;

a frame sidewall extending from the structured bottom flange; and a panel containment structure at an upper portion of the frame sidewall, the panel containment structure comprising a lower shelf extending from the frame sidewall, wherein (i) the structured bottom flange comprises a first portion defining a first plane and a structured portion, (ii) the structured portion is positioned above the first plane and beneath the lower shelf, and (iii) the first portion extends from the structured portion in a direction away from the frame sidewall; and wherein the structured portion comprises a pair of separate and distinct upwardly extending walls, and wherein the first portion comprises a folded frame material.

20. The frame of claim 19, wherein the folded frame material comprises a first wall portion of the first portion and a second wall portion of the first portion, the first wall portion extending horizontally in a first direction from the structured portion in the first plane, the second wall portion extending horizontally in a second, opposite direction from the structured portion and at a different elevation than the first wall portion.

* * * * *